(12) United States Patent
Voege et al.

(10) Patent No.: US 10,139,864 B2
(45) Date of Patent: Nov. 27, 2018

(54) MERCHANT/CUSTOMER POS INTERACTION SYSTEM

(71) Applicant: PAYPAL, INC., San Jose, CA (US)

(72) Inventors: Michael Voege, San Jose, CA (US);
Faran Najafi, San Jose, CA (US);
Egan Schultz, San Jose, CA (US);
Satish Govindarajan, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 139 days.

(21) Appl. No.: 14/558,376

(22) Filed: Dec. 2, 2014

(65) Prior Publication Data

US 2015/0185768 A1    Jul. 2, 2015

Related U.S. Application Data

(60) Provisional application No. 61/921,352, filed on Dec. 27, 2013.

(51) Int. Cl.
*G06F 1/16* (2006.01)
*G06F 3/01* (2006.01)
(Continued)

(52) U.S. Cl.
CPC ............ *G06F 1/166* (2013.01); *G06F 1/1626* (2013.01); *G06F 1/1686* (2013.01); *G06F 3/017* (2013.01);
(Continued)

(58) Field of Classification Search
CPC ...... G06F 1/166; G06F 1/1626; G06F 1/1632; G06F 1/1686; G06F 3/0481; G06F 3/03;
(Continued)

(56) References Cited

U.S. PATENT DOCUMENTS 6,062,478 A *  5/2000  Izaguirre .................. G06F 1/16
                                                235/462.43
8,602,304 B2 * 12/2013  Cohen ................ G06Q 20/3226
                                                      235/449

(Continued)

*Primary Examiner* — Steven T Sawyer
*Assistant Examiner* — Sagar Shrestha
(74) *Attorney, Agent, or Firm* — Haynes and Boone, LLP

(57) ABSTRACT

Systems and methods for providing merchant/customer interaction include determining that a tablet computer is in a merchant orientation, retrieving merchant product information according to a received instruction and merchant orientation information, and displaying a merchant screen on the tablet computer that includes the merchant product information according to the merchant orientation information. A change in the orientation of the tablet computer enclosure/stand is then detected from the merchant orientation to a customer orientation. In response, the merchant screen is transitioned on the tablet computer display to a customer screen as the tablet computer enclosure/stand changes orientations by moving the merchant screen and the customer screen linearly while in a stacked orientation. The customer screen includes the merchant product information displayed according to customer orientation information such that the merchant product information is displayed differently on the customer screen relative to the merchant screen.

20 Claims, 44 Drawing Sheets

(51) Int. Cl.

| | | |
|---|---|---|
| *G06F 3/0346* | (2013.01) | |
| *G06Q 30/06* | (2012.01) | |
| *G06F 3/03* | (2006.01) | |
| *G06F 3/0487* | (2013.01) | |
| *G06Q 20/32* | (2012.01) | |
| *G07G 1/01* | (2006.01) | |
| *G07G 1/12* | (2006.01) | |
| *H04M 1/04* | (2006.01) | |
| *G06Q 30/02* | (2012.01) | |
| *G06F 3/0481* | (2013.01) | |

(52) U.S. Cl.
CPC .............. *G06F 3/03* (2013.01); *G06F 3/0346* (2013.01); *G06F 3/0481* (2013.01); *G06F 3/0487* (2013.01); *G06Q 20/322* (2013.01); *G06Q 30/0281* (2013.01); *G06Q 30/0643* (2013.01); *G07G 1/01* (2013.01); *G07G 1/12* (2013.01); *H04M 1/04* (2013.01); *G06F 2200/1637* (2013.01)

(58) Field of Classification Search
CPC ...... G06F 3/017; G06F 3/0346; G06F 3/0487; G06F 2200/1637; G06Q 30/0281; G06Q 20/322; G06Q 30/0643; H04M 1/04; G07G 1/01; G07G 1/12
USPC .............. 361/679.01, 679.21, 679.22, 679.3, 361/679.41–679.44, 679.56, 679.59
See application file for complete search history.

(56) References Cited

U.S. PATENT DOCUMENTS

| | | | |
|---|---|---|---|
| 8,749,960 B2 * | 6/2014 | Mori | .................... G06F 1/1628 248/346.03 |
| 8,807,333 B1 | 8/2014 | Cooper et al. | |
| 9,080,716 B2 * | 7/2015 | Mulhern | .............. F16M 13/022 |
| 9,105,026 B1 | 8/2015 | Edwards | |
| 9,128,668 B2 * | 9/2015 | Johnson | ................ G06F 1/1626 |
| 9,568,955 B2 | 2/2017 | Voege et al. | |
| 9,817,446 B2 | 11/2017 | Voege et al. | |
| 2003/0078857 A1 | 4/2003 | Ookushi | |
| 2005/0240492 A1 | 10/2005 | Grdina | |
| 2008/0243626 A1 | 10/2008 | Stawar et al. | |
| 2010/0042484 A1 | 2/2010 | Sipes et al. | |
| 2011/0270712 A1 | 11/2011 | Wood et al. | |
| 2012/0023450 A1 | 1/2012 | Noto et al. | |
| 2012/0153116 A1 * | 6/2012 | Harrison | .............. A47B 23/044 248/460 |
| 2012/0188689 A1 * | 7/2012 | Leung | ................... G06F 1/1632 361/679.01 |
| 2013/0058023 A1 * | 3/2013 | Supran | .................. G06F 1/1632 361/679.01 |
| 2013/0075280 A1 * | 3/2013 | Besner | .................. G06F 1/1626 206/45.23 |
| 2013/0282501 A1 * | 10/2013 | Edwards | ............... E05B 65/461 705/17 |
| 2013/0299668 A1 * | 11/2013 | Von Barner | .......... G06F 1/1632 248/542 |
| 2014/0279294 A1 | 9/2014 | Field-Darragh et al. | |
| 2014/0347000 A1 * | 11/2014 | Hamann | ................. G06F 1/189 320/103 |
| 2014/0361130 A1 * | 12/2014 | Fenton | ................. F16M 11/041 248/176.1 |
| 2015/0095133 A1 | 4/2015 | Parker et al. | |
| 2015/0185860 A1 | 7/2015 | Voege et al. | |

* cited by examiner

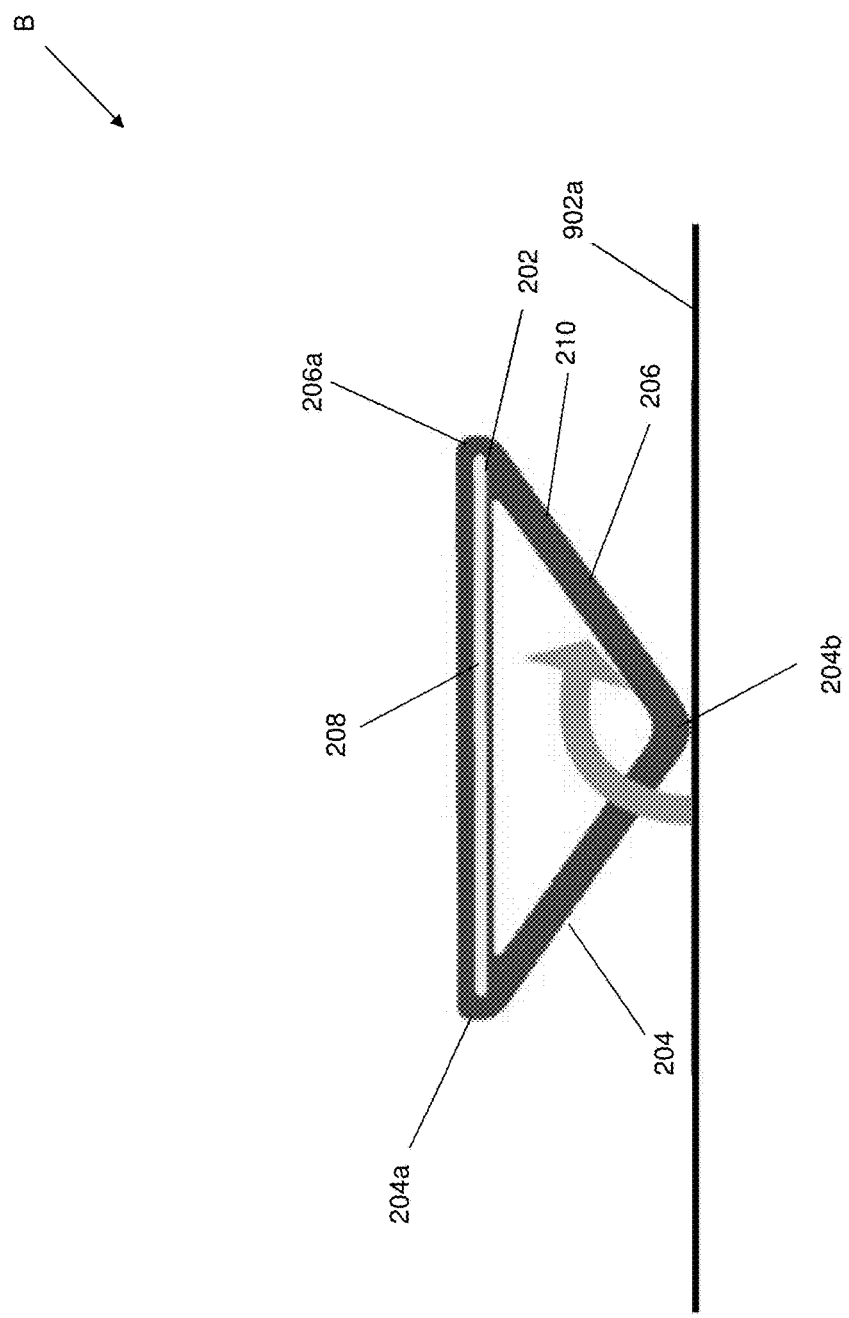

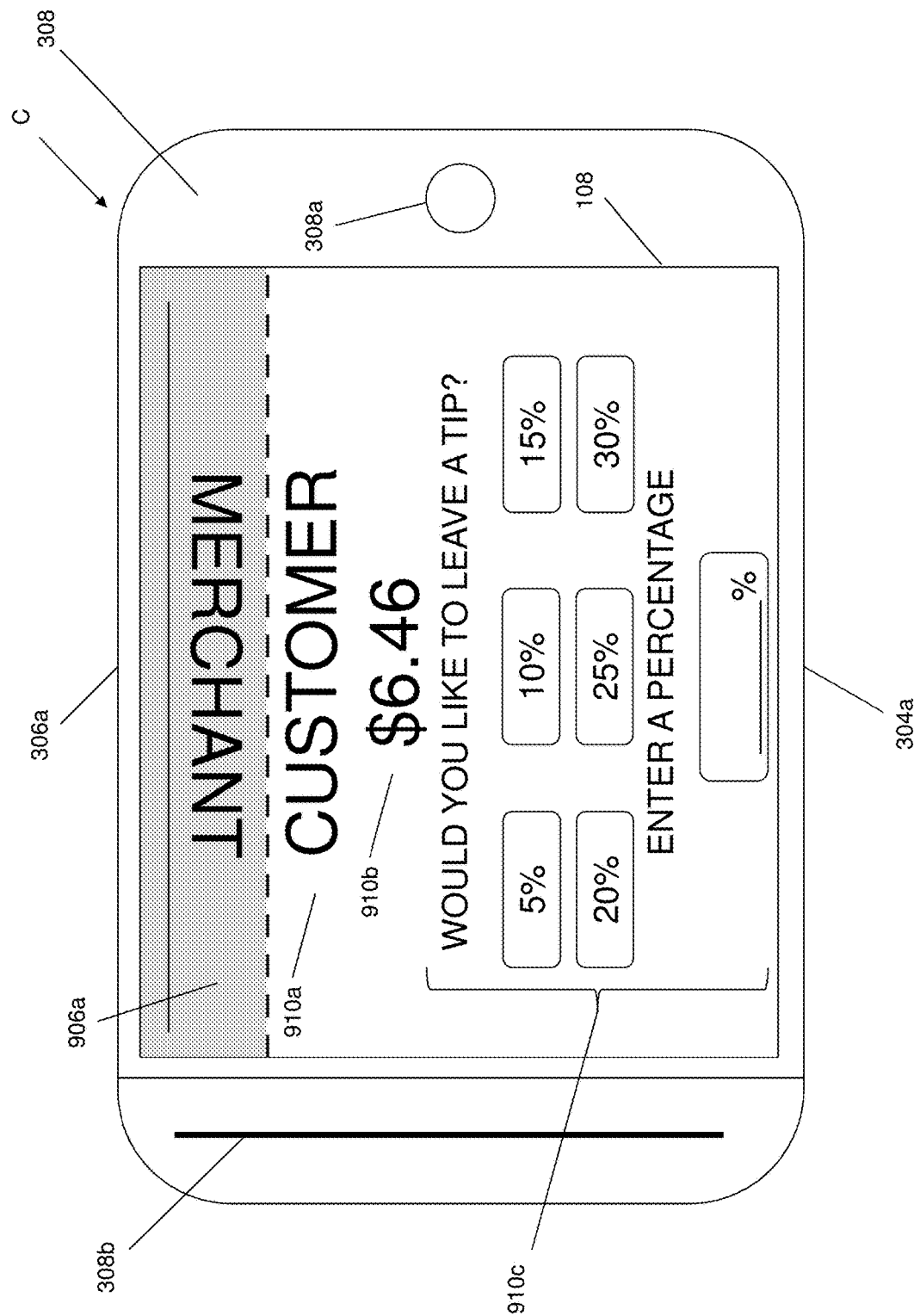

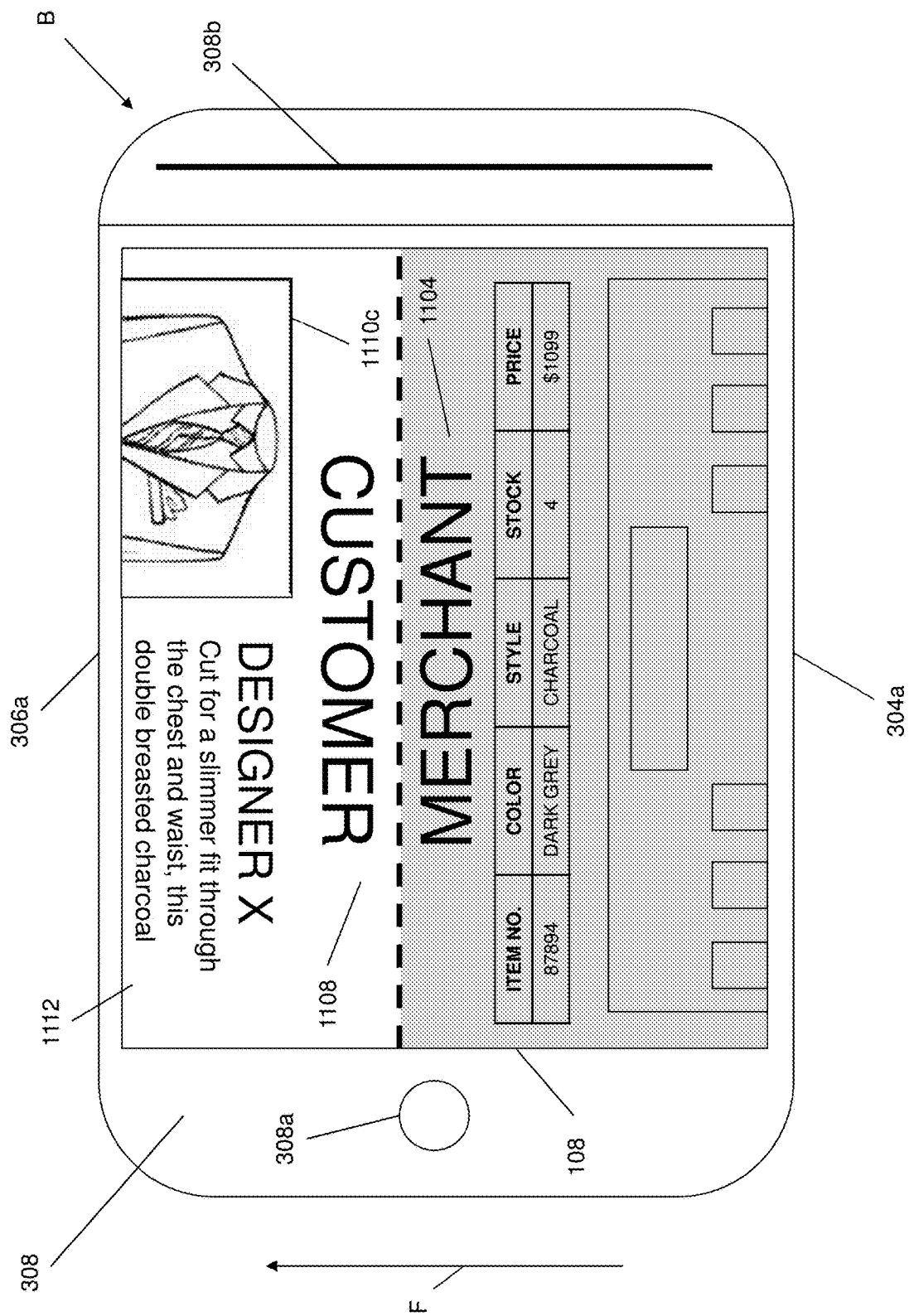

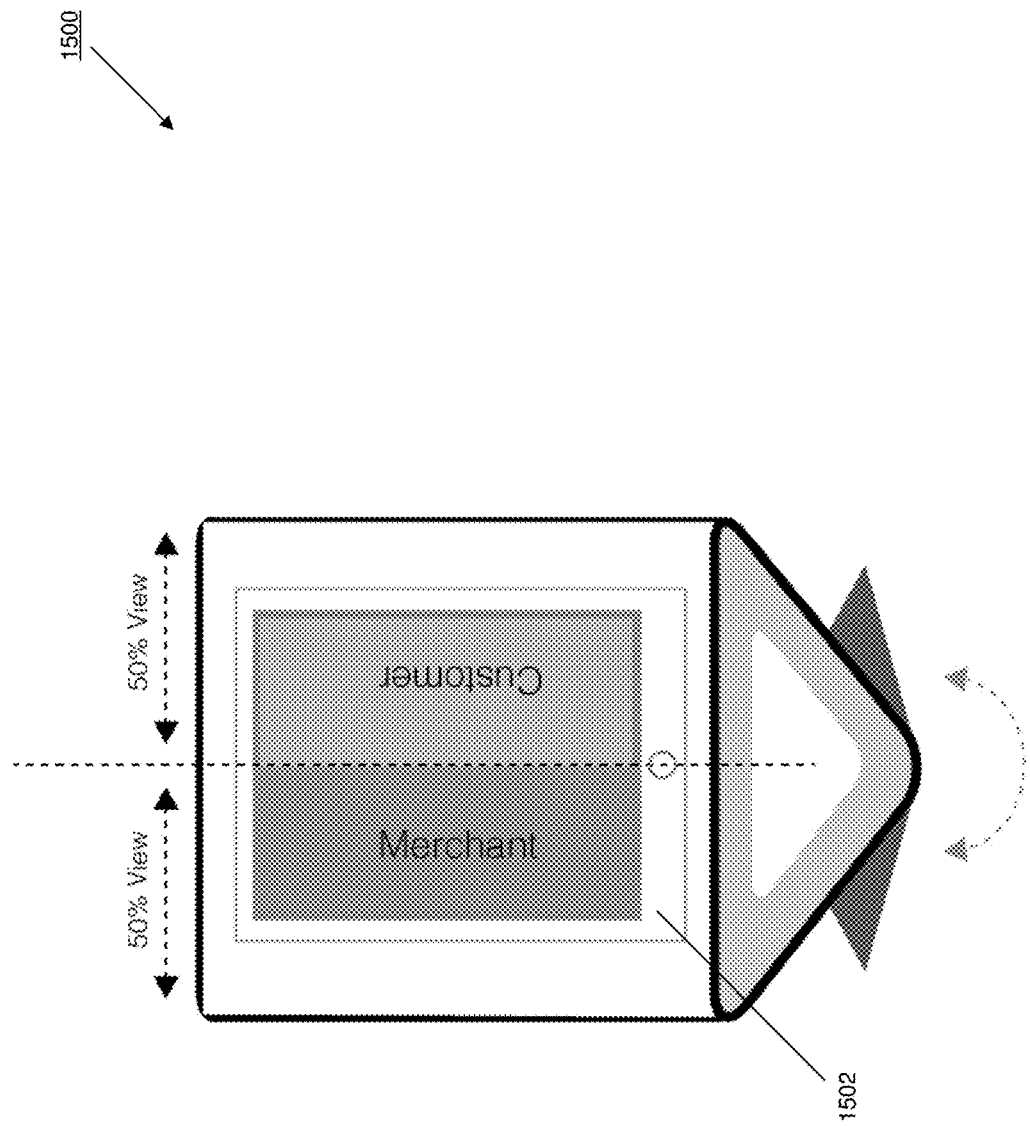

MERCHANT/CUSTOMER POS INTERACTION SYSTEM

CROSS REFERENCE TO RELATED APPLICATIONS

The present application claims priority to and incorporates by reference U.S. Provisional Patent Application Ser. No. 61/921,352, filed on Dec. 27, 2013.

BACKGROUND

Field of the Invention

The present disclosure generally relates to online and/or mobile payments and more particularly to a merchant/customer interaction system that may be used for online and/or mobile payments in a physical store setting.

Related Art

More and more consumers are purchasing items and services over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or mobile payment service provider such as, for example, PayPal, Inc. of San Jose, Calif. Such payment service providers can make transactions easier and safer for the parties involved. Purchasing with the assistance of a payment service provider from the convenience of virtually anywhere using a mobile device is one main reason why on-line and mobile purchases are growing very quickly.

Merchant/customer interactions in physical merchant locations have been conventionally limited to interactive kiosks and Point-Of-Sale (POS) devices. Kiosks are provided for customer use, and may include a computer and display that are provided in the physical merchant location and that allow customers to search for items for sale by the merchant. POS devices are provided for merchant use, and may include a register, product identification equipment (e.g., scanners), and a display so that users can see the cost of their items when they are identified. These systems limit the ability of the merchant and customers to interact, as they are typically provided for either the customer or the merchant and the only interaction occurs when the customer cannot find something using the kiosk, or when the customer views an item price and pays the merchant for their item(s).

Thus, there is a need for an improved merchant/customer interaction system.

BRIEF DESCRIPTION OF THE FIGURES

FIG. 2b is a front view illustrating an embodiment of the tablet computer of FIG. 1 being coupled to the tablet computer enclosure/stand of FIG. 2a.

FIG. 2c is a front view illustrating an embodiment of the tablet computer of FIG. 1 being coupled to the tablet computer enclosure/stand of FIG. 2a.

FIG. 2d is a front view illustrating an embodiment of the tablet computer of FIG. 1 coupled to the tablet computer enclosure/stand of FIG. 2a.

FIG. 2e is a perspective view illustrating an embodiment of the tablet computer of FIG. 1 being coupled to the tablet computer enclosure/stand of FIG. 2a.

FIG. 10f is a side view illustrating an embodiment of the tablet computer enclosure/stand of FIG. 2 transitioning between a merchant orientation and a customer orientation on a support surface.

FIG. 10i is a screen shot illustrating an embodiment of a customer screen.

FIG. 11h is a screen shot illustrating an embodiment of the transition of a customer screen to a merchant screen.

FIG. 15b is a schematic view illustrating an embodiment of a rocker POS tablet in a halfway rotated orientation.

Figure 1:
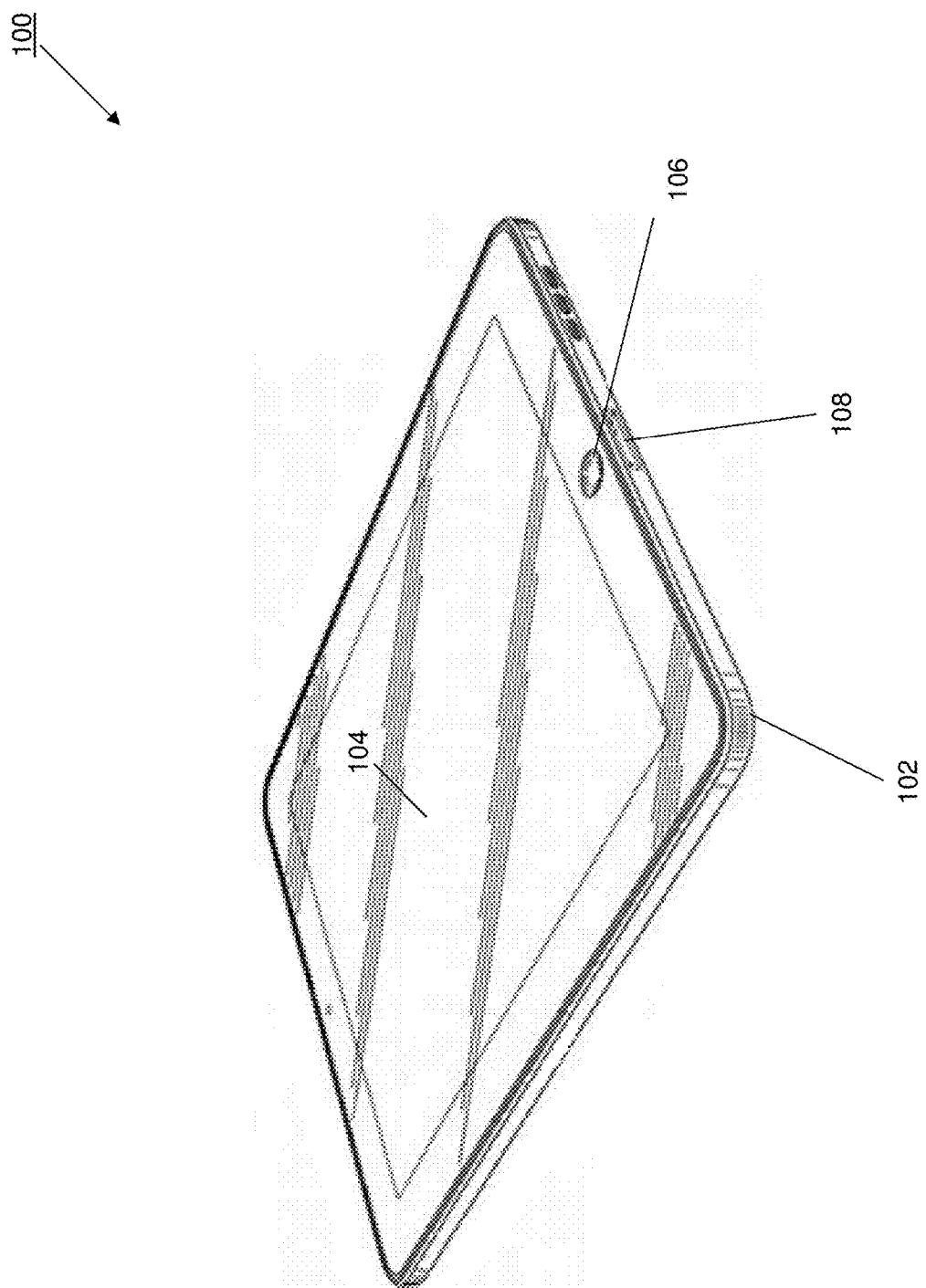
FIG. 1 is a perspective view illustrating an embodiment of a tablet computer.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes systems and methods for providing merchant/customer interactions, as well as Point Of Sale (POS) functionalities. In the embodiments discussed below, those systems and methods include a POS device with a tablet computer and a tablet computer enclosure/stand that provide what is referred to herein as a "rocker POS tablet". The tablet computer enclosure/stand of the rocket POS tablet has a triangularly shaped cross section with three primary use surfaces: a tablet computer display surface and two base surfaces that share a common edge and operate to support the rocker POS tablet in different orientations. Software and hardware devices in the rocker POS tablet provide for the recognition of the different orientations such that when the rocker POS tablet is in a merchant orientation, merchant product information is displayed differently than when the rocker POS tablet is in a customer orientation. In operation, the rocker POS tablet may be positioned on a support surface and transitioned between its different orientations, and during transition, a merchant screen is transitioned to a customer screen by "moving" (or more accurately, providing the illusion of movement of) the stacked merchant screen and customer screen linearly relative to the tablet computer display. The display of merchant product differently in the merchant orientation and the customer orientation allows the merchant to view merchant-specific product information (e.g., inventory data, product margins, costs, customer data, etc.), then transition the POS rocket tablet to the customer orientation so that the customer may view customer-specific information (e.g., product images).

In some embodiments of the present disclosure, customers may interact with merchants with the help of a payment service provider. For example, as discussed below, the rocker POS tablet may be a merchant device operated by a merchant. While conventional payment techniques such as credit cards are discussed below as being enabled by the rocker POS tablet, in other embodiments, the customer may pay using a customer device and a payment service provider account. A payment service provider may use a payment service provider device to provide payment service provider accounts to merchants and customers by, for example, linking financial accounts of the merchant and customer that are provided by account providers using account provider devices to those payment service provider accounts. Transactions may then be conducted between the merchants and customers by, for example, the customer using their customer device and merchant using their merchant device to provide details of a purchase to the payment service provider device, and the payment service provider using the payment service provider device to transfer funds from the financial account of the customer to the financial account of the merchant to pay for a product. However, this is only one example of how the rocker POS tablet may accept a payment, and while other examples are presented below, any payment technique is envisioned as falling within the scope of the present disclosure.

Referring now to FIG. 1, an embodiment of a computing device 100 is illustrated. One of skill in the art will recognize that the computing device 100 of FIG. 1 is a tablet computer 100 and, as described below, a tablet computing chassis may be provided that houses the tablet computer 100 to provide a POS rocker tablet. However, one of skill in the art in possession of the present disclosure will recognize that the tablet computer and tablet computer enclosure/stand described below may be integrated as a POS rocker tablet without departing from its scope. The tablet computer 100 includes a tablet computer component housing 102 that houses computing device components such as, for example, a processing system, a memory system, a storage system, a network communications system, and/or a variety of other computing device components known in the art. A tablet computer display 104 is coupled to the tablet computer component housing 102, and an input button 106 is located on the tablet computer component housing 102 between the tablet computer display 104 and an edge of the tablet computer component housing 102. A data connector 108 is located adjacent on that edge of the tablet computer component housing 102. While a single data connector 108 is illustrated and described, other data connectors (e.g., a headphone input, a USB port, etc.) may be provided on the tablet computer 100 while remaining within the scope of the present disclosure.

Figure 2A:
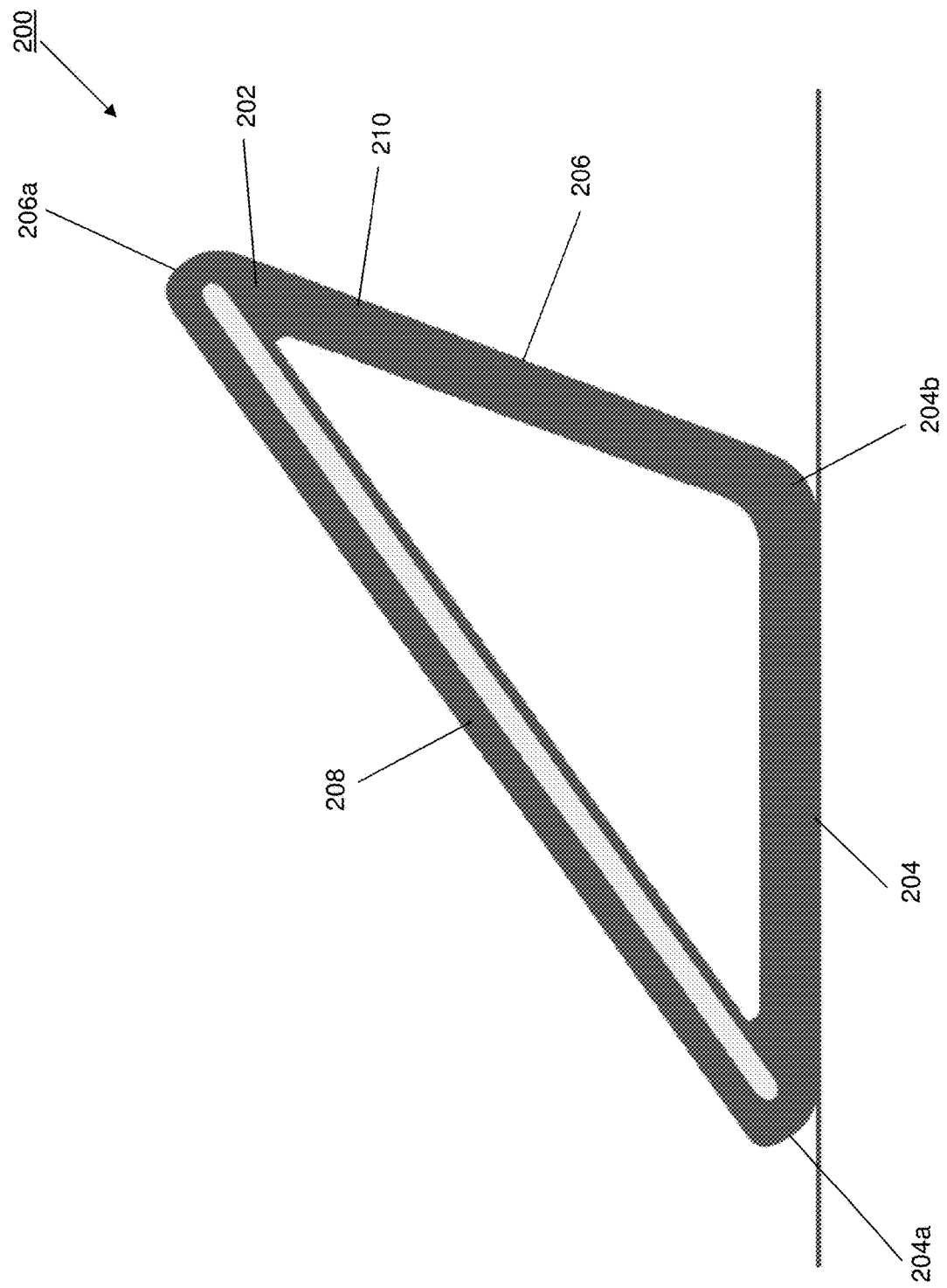
FIG. 2a is a side view illustrating an embodiment of a tablet computer enclosure/stand.

Referring now to FIG. 2a, an embodiment of a tablet computer enclosure/stand 200 is illustrated. The embodiment illustrated in FIG. 2a is a side view of a basic embodiment of the tablet computer enclosure/stand 200, and as discussed below, different features may be provided on the table computer chassis 200 to provide different functionality. The tablet computer enclosure/stand 200 includes a base 202 having a substantially triangular cross section, as illustrated. The base 202 includes a first base surface 204 having a first edge 204a and a second edge 204b that is located opposite the first base surface 204 from the first edge 204a. The base 202 also includes a second base surface 206 that shares the second edge 204b (also referred to as a "common" edge between the first base surface 204 and the second base surface 206 below) and includes a third edge 206a that is located opposite the second base surface 206 from the second edge 204b. While the first base surface 204 and the second base surface 206 are illustrated and discussed as sharing the second edge 204b, in other embodiments, one or more intermediate edges and surfaces may exist between the first base surface 204 and the second base surface 206. As such, in some embodiments, the second base surface 206 may "extend" from the first base surface 204 via other surfaces and edges such that a plane that coincides with the first base surface 204 will eventually intersect a plane that coincides with the second base surface 206.

A computer housing 208 extends between the first edge 204a and the third edge 206a, and as discussed above can either include an integrated computing device, or provide a tablet computer housing 208 for the tablet computer 100 as illustrated and described below. As discussed below, at least a portion of a scanning system 210 may be located on the second base surface 206. The tablet computer enclosure/stand 200 discussed below may be modified to accommodate a wide variety of tablet computers, form factors, and operating systems while remaining within the scope of the present disclosure. In an embodiment, the scanning device 210 may be an opening in the tablet computer enclosure/chassis 200 that allows a camera on a tablet computer to capture images and/or scan, discussed in further detail below.

In an embodiment, the tablet computer enclosure/chassis 200 may be thought of as having a top part enclosure that houses a tablet computer and a bottom foot stand in a pyramid shape that allows a rocking motion to the tablet computer enclosure/chassis 200. The bottom foot stand that supplies the viewing angle/dual position may be provided as more than one part of the tablet computer enclosure/chassis 200.

In the embodiment illustrated in FIG. 2a, and with reference to the triangular cross section of the base 202, the base 202 of the tablet computer enclosure/stand 200 is provided with a substantially isosceles triangular cross section with the tablet computer housing 208 provided on the hypotenuse side and the first base surface 204 and second base surface 206 having substantially equal lengths. However, different triangular cross sections may be provided while remaining within the scope of the present disclosure. Furthermore, while the engagement of the first base surface 204 with a support surface is referred to below as a "merchant orientation", and the engagement of the second base surface 206 with a support surface is referred to below as a "customer orientation", different orientations of the tablet computer enclosure/stand 200 other than those discussed below may be defined while remaining within the scope of the present closure.

Figure 2B:
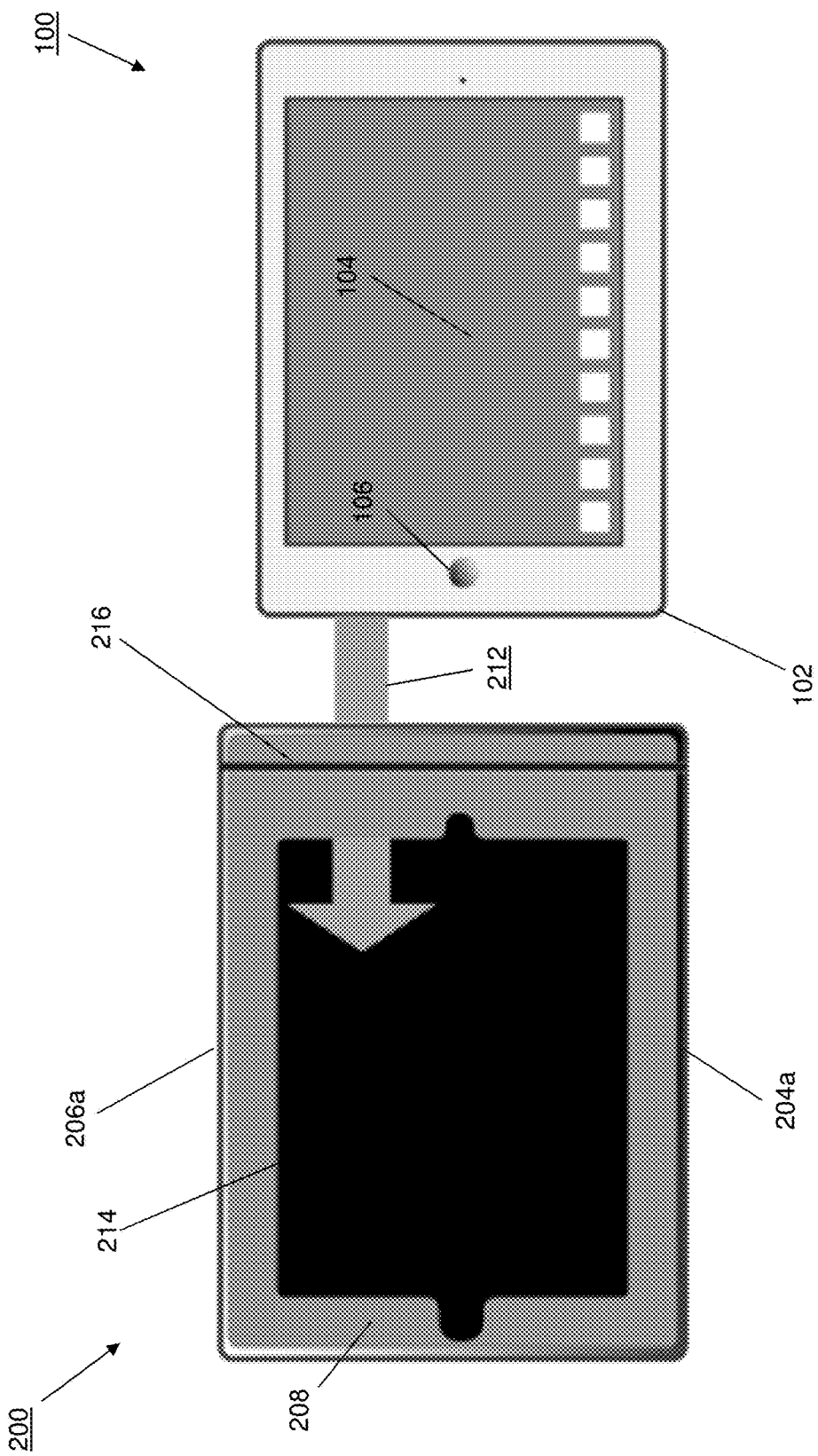
Figure 2C:
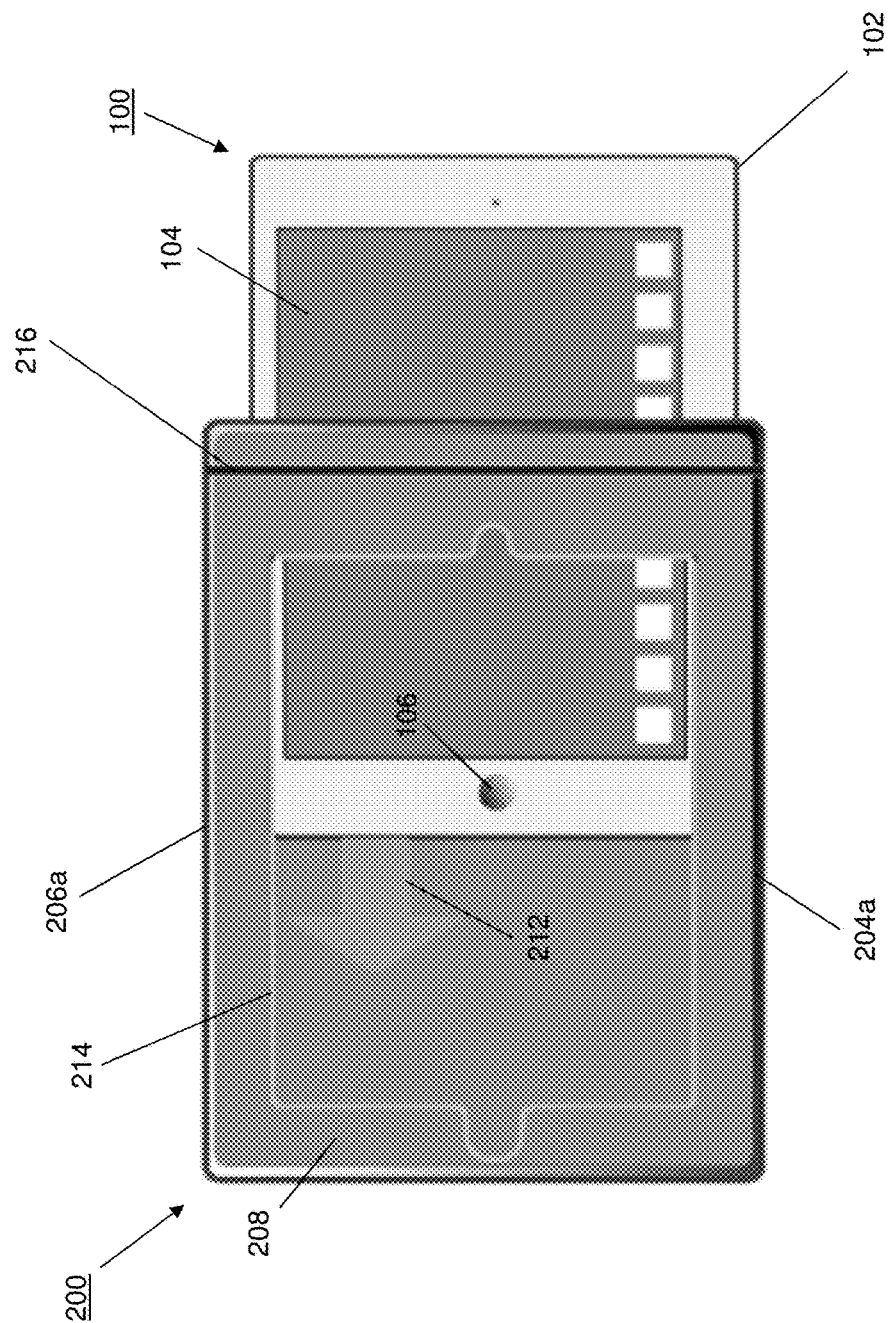
Figure 2D:
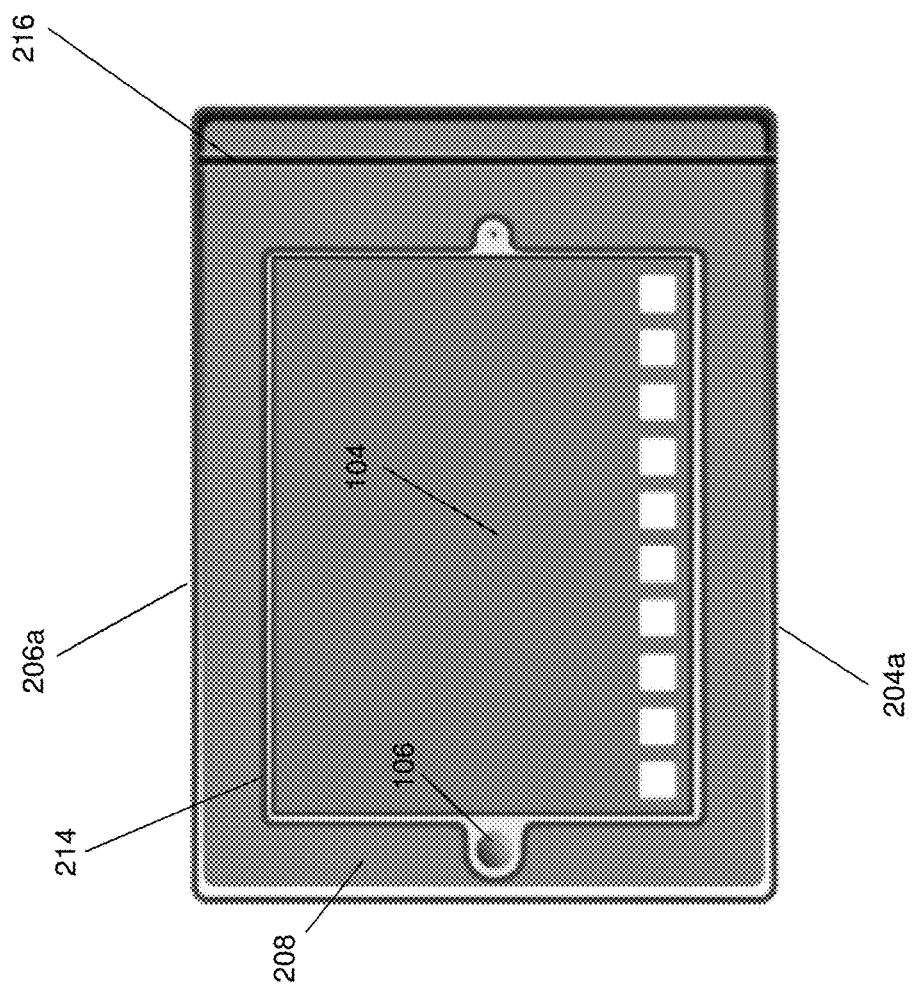
Figure 2E:
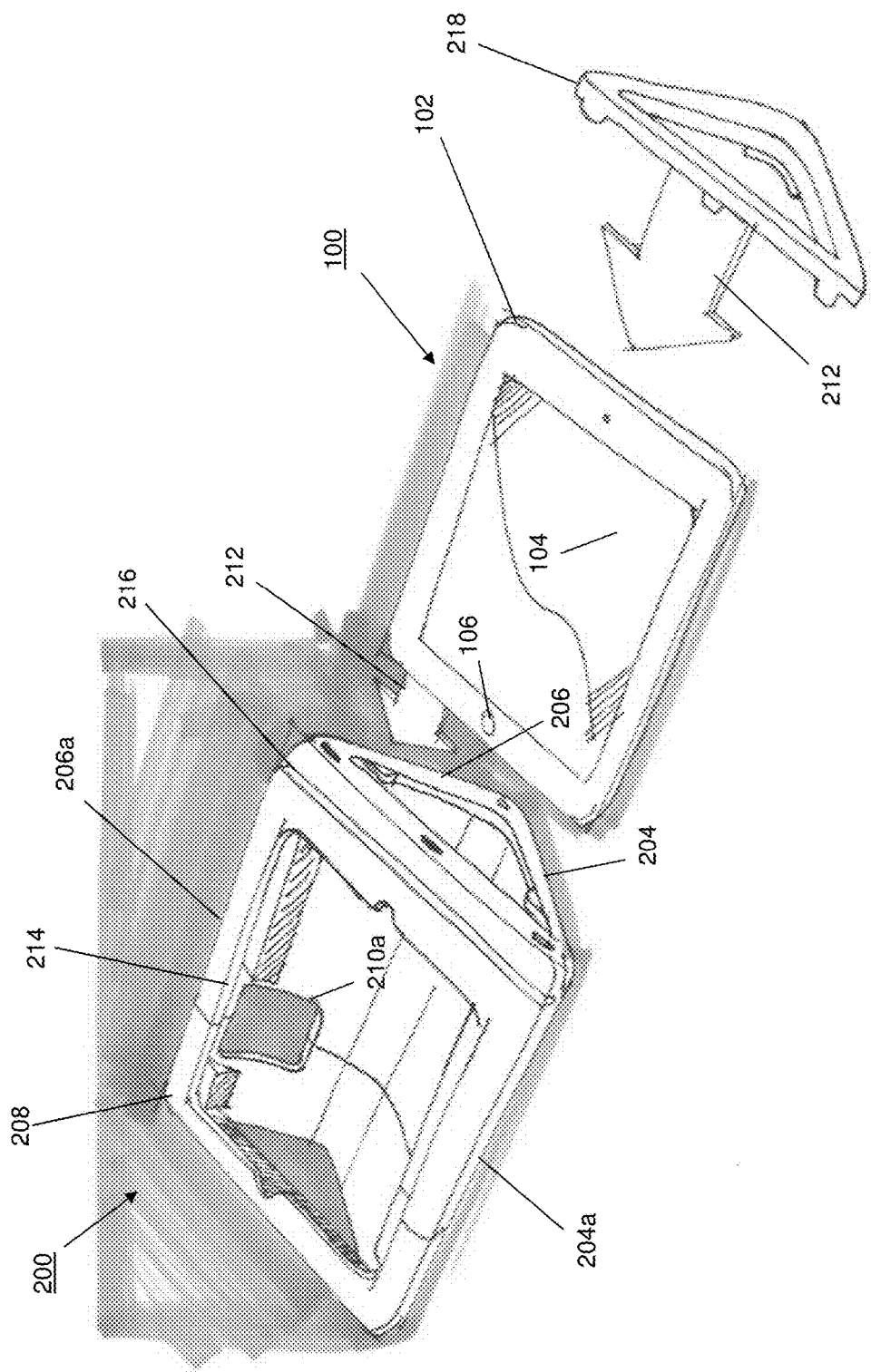

Referring now to FIGS. 2b, 2c, 2d, and 2e, an embodiment of the coupling of the tablet computer 100 of FIG. 1 with the tablet computer enclosure/chassis 200 is illustrated. As can be seen in FIG. 2b, the tablet computer 100 may be positioned adjacent a side of the tablet computer enclosure/stand 200 that includes an opening into the tablet computer housing 208 and moved in a direction 212. FIG. 2c illustrates how the tablet computer 100 may move in the direction 212 into the tablet computer housing 208, and FIG. 2d illustrates how continued movement in the direction 212 will cause the tablet computer 100 to become completely housed in the tablet computer housing 208. In the illustrated embodiment, the table tablet computer enclosure/chassis 200 defines a screen opening 214 through which the tablet computer display 104 may be viewed and accessed when the tablet computer 100 is positioned in the tablet computer housing 208, and an integrated card reader 216 that is discussed in further detail below. FIG. 2e illustrates how, once the tablet computer 100 has been positioned in the tablet computer housing 208 on the tablet computer enclosure/chassis 200, some embodiments of the present disclosure may include a tablet housing end cap 218 that may also be moved in the direction 212 and coupled to the tablet computer enclosure/chassis 200 (e.g., via coupling features on the tablet computer enclosure/chassis and the tablet housing end cap 218) in order to, for example, secure the tablet computer 100 in the tablet computer enclosure/chassis 200, couple the tablet computer 100 to features (e.g., the integrated card reader 216) on the tablet computer enclosure/chassis 200, etc.

Figure 2F:
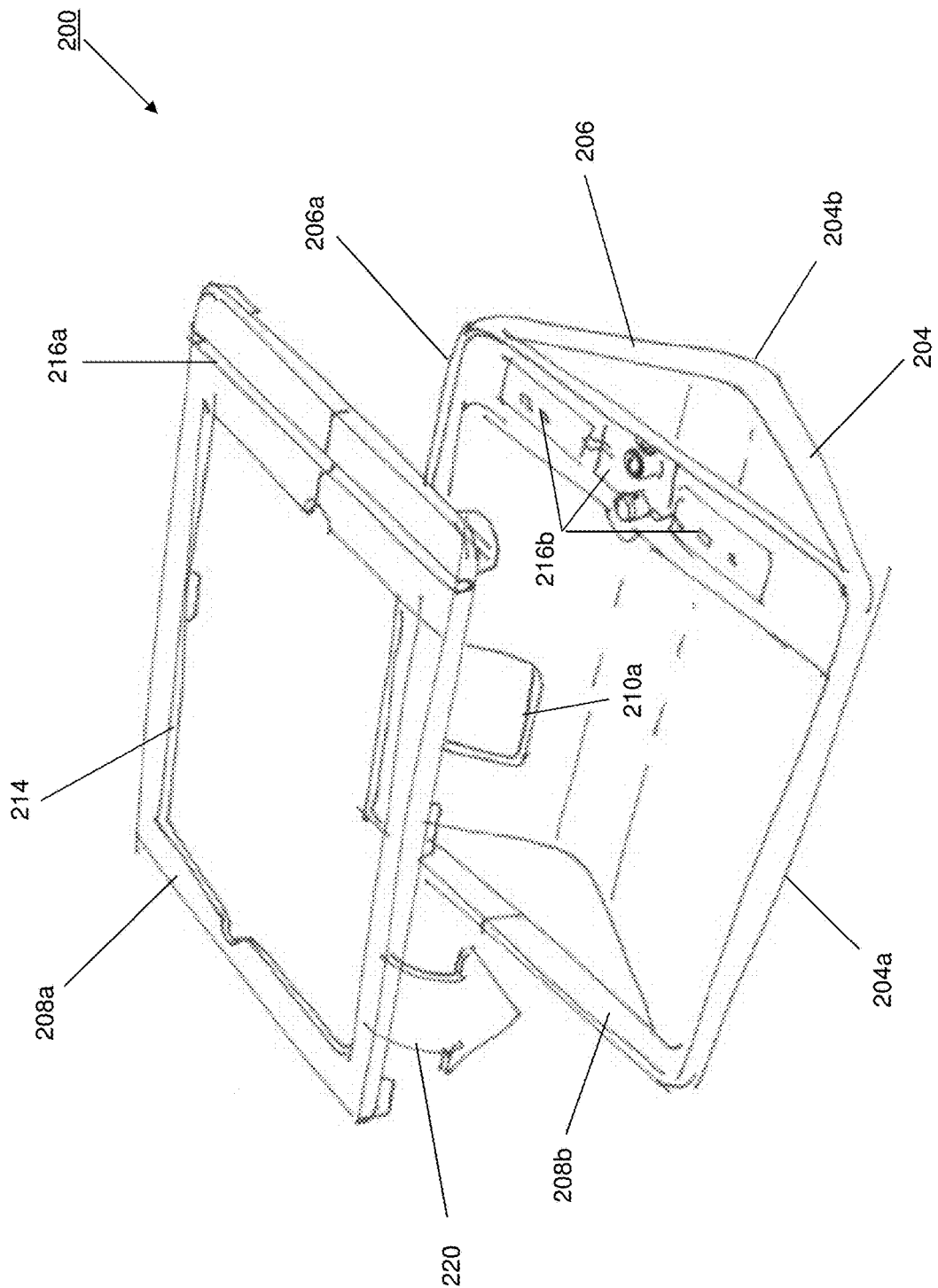
FIG. 2f is a perspective view illustrating an embodiment of the tablet computer enclosure/stand of FIG. 2a with an integrated card reader.
Figure 2G:
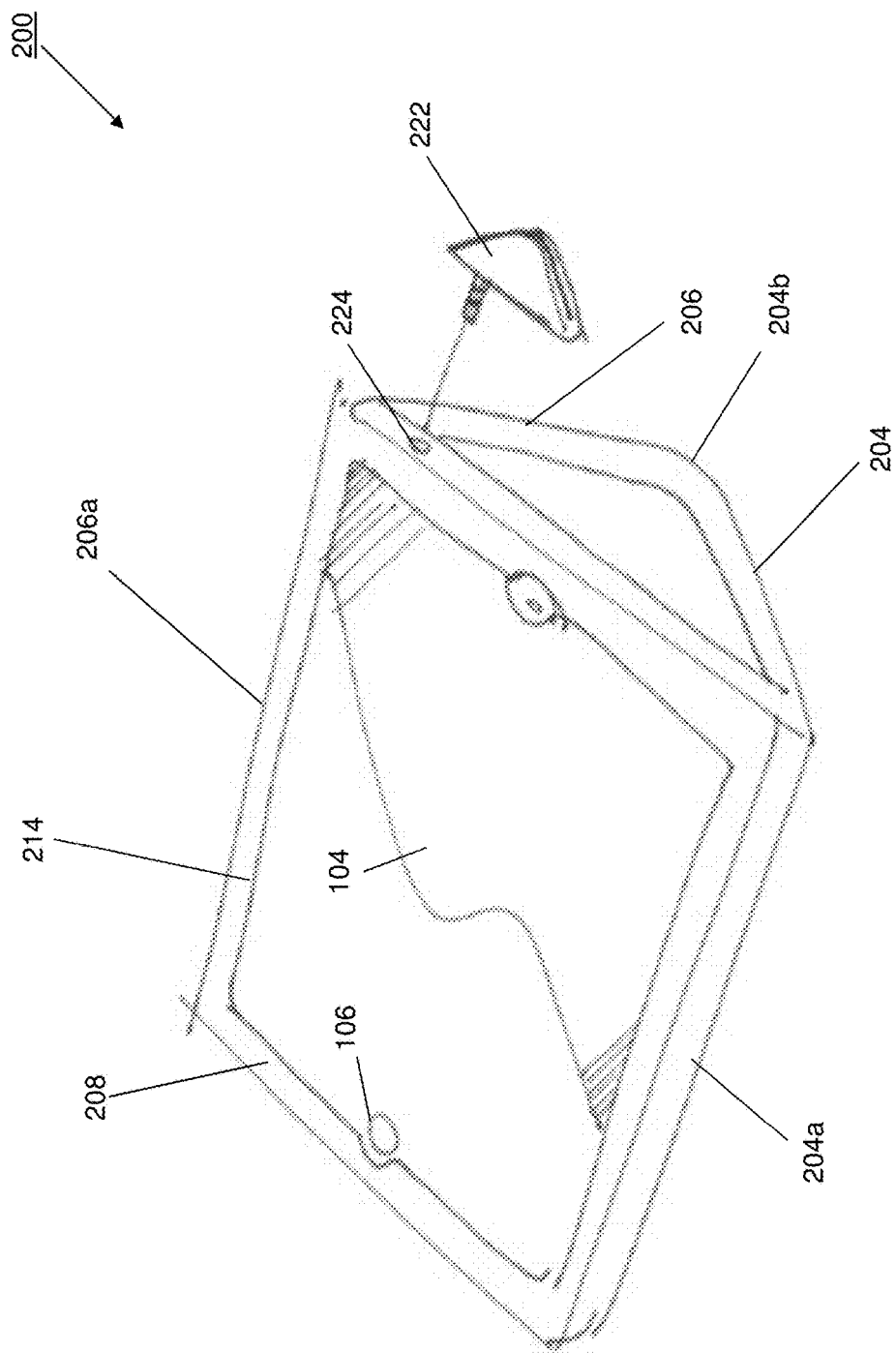
FIG. 2g is a perspective view illustrating an embodiment of the tablet computer of FIG. 1 coupled to the tablet computer enclosure/stand of FIG. 2a and a card reader being coupled to the tablet computer and/or tablet computer enclosure/stand.

Referring now to FIG. 2f, an embodiment of the tablet computer enclosure/chassis 200 is illustrated that includes the tablet computer housing 208 provided by a tablet computer housing bezel 208a and a tablet computer housing chassis portion 208b, with the integrated card reader 216 provided by a card reader channel 216a and card reader components 216b. As can be seen in FIG. 2f, the tablet computer housing bezel 208a defines the screen opening 214 and includes coupling features that are configured to engage the tablet computer housing chassis portion 208b when the tablet computer housing bezel 208a is moved in a direction 220, which aligned the card reader channel 216 with the card reader components 216b and allows a user to move a card through the card reader channel 216a to be read by the card reader components 216b, as discussed below. FIG. 2f also illustrates how the portion of the scanning system 210 may be provided by a scanning window 210a defined by the second base surface 206 that may allow a scanning device on the tablet computer 100 to operate through the scanning window 210a. Alternatively, FIG. 2g illustrates how a card reader 222 may be coupled to the tablet computer enclosure chassis 200 and/or the tablet computer 100 (e.g., via an input 224 provided on the tablet computer enclosure chassis 200 and/or the tablet computer 100) to provide for the card reading functionality discussed below.

Figure 3A:
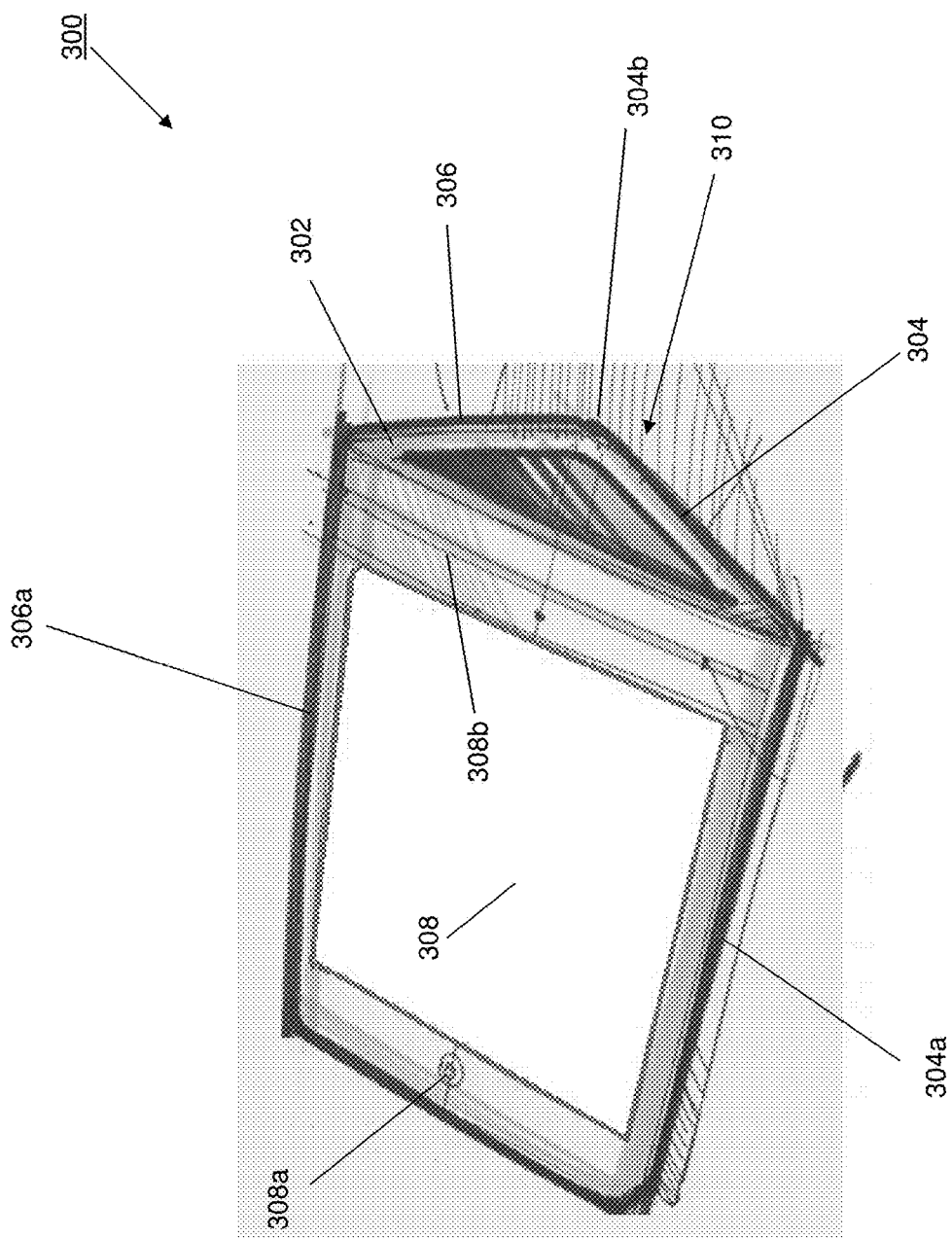
FIG. 3a is a front perspective view illustrating an embodiment of the tablet computer enclosure or stand of FIG. 2 in a merchant orientation.
Figure 3B:
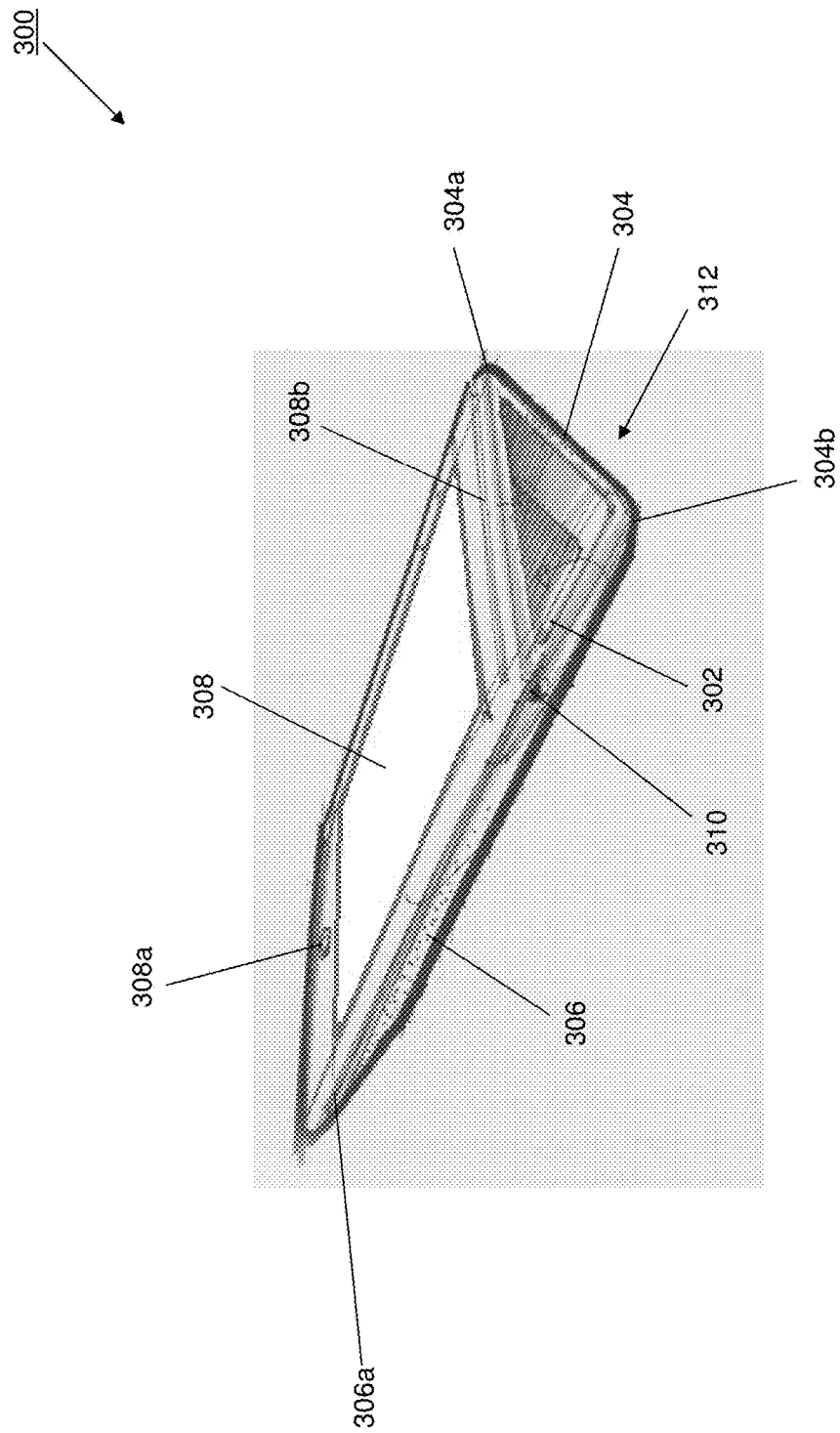
FIG. 3b is a rear perspective view illustrating an embodiment of the tablet computer enclosure/stand of FIG. 2.

Referring now to FIGS. 3a and 3b, an embodiment of a tablet computer enclosure/stand 300 is illustrated that may be the tablet computer enclosure/stand 200 discussed above with reference to FIG. 2. The tablet computer enclosure/stand 300 includes a base 302 having a triangular cross section, as illustrated. The base 302 includes a first base surface 304 having a first edge 304a and a second edge 304b that is located opposite the first base surface 304 from the first edge 304a. The base 302 also includes a second base surface 306 that shares the second edge 304b (the "common" edge between the first base surface 304 and the second base surface 306) and includes a third edge 306a that is located opposite the second base surface 306 from the second edge 304b. A computer housing 308 extends between the first edge 304a and the third edge 306a, and as discussed above can either include an integrated computing device, or provide a tablet computer housing 308 for the tablet computer 100 as illustrated and described below. The tablet computer housing 308 includes an input button 308a, which may be part of an integrated computing device, the input button 106 on the tablet computer 100 when that tablet computer 100 is housed in the tablet computer housing 308, or an input button 308a that is configured to actuate the input button 106 on the tablet computer 100 when that tablet computer 100 is housed in the tablet computer housing 308. The tablet computer housing 308 also includes a card reading slot 308b that provides access to a card reading device (not illustrated) in the tablet computer enclosure/stand 300. The tablet computer enclosure/stand 300 also includes a scanning device 310 (or aperture for a camera on the tablet computer) that is located on the second base surface 306. A channel 312 is defined by the tablet computer enclosure/stand 300 between the first base surface 304, the second base surface 306, and the tablet computer enclosure/stand 308. In the illustrated embodiments discussed below, the channel 312 extends through the tablet computer enclosure/stand 300 and may provide storage for connector cables that are connected to the tablet computer and may provide connectivity to power and/or accessory devices such that a printer, a bar code scanner, a register, a pin entry device, etc. However, a variety of other uses for the channel 312 are envisioned as falling within the scope of the present disclosure.

Figure 4A:
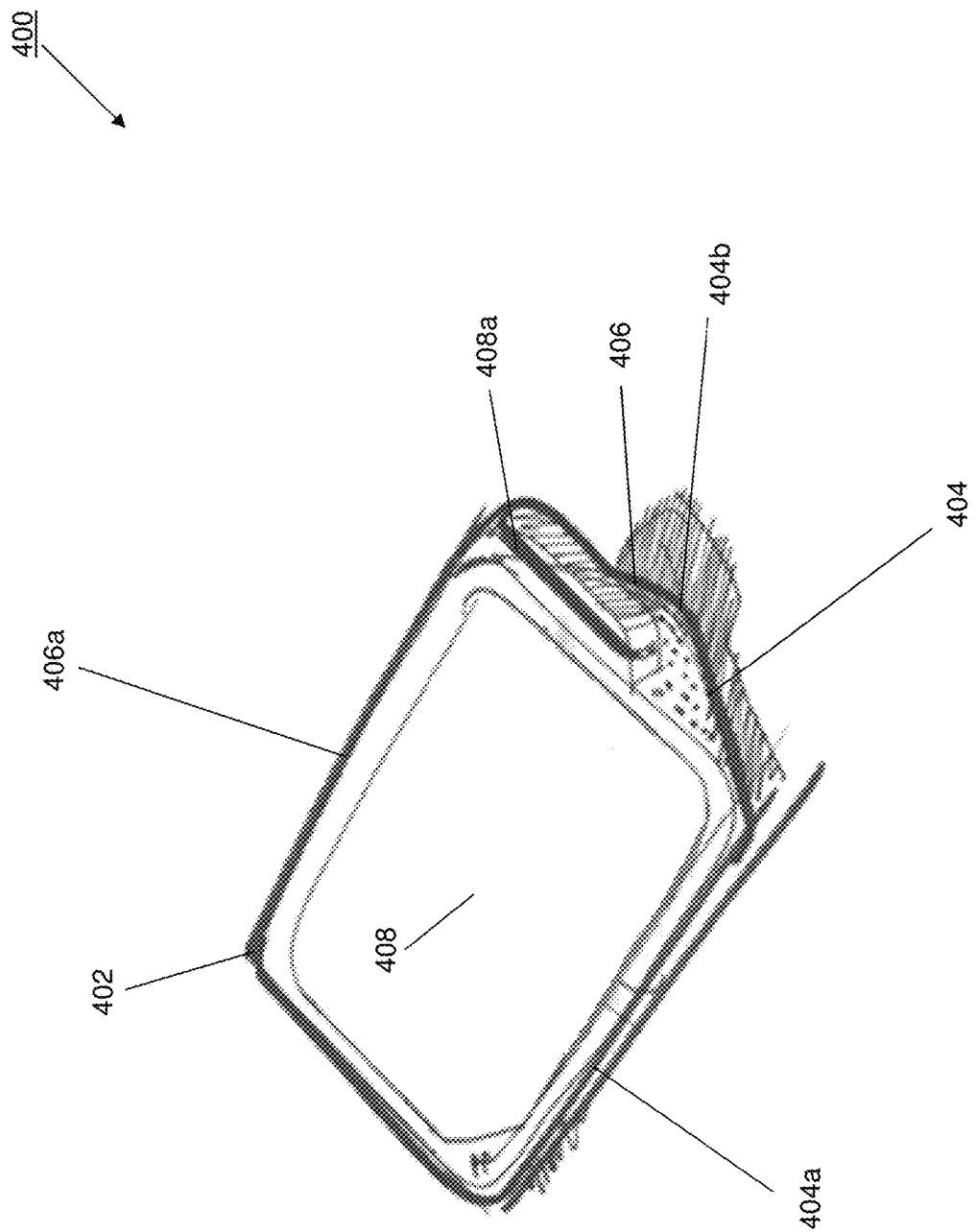
FIG. 4a is a front perspective view illustrating an embodiment of the tablet computer enclosure/stand of FIG. 2.
Figure 4B:
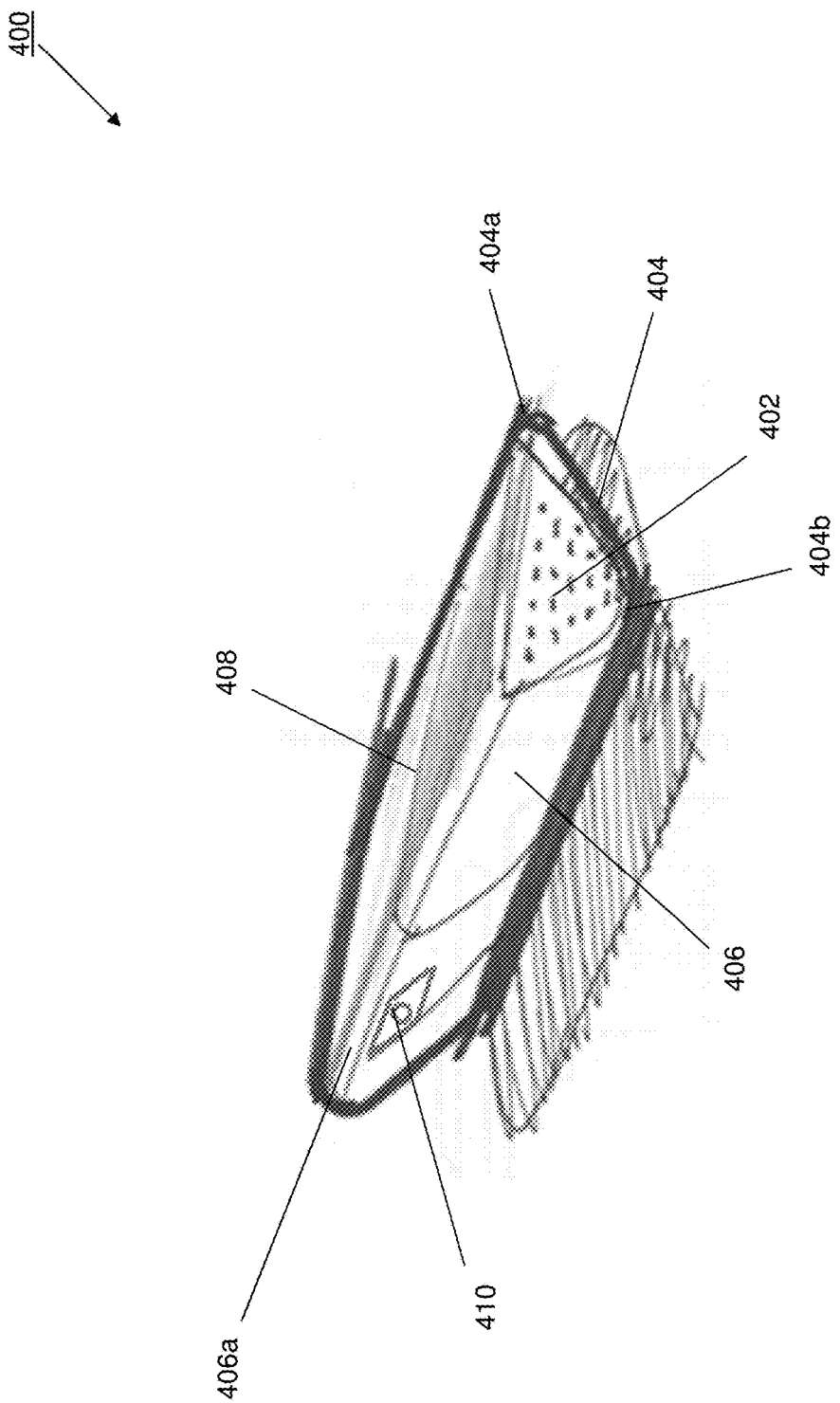
FIG. 4b is a rear perspective view illustrating an embodiment of the tablet computer enclosure/stand of FIG. 2.

Referring now to FIGS. 4a and 4b, an embodiment of a tablet computer enclosure/stand 400 is illustrated that may be the tablet computer enclosure/stand 200 discussed above with reference to FIG. 2. The tablet computer enclosure/stand 400 includes a base 402 having a triangular cross section, as illustrated. The base 402 includes a first base surface 404 having a first edge 404a and a second edge 404b that is located opposite the first base surface 404 from the first edge 404a. The base 402 also includes a second base surface 406 that shares the second edge 404b (the "common" edge between the first base surface 404 and the second base surface 406) and includes a third edge 406a that is located opposite the second base surface 406 from the second edge 404b. A computer housing 408 extends between the first edge 404a and the third edge 406a, and as discussed above can either include an integrated computing device, or provide a tablet computer housing 408 for the tablet computer 100 as illustrated and described below. The tablet computer housing 408 also includes a card reading slot 408a that provides access to a card reading device (not illustrated) in the tablet computer enclosure/stand 400. The tablet computer enclosure/stand 400 also includes a scanning device 410 that is located on the second base surface 406. In the illustrated embodiment, the base 402 of the tablet computer enclosure/stand 400 is solid, but may include, for example, storage compartments, data connectors, and/or other features while remaining within the scope of the present disclosure.

Figure 5:
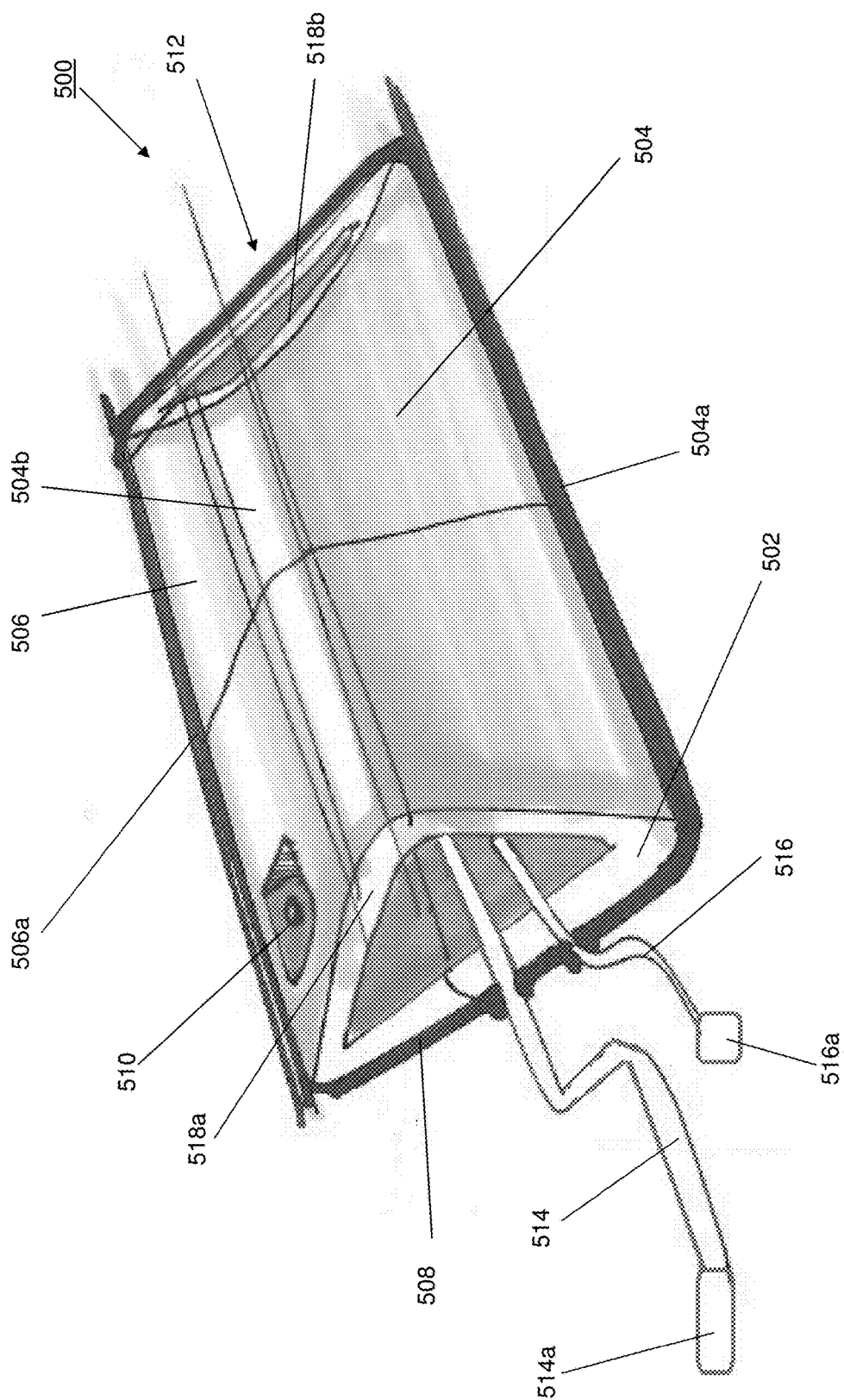
FIG. 5 is a rear perspective view illustrating an embodiment of the tablet computer enclosure/stand of FIG. 2.

Referring now to FIG. 5, an embodiment of a tablet computer enclosure/stand 500 is illustrated that may be the tablet computer enclosure/stand 200 discussed above with reference to FIG. 2 in a "face down" orientation. The tablet computer enclosure/stand 500 includes a base 502 having a triangular cross section, as illustrated. The base 502 includes a first base surface 504 having a first edge 504a and a second edge 504b that is located opposite the first base surface 504 from the first edge 504a. The base 502 also includes a second base surface 506 that shares the second edge 504b (the "common" edge between the first base surface 504 and the second base surface 506) and includes a third edge 506a that is located opposite the second base surface 506 from the second edge 504b. A computer housing 508 extends between the first edge 504a and the third edge 506a, and as discussed above can either include an integrated computing device, or provide a tablet computer housing 508 for the tablet computer 100 as illustrated and described below. The tablet computer enclosure/stand 500 also includes a scanning device 510 (or aperture for a camera on a tablet computer) that is located adjacent the second base surface 506. A channel 512 is defined by the tablet computer enclosure/stand 500 between the first base surface 504, the second base surface 506, and the tablet computer enclosure/stand 508. In the illustrated embodiments discussed below, the channel 512 extends through the tablet computer enclosure/stand 500 and may provide storage for connector cables 514 and 516 having connectors 514a and 516a, respectively, or access to connections for connector cables that may connects to power or accessory devices, discussed above. However, a variety of other uses for the channel 512 are envisioned as falling within the scope of the present disclosure. The opposing edges of the first base surface 504, the second base surface 506, and the tablet computer housing 508 are configured to provide vertical/portrait orientation surfaces 518a and 518b, discussed in further detail below.

Figure 6:
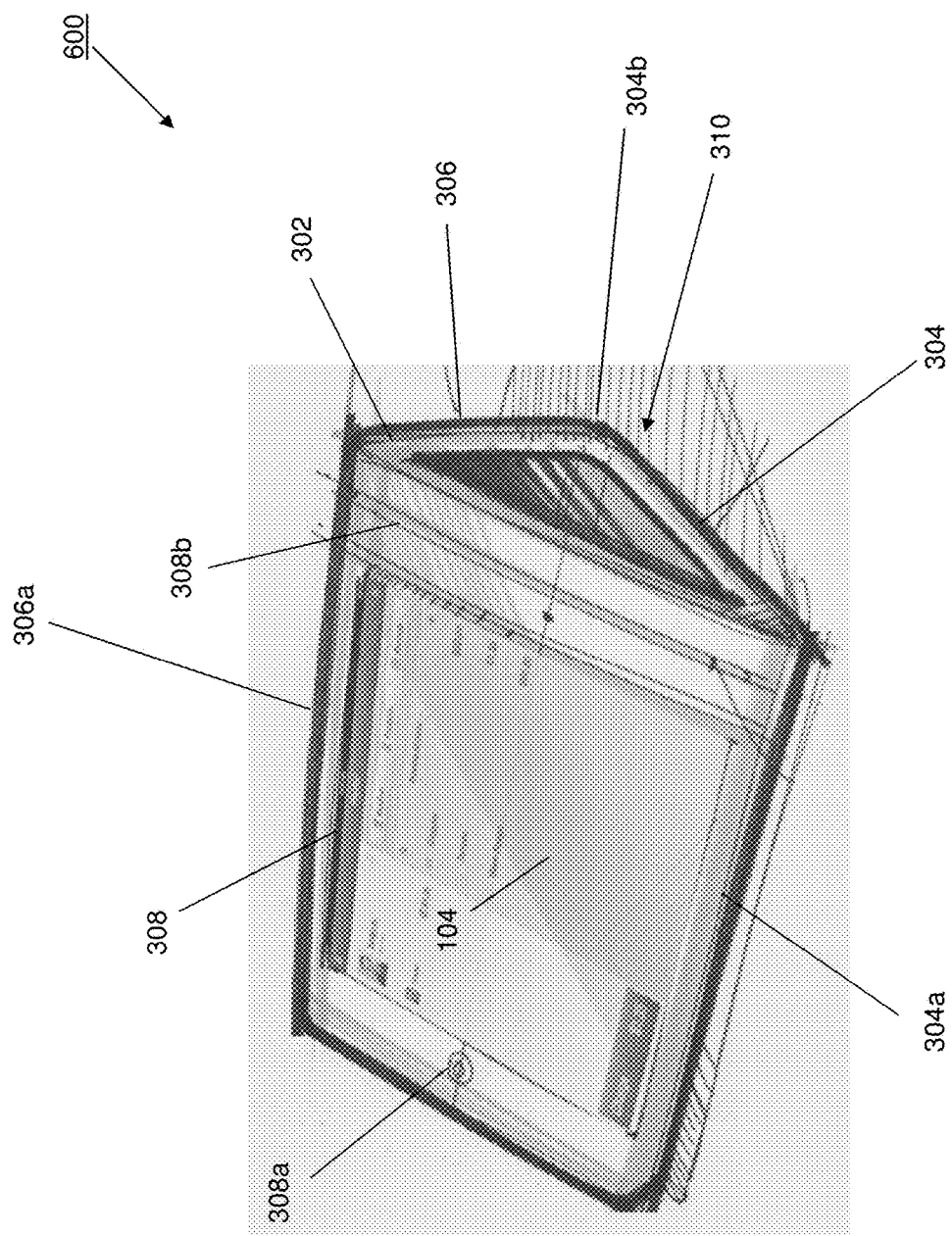
FIG. 6 is a perspective view illustrating the tablet computer enclosure/stand of FIG. 3a housing the tablet computer of FIG. 1 that is displaying a merchant facing software interface.

Referring now to FIGS. 1, 3a, and 6, an embodiment of a rocker POS tablet 600 is illustrated. In the illustrated embodiment, the rocker POS tablet 600 is provided by positioning the tablet computer 100, described above with reference to FIG. 1, in the tablet computer housing 308 on the tablet computer enclosure/stand 300. In an embodiment, the tablet computer housing 308 may include an entrance, tablet computer retaining devices, and/or a variety of other features for coupling the tablet computer 100 to the tablet computer housing 308. In one example, the positioning of the tablet computer 100 in the tablet computer housing 308 causes the engagement of the data connector 108 on the tablet computer 100 with a data connector (not illustrated) in the tablet computer housing 308 to communicatively couple the tablet computer 100 (e.g., a processing system in the tablet computer 100) to devices on the tablet computer enclosure/stand 300 (e.g., the scanning device 310, the card reading device in the card reading slot 308b, connectors cables stored in the channel 312, etc.) In other embodiments, the tablet computer 100 may communicate wirelessly with devices on the tablet computer enclosure/stand 300. In the illustrated embodiment, the tablet computer 100 is illustrated as providing a screen (e.g., a merchant screen, a customer screen, etc.) on the tablet computer display 104. In an embodiment, the rocker POS tablet 600 may include a base accessory that allows the tablet computer enclosure/stand 300 to be secured. For example, the base accessory may secure to a table or other relatively immobile object, and the tablet computer enclosure/stand 300 may then secure (e.g., "snap in") to that base accessory to prevent theft of the rocker POS tablet.

Figure 7:
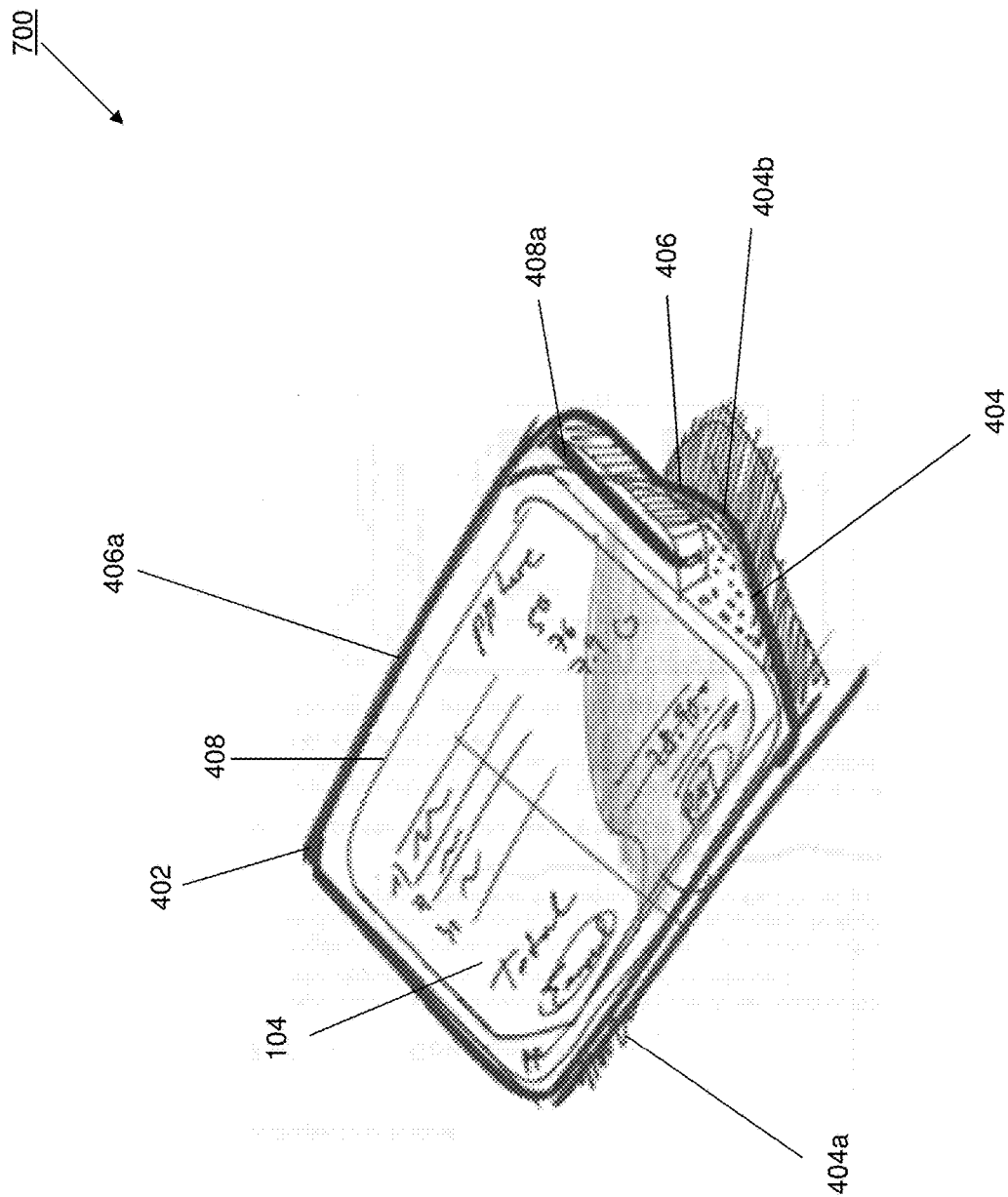
FIG. 7 is a perspective view illustrating the tablet computer enclosure/stand of FIG. 4a housing the tablet computer of FIG. 1.

Referring now to FIGS. 1, 4a, and 7, an embodiment of a rocker POS tablet 700 is illustrated. In the illustrated embodiment, the rocker POS tablet 700 is provided by positioning the tablet computer 100, described above with reference to FIG. 1, in the tablet computer housing 408 on the tablet computer enclosure/stand 400. In an embodiment, the tablet computer housing 408 may include an entrance, tablet computer retaining devices, and/or a variety of other features for coupling the tablet computer 100 to the tablet computer housing 408. In one example, the positioning of the tablet computer 100 in the tablet computer housing 408 causes the engagement of the data connector 108 on the tablet computer 100 with a data connector (not illustrated) in the tablet computer housing 408 to communicatively couple the tablet computer 100 (e.g., a processing system in the tablet computer 100) to devices on the tablet computer enclosure/stand 400 (e.g., the scanning device 410, the card reading device in the card reading slot 408a, etc.) In other embodiments, the tablet computer 100 may communicate wirelessly with devices on the tablet computer enclosure/stand 400. In the illustrated embodiment, the tablet computer 100 is illustrated as providing a screen (e.g., a merchant screen a customer screen, etc.) on the tablet computer display 104.

Figure 8A:
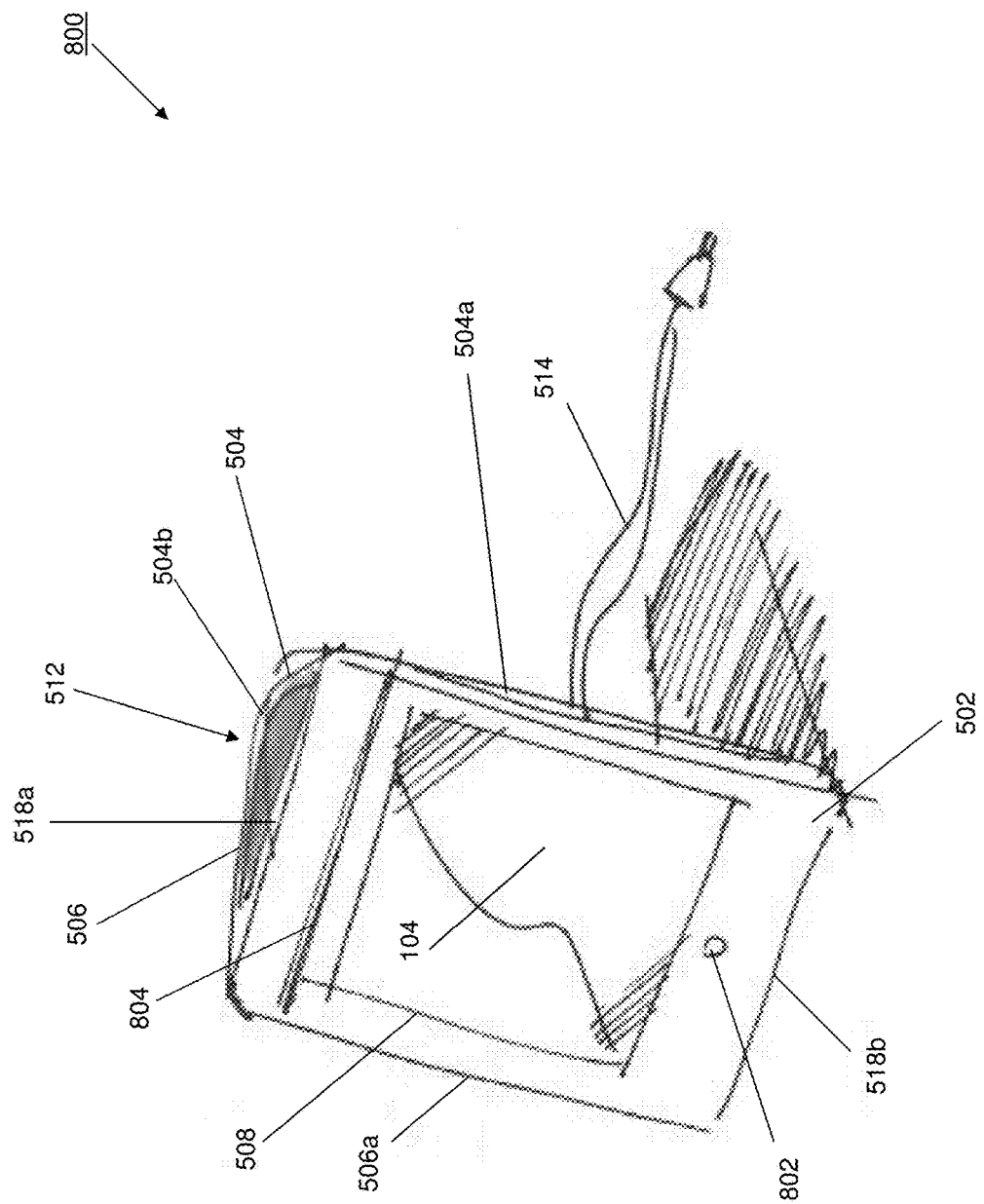
FIG. 8a is a perspective view illustrating the tablet computer enclosure/stand of FIG. 5 housing the tablet computer of FIG. 1.
Figure 8B:
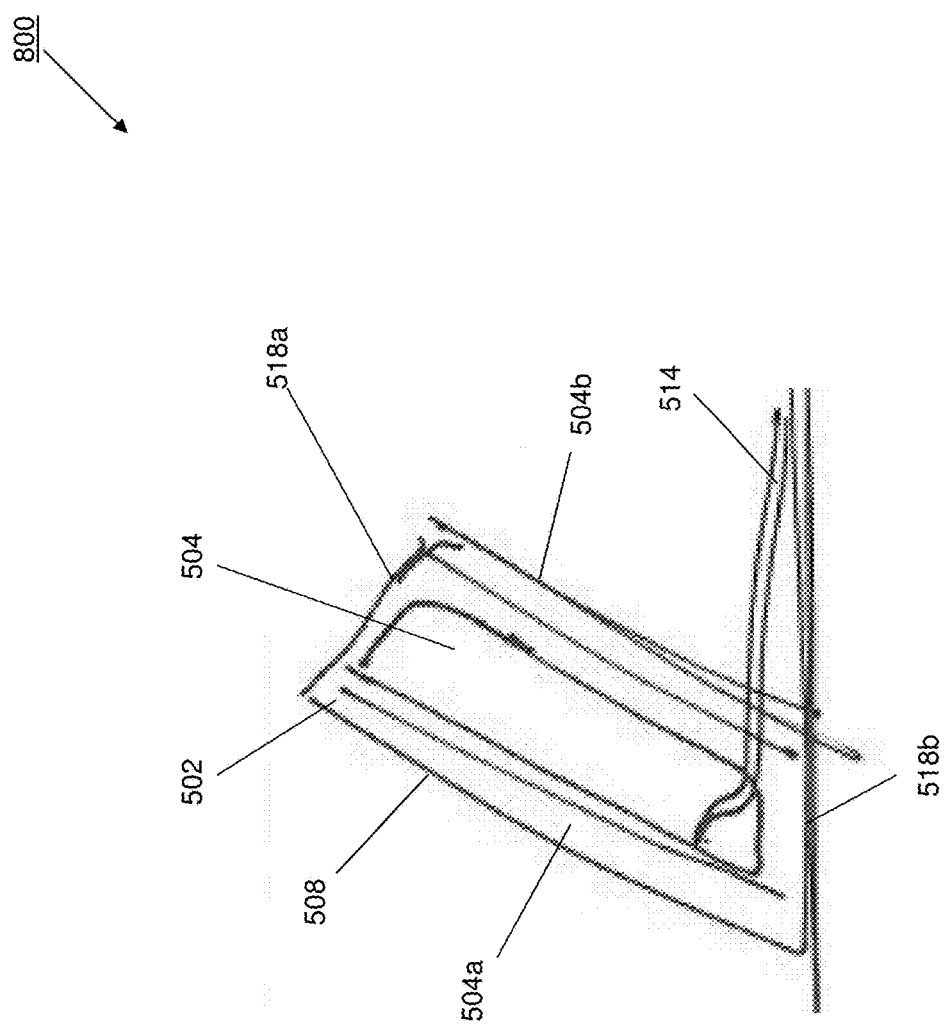
FIG. 8b is a side view illustrating the tablet computer enclosure/stand of FIG. 8a in a vertical/portrait orientation.

Referring now to FIGS. 1, 5, 8a, and 8b, an embodiment of a rocker POS tablet 800 is illustrated in a vertical/portrait orientation. In the illustrated embodiment, the rocker POS tablet 800 is provided by positioning the tablet computer 100, described above with reference to FIG. 1, in the tablet computer housing 508 on the tablet computer enclosure/stand 500. In an embodiment, the tablet computer housing 508 may include an entrance, tablet computer retaining devices, and/or a variety of other features for coupling the tablet computer 100 to the tablet computer housing 508. In one example, the positioning of the tablet computer 100 in the tablet computer housing 508 causes the engagement of the data connector 108 on the tablet computer 100 with a data connector (not illustrated) in the tablet computer housing 508 to communicatively couple the tablet computer 100 (e.g., a processing system in the tablet computer 100) to devices on the tablet computer enclosure/stand 400 (e.g., the scanning device 410, the card reading device in the card reading slot 408a, the connector cables 514 and 516, etc.) In other embodiments, the tablet computer 100 may communicate wirelessly with devices on the tablet computer enclosure/stand 500. In the illustrated embodiment, the tablet computer 100 is illustrated as providing a screen (e.g., a merchant screen a customer screen, etc.) on the tablet computer display 104. FIGS. 8a and 8b illustrate how the vertical/portrait orientation surfaces 518a and 518b are configured to support the rocker POS tablet 800 in a vertical orientation. In the embodiments illustrated and discussed below, the merchant orientation and the customer orientation are provided in a horizontal/landscape orientation of the tablet computer 100, and the vertical/portrait orientation may be defined differently from the first/merchant orientation and the second/customer orientation discussed below such that different information is displayed on the tablet computer display 104 when the rocker POS tablet 800 is in the vertical/portrait orientation (e.g., images may be provided, welcome screens may be provided, etc.) For example, the vertical/portrait orientation of the tablet computer enclosure/stand 500 may be defined as a customer mode that only provides customer screens in interacting with the tablet computer. In addition, multiple different modes may be enabled in the two available vertical/portrait orientations, thus allowing 4 different modes for different orientations of the rocker POS tablet 800.

Figure 9:
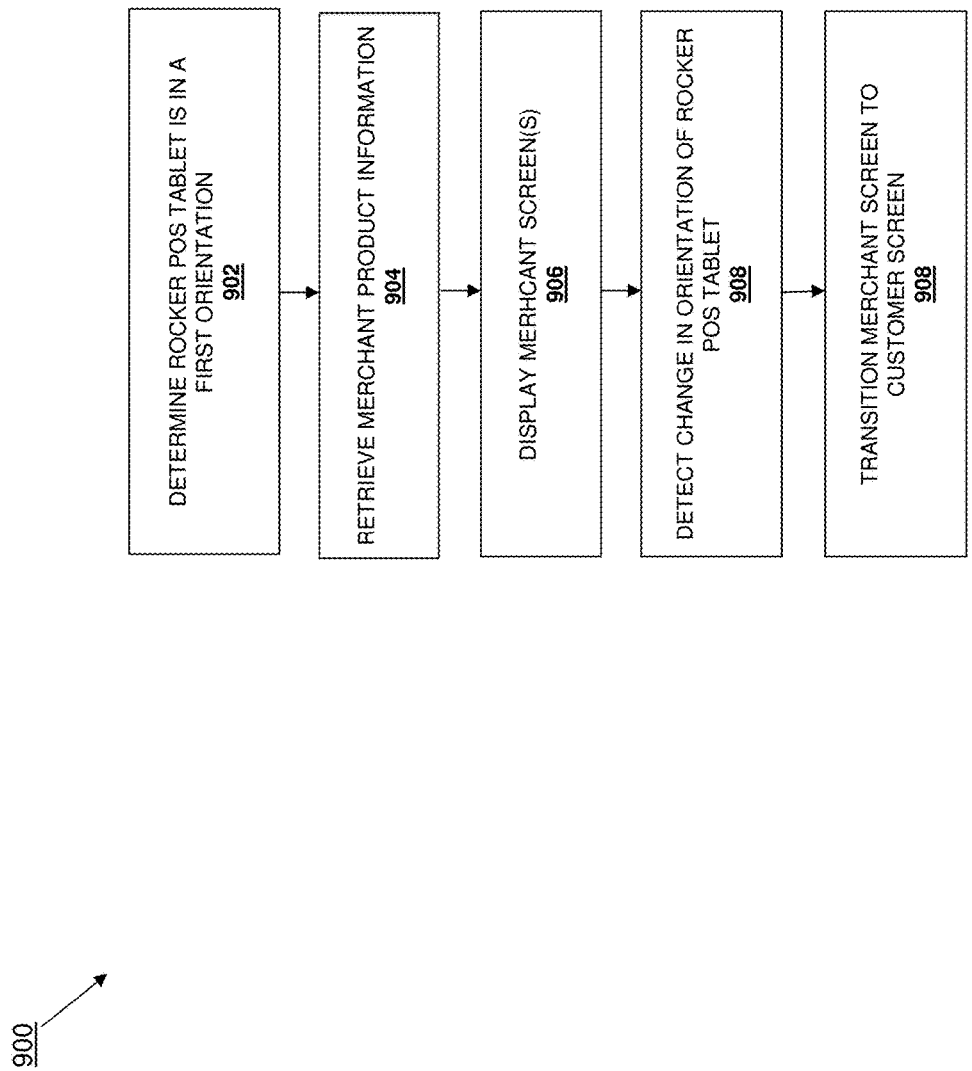
FIG. 9 is a flow chart illustrating an embodiment of a method for providing merchant/customer interaction.

Referring now to FIG. 9, a method for 900 providing merchant/customer interactions is illustrated. The method 900 described and illustrated below may be performed with any of the rocker POS tablets 600, 700, or 800, and/or a rocker POS tablet that includes any combinations of the features of the rocker POS tablets 600, 700, or 800. In the discussions below, FIGS. 10a-k illustrate a merchant/customer payment interaction enabled by the method 900, while FIGS. 11a-k illustrate a merchant/customer service interaction enabled by the method 900. However, one of skill in the art in possession of the present disclosure will recognize that a wide variety of other merchant/customer interactions will fall within its scope.

Figure 10A:
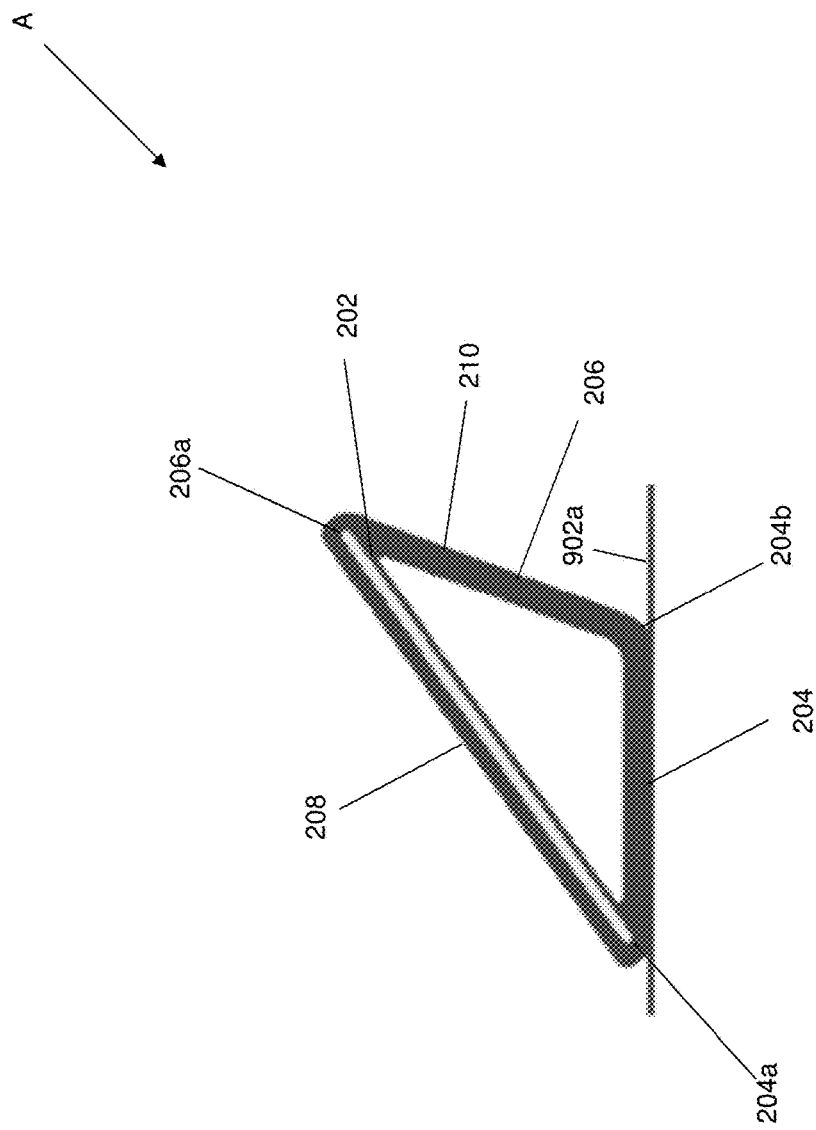
FIG. 10a is a side view illustrating an embodiment of the tablet computer enclosure/stand of FIG. 2 positioned on a support surface in a merchant orientation.

Referring first to FIGS. 10a-k, an embodiment of the method 900 begins at block 902 where a rocker POS tablet is determined to be in a first orientation. FIGS. 10a-e illustrate the tablet computer enclosure/stand 200/POS rocker tablet 300 in a first orientation A that is referred to below as a merchant orientation A. In the merchant orientation A, the tablet computer enclosure/stand 200/POS rocker tablet 300 is positioned on a support surface 902a such that the first base surface 204/304 engages the support surface 902a, as illustrated in FIG. 10a. The tablet computer 100 and/or the tablet computer enclosure/stand 200 or 300 may include an orientation determination device such as, for example, a gyroscope, an accelerometer, a camera, combinations thereof, and/or a variety of other devices known in the art that provide data that may be processed to determine an orientation or a change in orientation of the tablet computer 100. In an embodiment of block 902, the processing system in the tablet computer 100 may retrieve orientation information from the orientation determination device(s), and reference a database in a non-transitory, computer-readable medium that stores merchant orientation information and customer orientation information.

In an embodiment, a user of the rocker POS tablet 600 may define the merchant orientation A with merchant orientation information that provides the orientation data associated with the rocker POS tablet 600 when in the first base surface 204 is laid flat on the support surface 902a. For example, when the tablet computer 100 in the tablet computer housing 208 is oriented at the angle to the support surface 902a illustrated in FIG. 10c, that tablet computer 100 is associated with particular orientation data, and that orientation data may be defined as the merchant orientation A and stored in the database. Thus, at block 902, the orientation determination device(s) in the tablet computer 100 may provide orientation data that describes the angle that the tablet computer 100 is oriented at relative to the support surface 902a, and the processor in the tablet computer 100 may determine that that orientation data is associated with the merchant orientation A in the database.

In an embodiment, the merchant orientation information associated with the merchant orientation A in the database provides information on how a variety of information should be displayed on the tablet computer display 104. For example, the merchant orientation information may define which types of information may be displayed, how that information may be displayed, which types of information are accessible. The merchant orientation information is used in the systems and methods described herein to provide merchant users the ability to access and view information that is meant for the merchant users, but not for customer users. As such, the merchant orientation information may ensure that data retrieved by merchant users is displayed in a manner that provides the merchant users with the ability to quickly and easily sort through product data, process a purchase, and/or provide a number of other merchant actions known in the art.

Figure 10B:
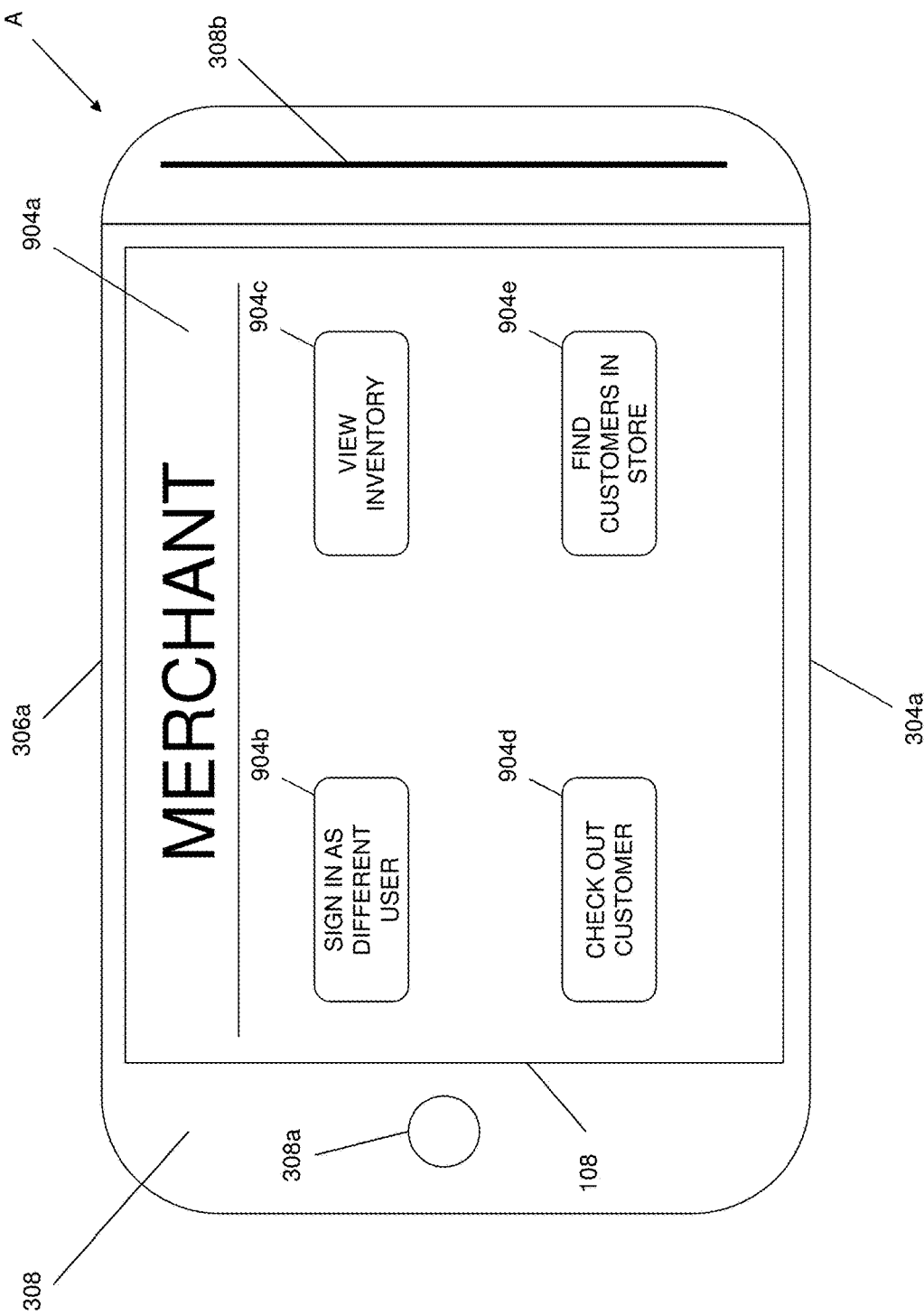
FIG. 10b is a screen shot illustrating an embodiment of a merchant home screen after a user has logged into the system.

The method 900 then proceeds to block 904 where merchant product information is retrieved. In an embodiment, while in the merchant orientation A, instructions may be received through the tablet computer 100. For example, the tablet computer display 104 may be a touch screen display that allows a user to provide inputs that may be interpreted as instructions to retrieve merchant product information, perform payment functions, and/or perform a variety of other functions known in the art. Referring now to FIG. 10b, the rocker POS tablet 600 is illustrated displaying a merchant home screen 904a while in the merchant orientation A. In an embodiment, when the tablet computer enclosure/stand 200/rocker POS tablet 600 is positioned in the merchant orientation A, the tablet computer 100 may operate to display the merchant home screen 904a according to the merchant orientation information. To contrast, when the rocker POST tablet 600 is in the customer orientation discussed below, a customer home screen may be displayed that is different from the merchant home screen 904a and includes, for example, a customer kiosk screen that allows a customer to browse through products offered at the physical merchant location.

In the illustrated embodiment, the merchant home screen 904a includes a plurality of rocker POS tablet functionality buttons, including a user sign in button 904b, a view inventory button 904c, a check-out customer button 904c, and a find customer button 904d. For example, in the illustrated embodiment, a user of the rocker POS tablet 600 may be logged in, and the user sign in button 904b may be selected to log that user out and log in a different user. In another example, the view inventory button 904c may be selected to view merchant product information associated with an inventory at the physical merchant location, discussed in further detail below. In another example, the check-out customer button 904d may be selected to check a customer out when that customer is purchasing products and/or services (referred to henceforth as products), discussed in further detail below. In another example, the find customers in store button 904e may be selected to locate customers within the physical merchant location (e.g., customers that have "signed in" to a physical merchant location system that provides for the tracking of those customers). While a few examples have been provided, one of skill in the art will recognize that a variety of functionality may be provided on the merchant home screen 904a while remaining within the scope of the present disclosure.

Figure 10C:
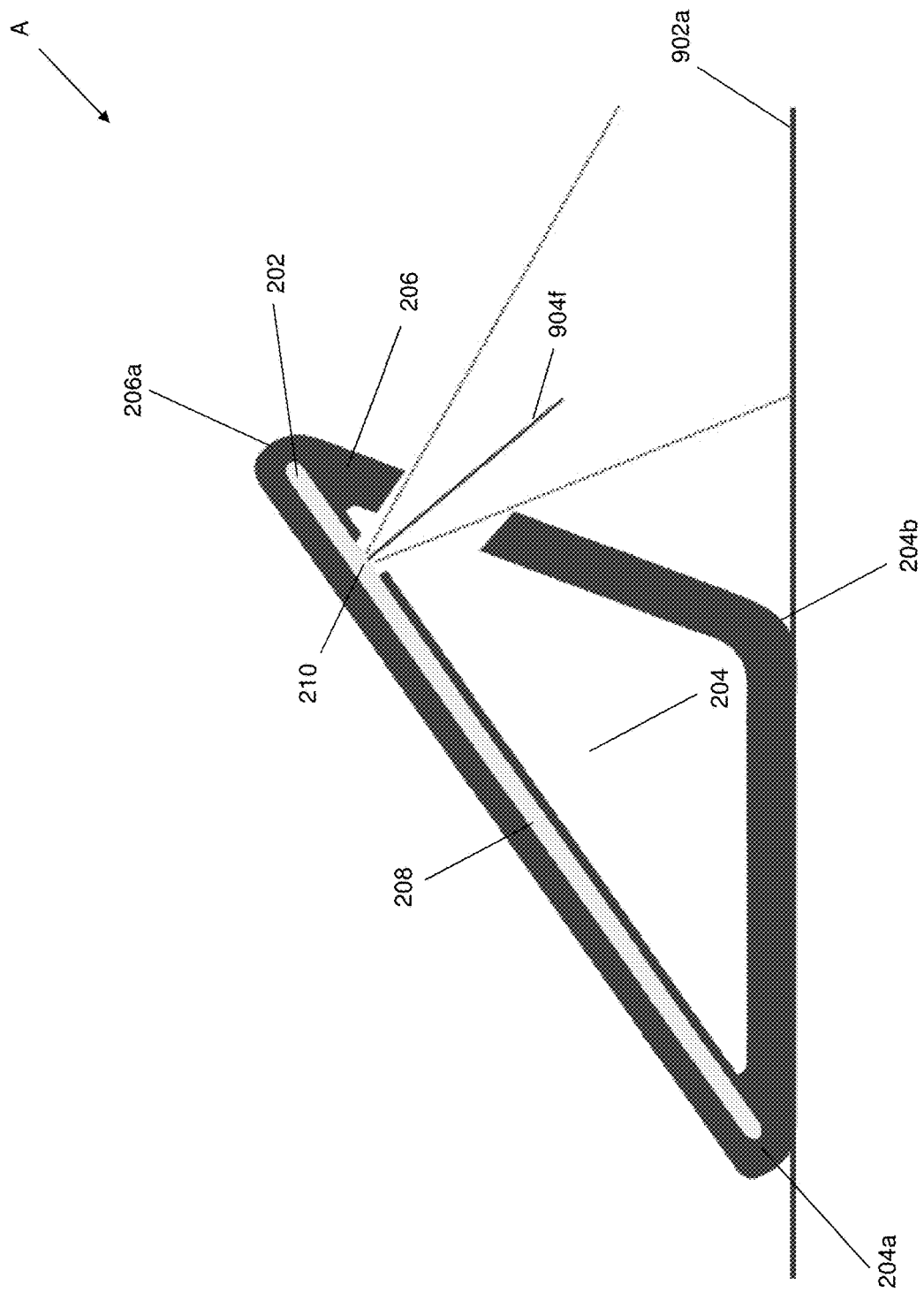
FIG. 10c is a side view illustrating an embodiment of the tablet computer enclosure/stand of FIG. 3b performing a scanning function.
Figure 10D:
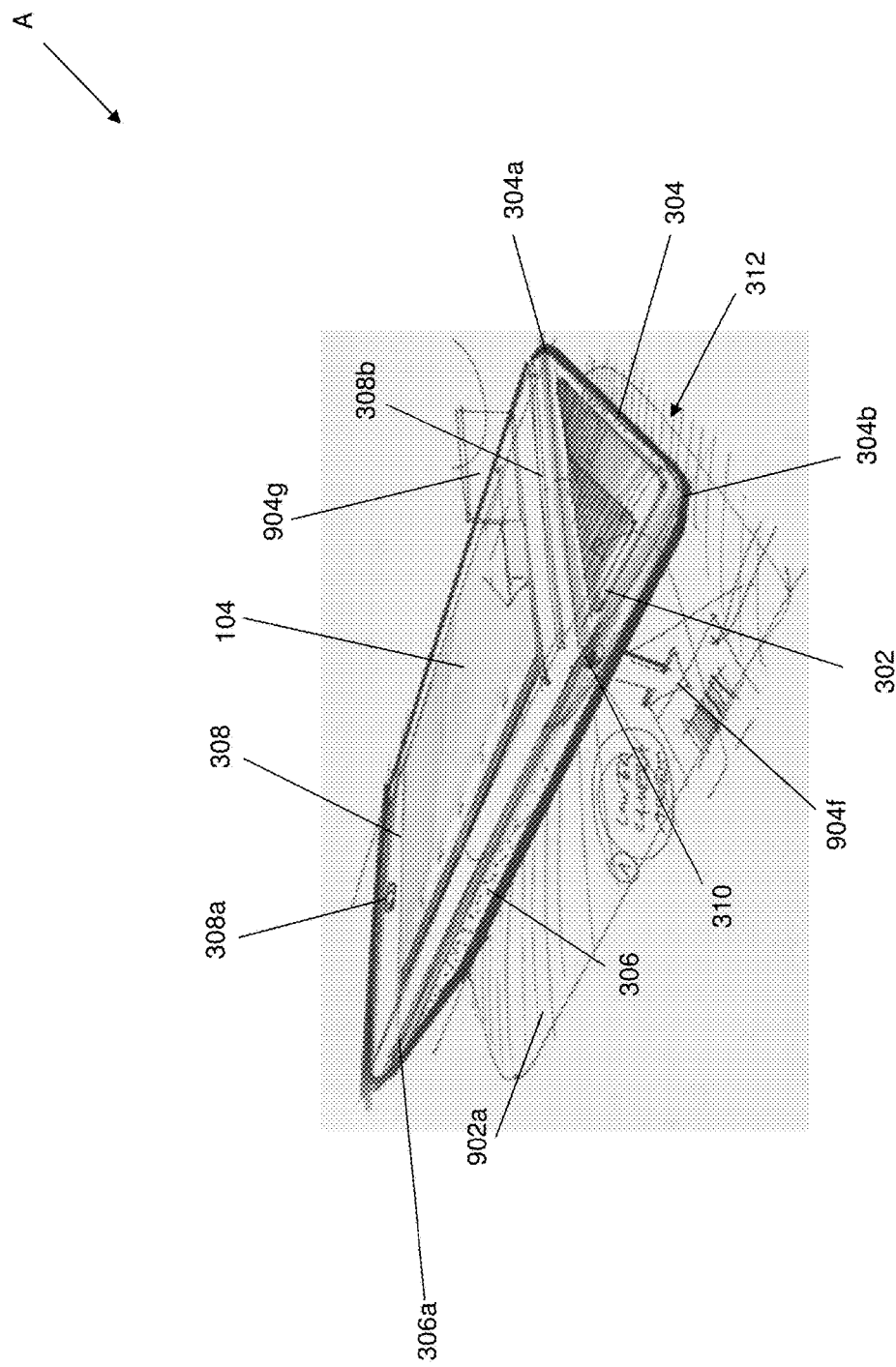
FIG. 10d is a perspective view illustrating an embodiment of the tablet computer enclosure/stand of FIG. 2 performing a scanning function and reading a card.

Referring now to FIGS. 10b and 10c, the merchant user of the rocker POS tablet 600 has selected the check-out customer button 904d on the merchant home screen 904a when the tablet computer enclosure/stand 200/rocker POS tablet 600 was in the merchant orientation A. In response, the scanning device 210 has been activated, illustrated in FIGS. 10c and 10d, to allow products to be scanned into the tablet computer 100 (e.g., by positioning products such that an identification code is located in a scanning field 904f). In this manner, products that the customer wishes to purchase may be scanned into the tablet computer 100 using the scanning device 310. In addition, one or more merchant screens may be provided on the rocker POS tablet 600 that allow the user to enter products into the tablet computer 100 (e.g., by selecting products displayed on the merchant screen). When all products are scanned or entered in, a credit card 904g of the customer may be run through the credit card slot 308b such that that credit card 904g is read by the credit card reader in the tablet computer enclosure/stand 302, as illustrated in FIG. 10d.

Figure 10E:
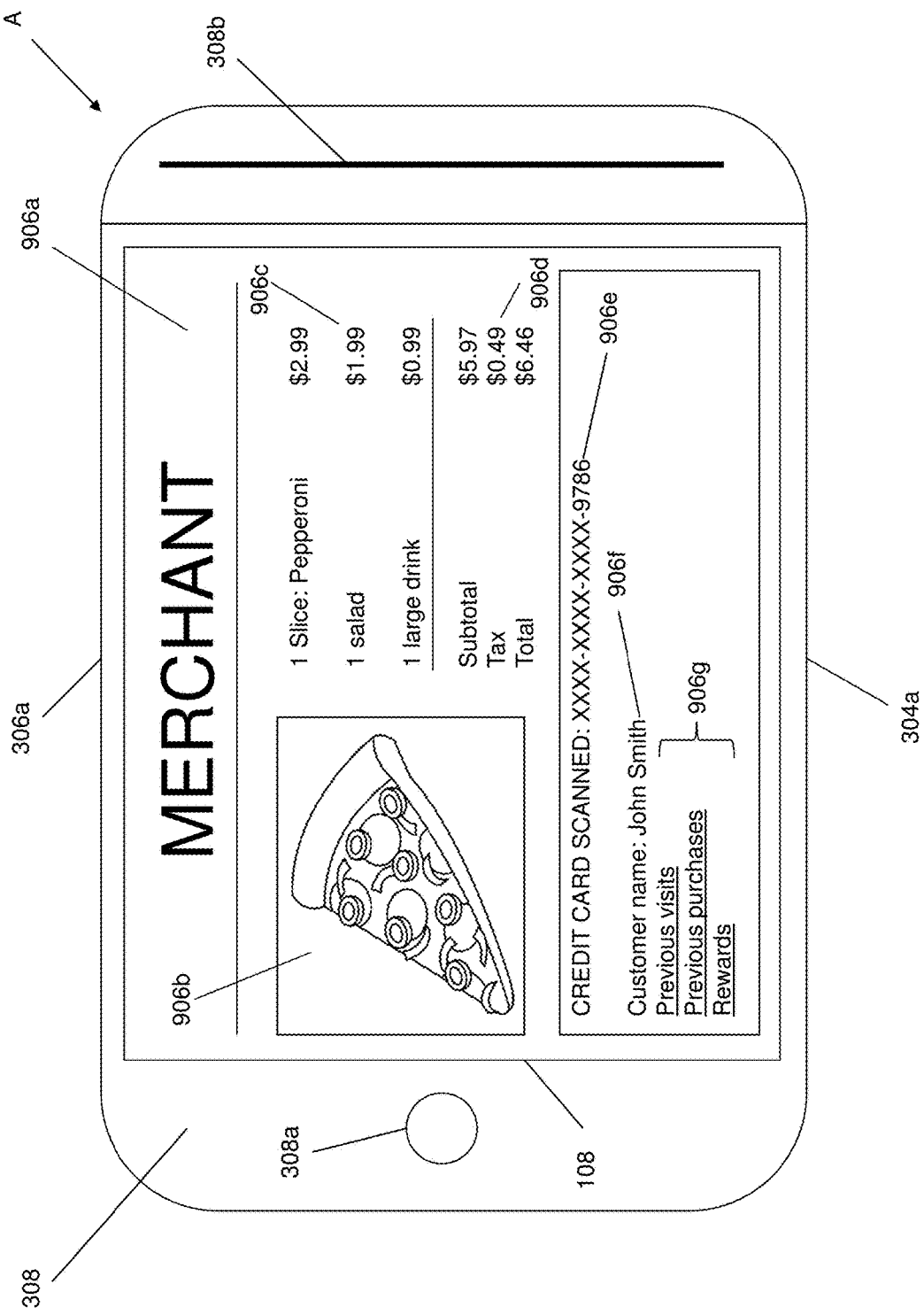
FIG. 10e is a screen shot illustrating an embodiment of a merchant screen displaying merchant product information according to merchant orientation information.

The method 900 then proceeds to block 906 where merchant screen(s) are displayed. In an embodiment, the instruction(s) received at block 904 may be used to retrieve merchant product information, customer information, and/or other information known in the art, and that retrieved information may be provided on a merchant screen according to the merchant orientation information. Referring now to FIG. 10e, the rocker POS tablet 600 is illustrated displaying a merchant screen 906a according to the merchant orientation information associated with the merchant orientation A in the database. The merchant screen 906a includes retrieved merchant product information such as a product image 906b, product purchase details 906c (e.g., product descriptions and price in the illustrated embodiment), and amount due information 906d. The merchant screen 906 also includes retrieved customer information such as a credit card number 906e, a customer name 906f (e.g., retrieved from a database using the credit card number 906e), and links 906g to information about the customers previous visits to the physical merchant location, previous purchases from the physical merchant location, and rewards from purchasing at the physical merchant location. Thus, while in the merchant orientation A, the merchant screen(s) provided include may include information only intended for viewing by the merchant user, such as credit card information, customer information collected by the merchant, and/or a variety of other merchant-intended information known in the art.

Figure 10G:
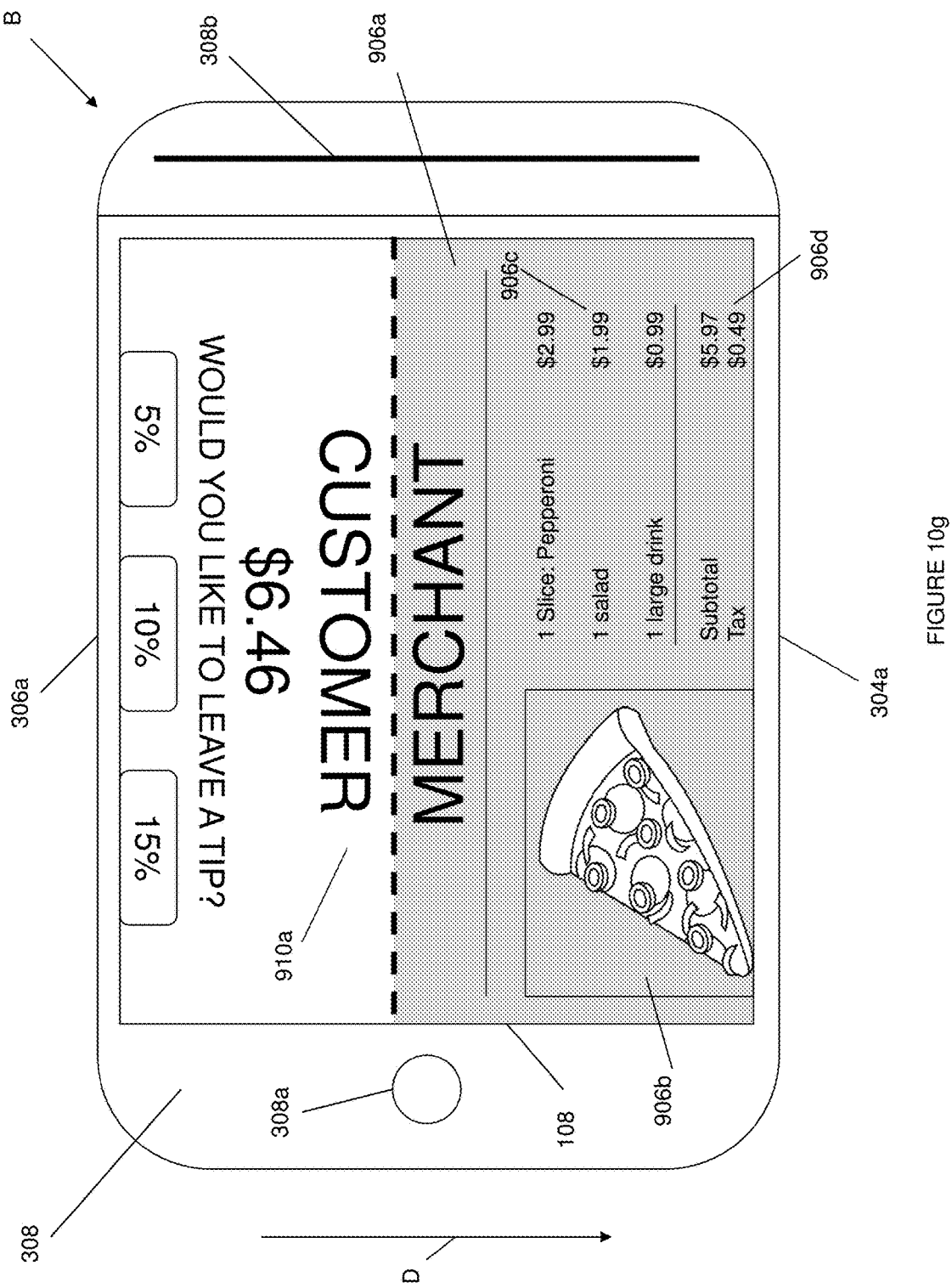
FIG. 10g is a screen shot illustrating an embodiment of the transition of a merchant screen to a customer screen.
Figure 10H:
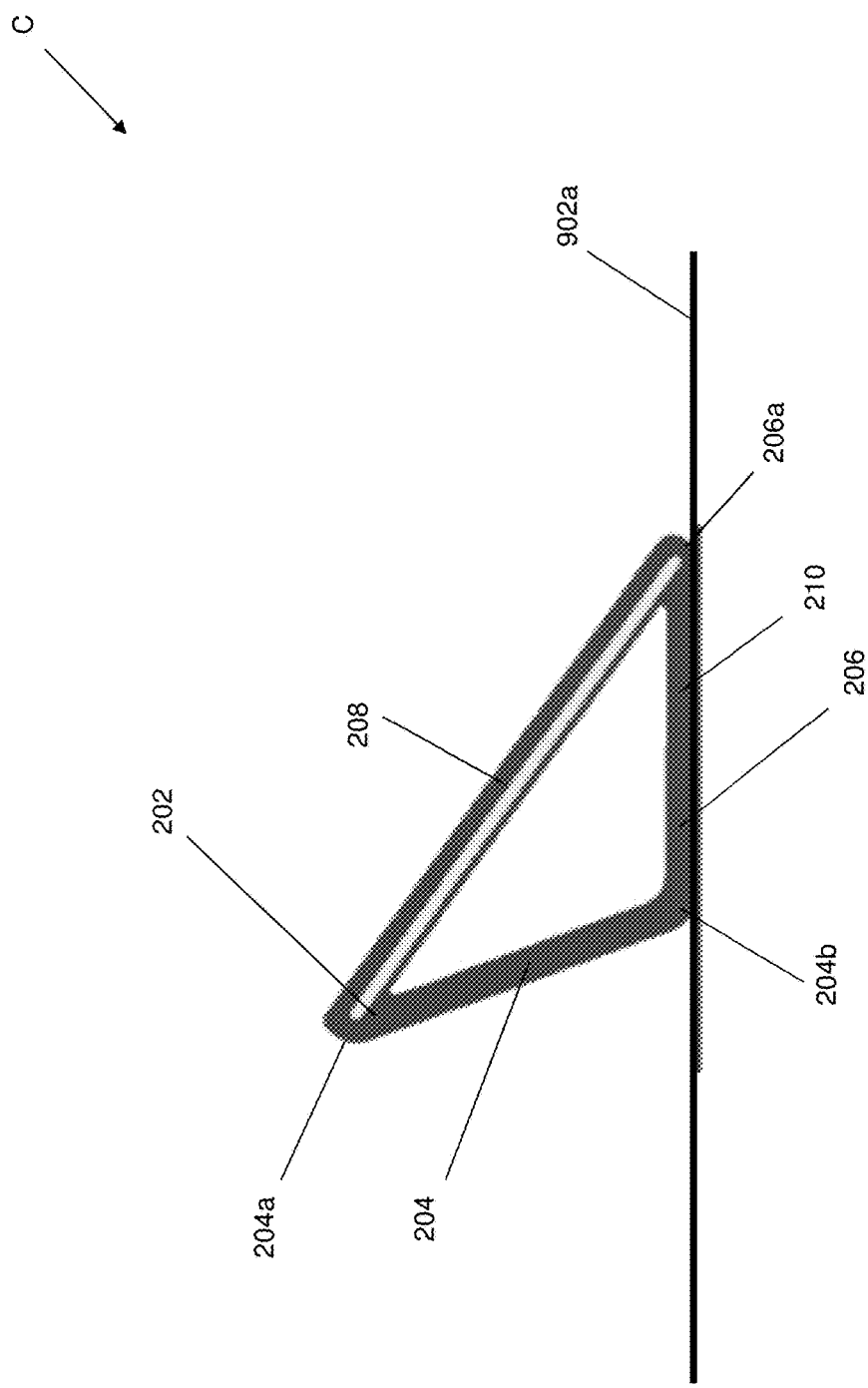
FIG. 10h is a side view illustrating an embodiment of the tablet computer enclosure/stand of FIG. 2 positioned on a support surface in a customer orientation.

The method 900 then proceeds to block 908 where a change in the orientation of the rocker POS tablet is detected. Referring to FIGS. 10f and 10h, when the user has completed merchant operations with the rocker POS tablet 600 in the merchant orientation A (e.g., scanning products, entering products, reading cards, etc.), the merchant user may rotate the rocker POS tablet to reorient the tablet computer enclosure/stand 200/rocker POS tablet 600 into a customer orientation C. FIG. 10f illustrates an embodiment of the change in orientation of the tablet computer enclosure/stand 200/rocker POS tablet 600 from the merchant orientation A to an intermediate orientation B by rotating the tablet computer enclosure/stand 200/rocker POS tablet 600 in the direction indicated in FIG. 10f about the engagement of the common/second edge 204b/304b and the support surface 902a. FIG. 10h illustrates an embodiment of the change in orientation of the tablet computer enclosure/stand 200/rocker POS tablet 600 from the intermediate orientation B to the customer orientation C by continuing to rotate the tablet computer enclosure/stand 200/rocker POS tablet 600 about the engagement of the common/second edge 204b/304b and the support surface 902a until the second base surface 206 engages the support surface 902a.

The method 900 then proceeds to block 910 where the merchant screen is transitioned to a customer screen. While discussed as separate method blocks, one of skill in the art will recognize that blocks 908 and 910 may occur substantially simultaneously. As discussed above, a user of the rocker POS tablet 600 may define the merchant orientation A with merchant orientation information that includes the orientation data associated with the rocker POS tablet 600 when in the first base surface 204 is laid flat on the support surface 902a. Similarly, the user of the rocker POS tablet 600 may define the customer orientation C with customer orientation information that includes the orientation data associated with the rocker POS tablet 600 when in the second base surface 206 is laid flat on the support surface 902a. For example, when oriented at an angle to the support surface 902a, the tablet computer 100 in the tablet computer housing 208 is associated with orientation data, and that orientation data may be defined as the customer orientation C and stored in the database. Thus, at block 910, the orientation determination device(s) in the tablet computer 100 may provide orientation data that describes the angle that the tablet computer 100 is oriented at relative to the support surface 902a, and the processor in the tablet computer 100 may determine that that orientation data is associated with a transition of the tablet computer 100 from the merchant orientation A to the customer orientation C.

In response to detecting the change in orientation of the tablet computer enclosure/stand 200/rocker POS tablet 600, the tablet computer 100 may operate to transition the merchant screen 906a to a customer screen 910a. FIG. 10g illustrates the rocker POS tablet 600 in the intermediate orientation B and transitioning from the merchant screen 906a to the customer screen 910a. In the illustrated embodiment, the merchant screen 906a and the customer screen 910a are positioned in a stacked orientation with (from the merchant user's point of view) the customer screen 910a stacked, upside down, on top of the merchant screen 906a, and during the transition of the tablet computer enclosure/stand 200/rocker POS tablet 600 from the merchant orientation A to the intermediate orientation B, the stacked merchant screen 906a/customer screen 910a are rendered by the tablet computer 100 such that they appear to move linearly in a direction D relative to the tablet computer display 104.

FIG. 10i illustrates the rocker POS tablet 600 in the customer orientation C and transitioned from the merchant screen 906a to the customer screen 910a. In the illustrated embodiment, the rocker POS tablet 600 is illustrated from the customer point of view, with the merchant screen 906a and the customer screen 910a positioned in a stacked orientation with (from the customer user's point of view) the merchant screen 906a stacked, upside down, on top of the customer screen 910a, and during the transition of the tablet computer enclosure/stand 200/rocker POS tablet 600 from the intermediate orientation B to the customer orientation C, the stacked merchant screen 906a/customer screen 910a are rendered by the tablet computer 100 such that they appear to move linearly in the direction D relative to the tablet computer display 104. In the embodiment illustrated in FIGS. 10g and 10i, the merchant screen 906a is at least partially obscured (e.g., greyed out in the illustrated embodiment) in response to changing the orientation of the tablet computer enclosure/stand 200/rocker POS tablet 600 from the merchant orientation A to the customer orientation C. For example, in the intermediate orientation B, the merchant screen 906a may be partially obscured or greyed out, while in the customer orientation C, the merchant screen 906a may be completely obscured or greyed out such that the customer may not see any information displayed on the merchant screen 906a.

Similarly to the merchant orientation information discussed above, the customer orientation information associated with the customer orientation C in the database provides information on how a variety of information should be displayed on the tablet computer display 104. For example, the customer orientation information may define which types of information may be displayed, how that information may be displayed, which types of information are accessible. The customer orientation information is used in the systems and methods described herein to provide customers with merchant product information in an easy to understand manner, and without the detail provided to the merchant users or including information meant for viewing by merchant users but not by customers. As such, the customer orientation information may ensure that merchant product information retrieved by merchant users is displayed to customers in a manner that provides the customers with the ability to quickly and easily understand what they are purchasing and how to complete the purchase.

Figure 10J:
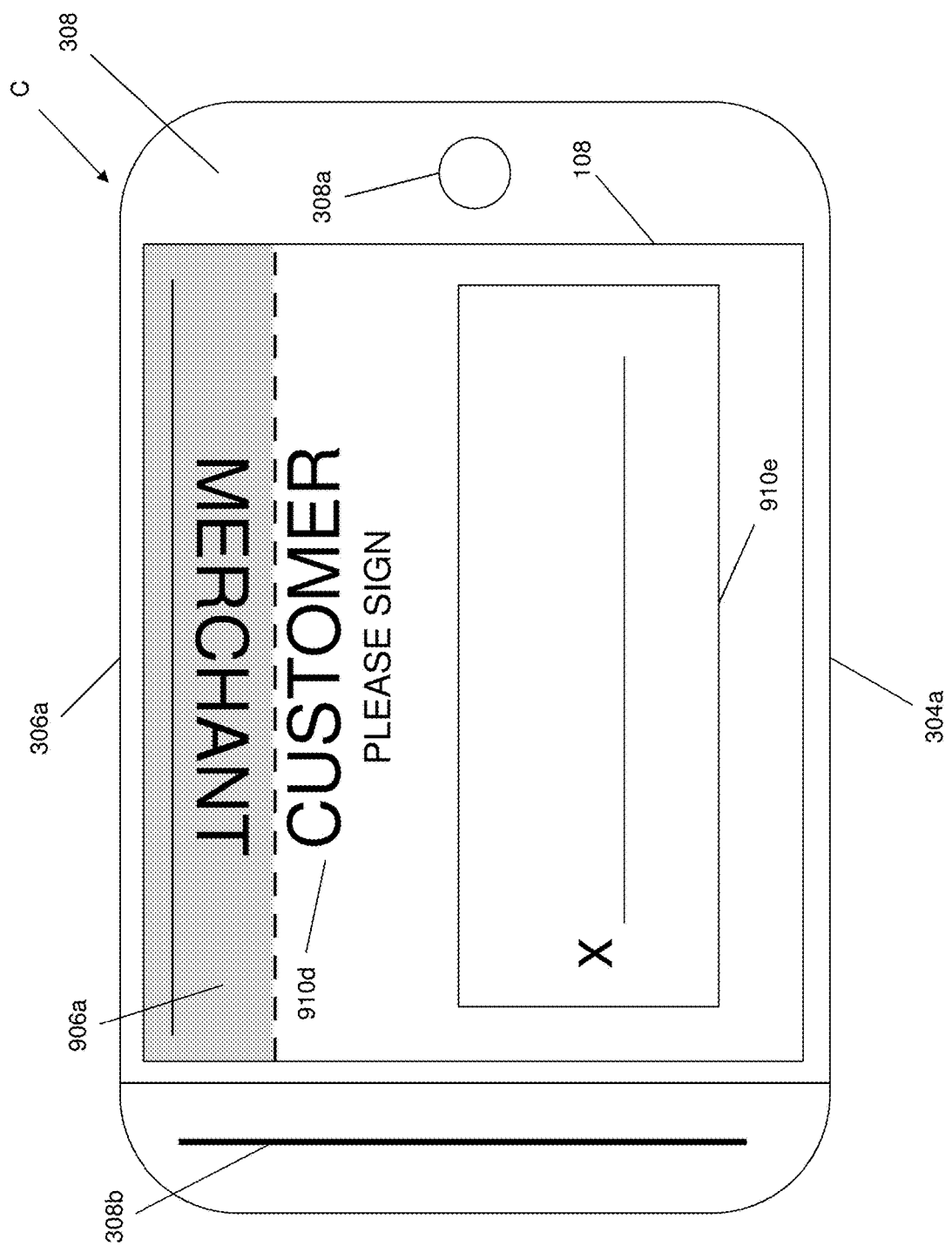
FIG. 10j is a screen shot illustrating an embodiment of a customer screen.
Figure 10K:
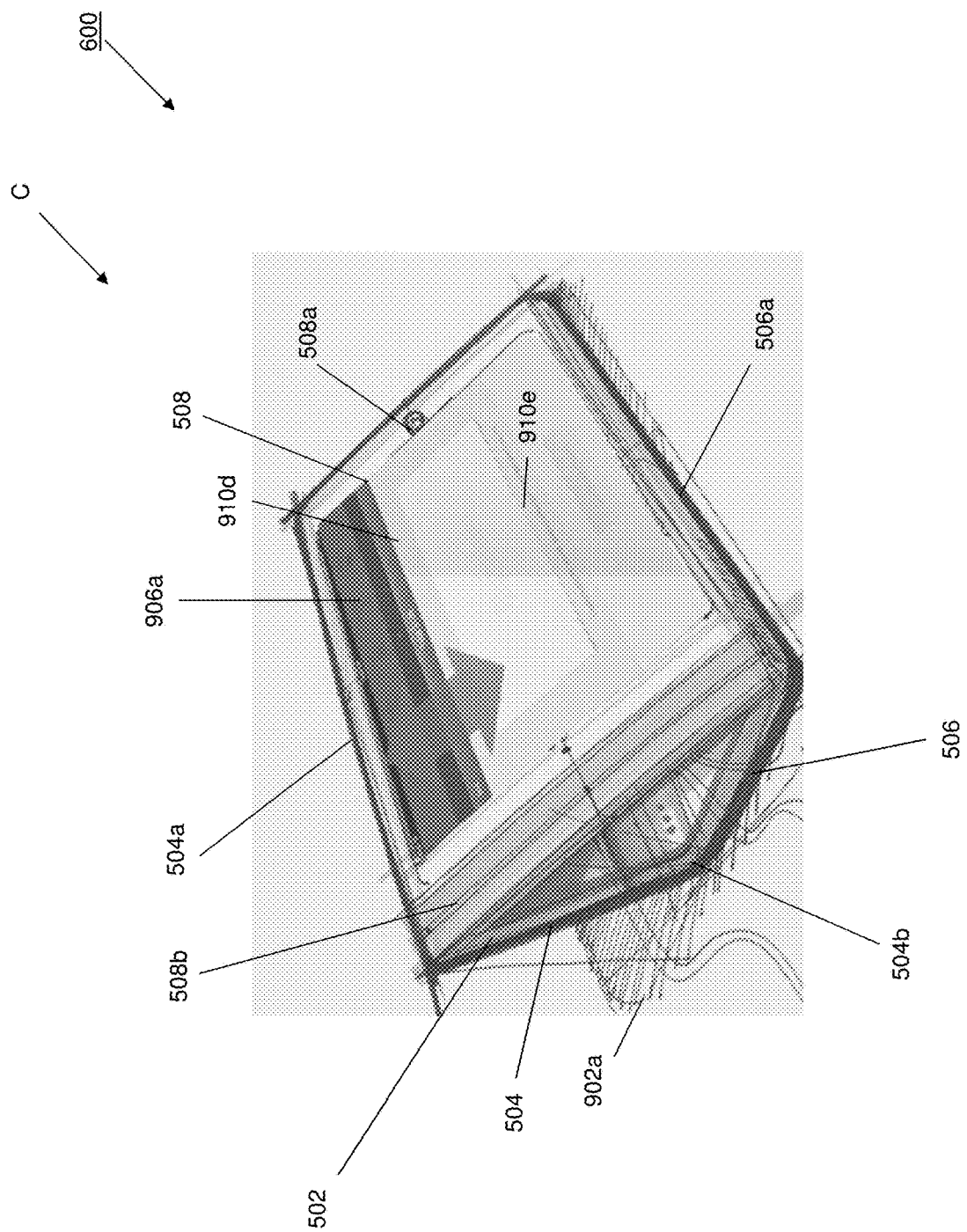
FIG. 10k is perspective view with a screen shot illustrating an embodiment of the tablet computer enclosure/stand and tablet computer of FIG. 6 displaying a customer screen.

In the embodiment illustrated in FIG. 10i, the customer screen 910a includes a total amount due 910b, along with a tip section 910c that allows the customer user to select a predetermined tip amount or provide a tip amount. In response to being provided the rocker POS tablet in the customer orientation C such that the customer screen 910a is displayed, the customer may select a tip amount in the tip section 910c such that a customer screen 910d is displayed, as illustrated in FIGS. 10j and 10k. The customer screen 910d provides a signing section 910e that allows the customer to provide their signature to complete the card purchase of the products from the merchant.

Thus, systems and methods for providing merchant/customer payment interactions have been described that utilize a rocker POS tablet that provides merchant screens while in a merchant orientation to allow the merchant to retrieve, collect, and compile product information for products the customer would like to purchase, and then translates to related, but different, customers screens when the rocker POS tablet is reoriented to a customer orientation in order to allow the customer to pay for those products. This combination of reorientation hardware and software provides for fluid and easy interactions between the merchant and the customer using the same tablet device, while ensuring information meant for the merchant is not displayed to the customer, by transitioning between merchant screens and customer screens that display similar information differently based on an orientation change and without the need to provide any other input to the rocker POS tablet. In the illustrated payment interaction example, the merchant user may scan or enter products, read credit card information, and retrieve customer information when the rocker POS tablet is in the merchant orientation, with all of that information displayed to the merchant user. Upon transition of the rocker POS tablet to the customer orientation, that information is modified according to the customer orientation information such that only information meant for the customer is displayed (e.g., an amount due, an ability to provide a tip amount, and the ability to provide a signature.)

Figure 11A:
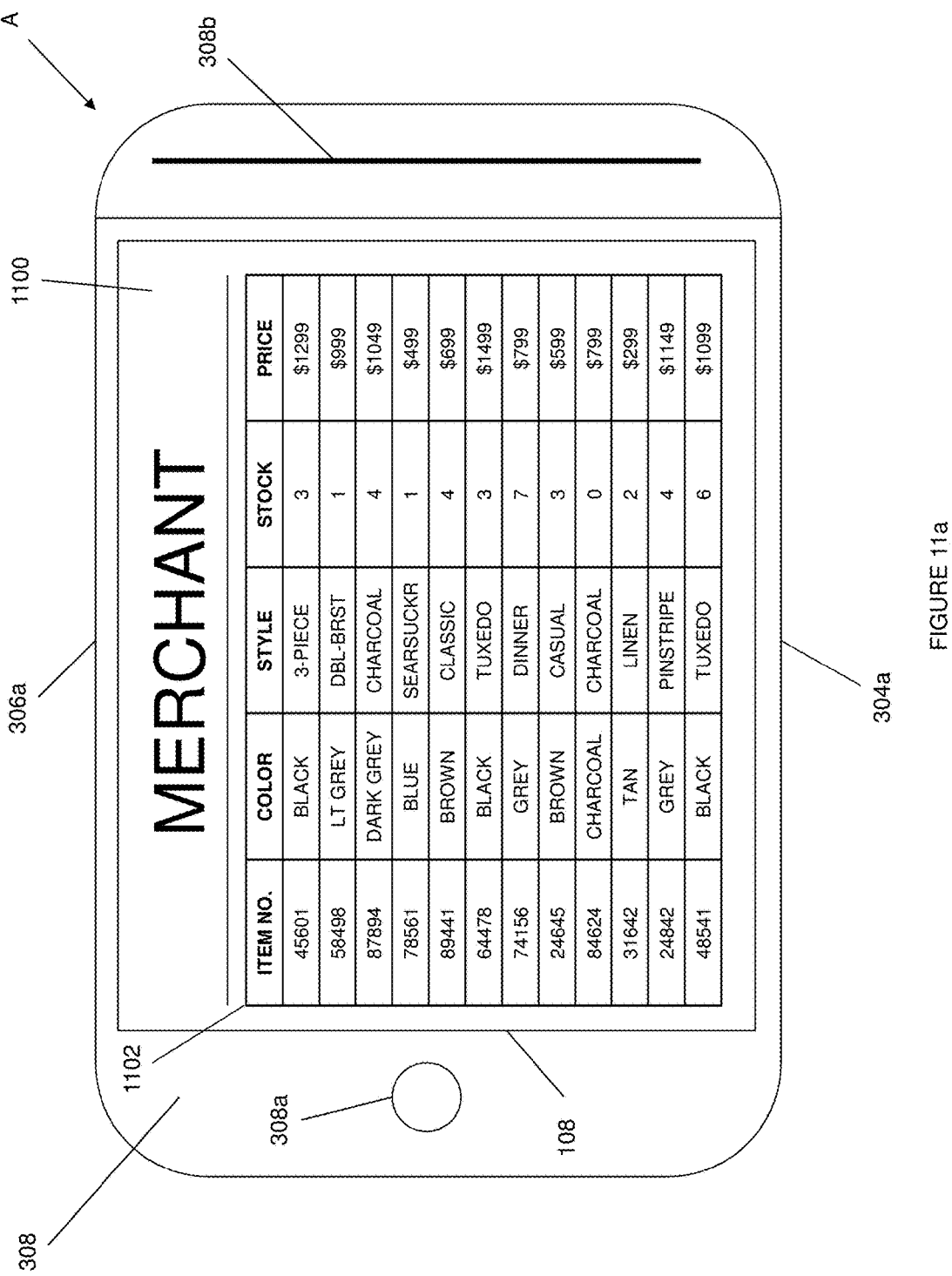
FIG. 11a is a screen shot illustrating an embodiment of a merchant screen.
Figure 11B:
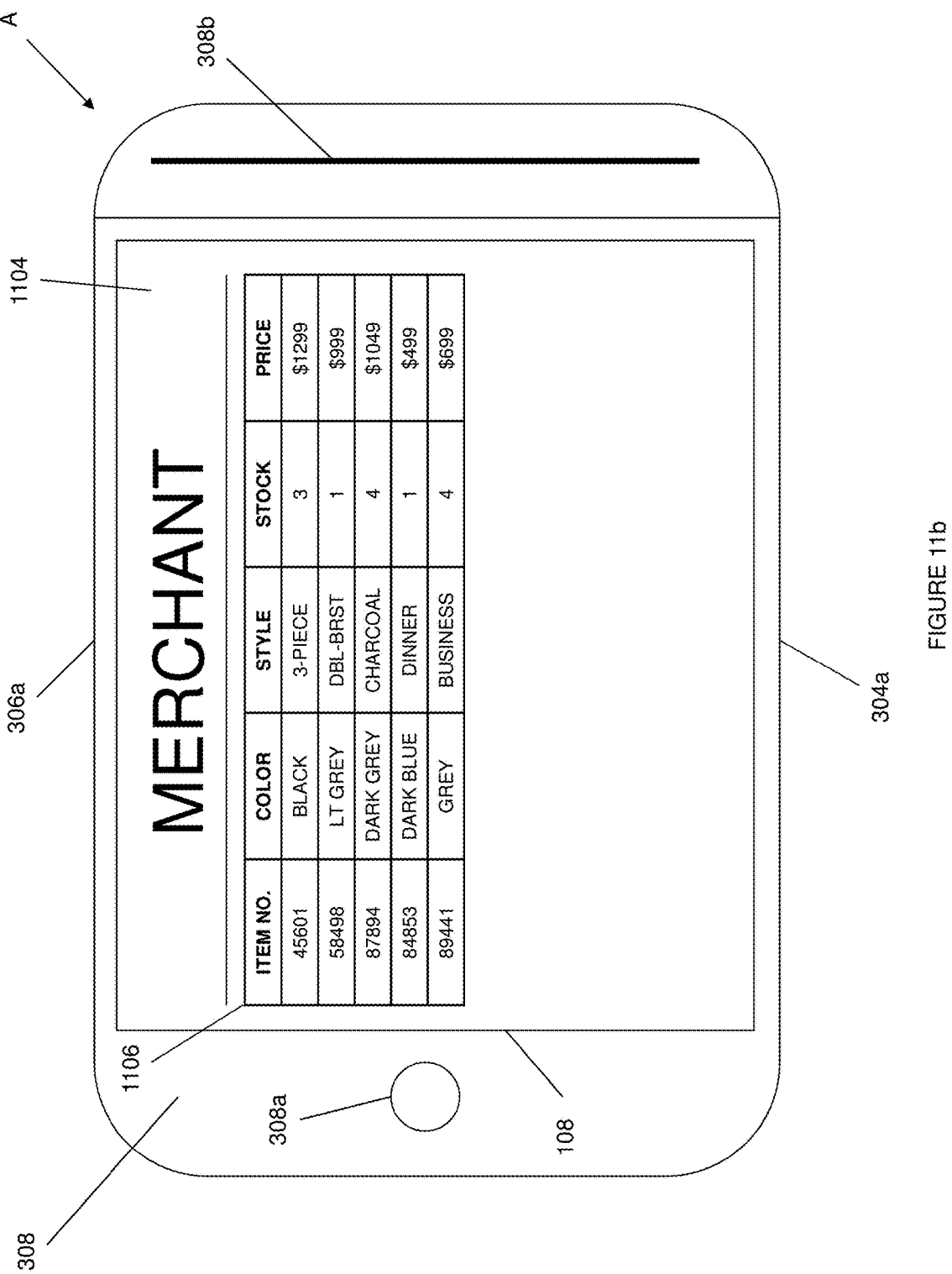
FIG. 11b is a screen shot illustrating an embodiment of a merchant screen.

Referring now to FIGS. 11a-k, and with reference to FIGS. 10a, 10b, 10f, and 10h, an embodiment of the method 900 begins at block 902 where a rocker POS tablet is determined to be in a first orientation. FIGS. 11a and 11b illustrate the tablet computer enclosure/stand 200/POS rocker tablet 300 in the merchant orientation A, also illustrated in FIG. 10a. The determination that the rocker POS tablet 600 is in the merchant orientation A may be performed substantially as described above. The method 900 then proceeds to block 904 where merchant product information is retrieved. In an embodiment, while in the merchant orientation A, the instructions may be received through the merchant home screen 904a of the rocker POS tablet 600 while in the merchant orientation A, illustrated in FIG. 10b.

Referring now to FIGS. 11a and 11b, the merchant user of the rocker POS tablet 600 may have selected the view inventory button 904c on the merchant home screen 904a when the tablet computer enclosure/stand 200/rocker POS tablet 600 was in the merchant orientation A. In response, a complete merchant inventory screen 1100, illustrated in FIG. 11a, may be displayed that includes inventory data for the physical merchant location. For example, FIG. 11a includes a screen shot of the display of inventory data 1102 for suits, including rows of different suits with information in columns that includes identification numbers, suit color, suit style, number of suits in stock, and suit price. At block 904, the merchant user may provide instructions to the tablet computer 100 by selecting some of the rows that include suits of interest for a customer that that user is helping, by filtering the results using a filtering term, and/or by performing a variety of other actions known in the art. For example, a customer may ask the user for a suit for a specific occasion, and the user may then filter the inventory data 1102, and/or select suits in that inventory data 1102 that are appropriate for that occasion.

The method 900 then proceeds to block 906 where merchant screen(s) are displayed. In an embodiment, the instruction(s) received at block 904 may be used to retrieve merchant product information, customer information, and/or other information known in the art, and that retrieved information may be provided on a merchant screen according to the merchant orientation information. Referring now to FIG. 11b, the rocker POS tablet 600 is illustrated displaying a merchant screen 1104. The merchant screen 1104 is displaying merchant product information 1106 that includes the suits that the merchant user selected for the customer at block 904. The product information 1106 in the illustrated embodiment includes items numbers, colors, style indicators, inventor stock numbers, and prices of each of the selected suits. However, in this embodiment or other embodiments (e.g., with different products/services being sold by the merchant to the customer), other information intended for the merchant may be displayed on the merchant screen 1104 including, for example, margin numbers for each product, merchant incentives for selling particular products, and/or a variety of other merchant-intended information known in the art.

The method 900 then proceeds to block 908 where a change in the orientation of the rocker POS tablet is detected. Referring to FIGS. 10f and 10h, when the user has completed merchant operations with the rocker POS tablet in the merchant orientation A (e.g., selecting suits that might be of interest to the customer, etc.), the user may reorient the tablet computer enclosure/stand 200/rocker POS tablet 600 into a customer orientation. FIG. 10f illustrates an embodiment of the change in orientation of the tablet computer enclosure/stand 200/rocker POS tablet 600 from the merchant orientation A to an intermediate orientation B by rotating the tablet computer enclosure/stand 200/rocker POS tablet 600 about the engagement of the second edge 204b/304b and the support surface 902a. FIG. 10h illustrates an embodiment of the change in orientation of the tablet computer enclosure/stand 200/rocker POS tablet 600 from the intermediate orientation B to a customer orientation C by continuing to rotate the tablet computer enclosure/stand 200/rocker POS tablet 600 about the engagement of the second edge 204b/304b and the support surface 902a until the second base surface 206 engages the support surface 902a.

Figure 11C:
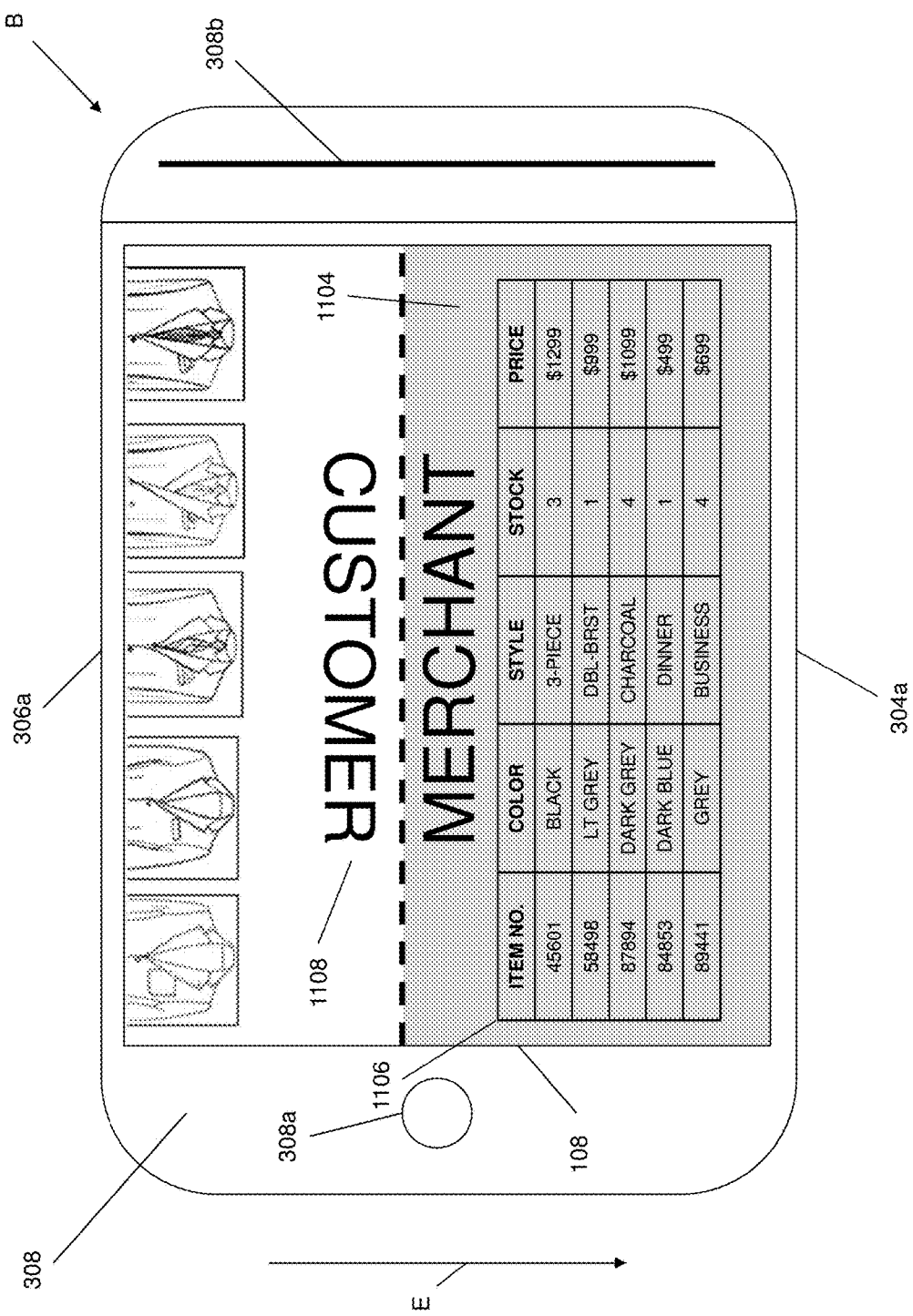
FIG. 11c is a screen shot illustrating an embodiment of the transition of a merchant screen to a customer screen.

The method 900 then proceeds to block 910 where the merchant screen is transitioned to a customer screen. In response to detecting the change in orientation of the tablet computer enclosure/stand 200/rocker POS tablet 600 substantially as described above, the tablet computer 100 may operate to transition the merchant screen 1104 to a customer screen 1108. FIG. 11c illustrates the rocker POS tablet 600 in the intermediate orientation B and transitioning from the merchant screen 1104 to the customer screen 1108. In the illustrated embodiment, the merchant screen 1104 and the customer screen 1108 are positioned in a stacked orientation with (from the merchant user's point of view) the customer screen 1108 stacked, upside down, on top of the merchant screen 1104, and during the transition of the tablet computer enclosure/stand 200/rocker POS tablet 600 from the merchant orientation A to the intermediate orientation B, the stacked merchant screen 1104/customer screen 1108 are rendered by the tablet computer 100 such that they appear to move linearly in a direction E relative to the tablet computer display 104.

Figure 11D:
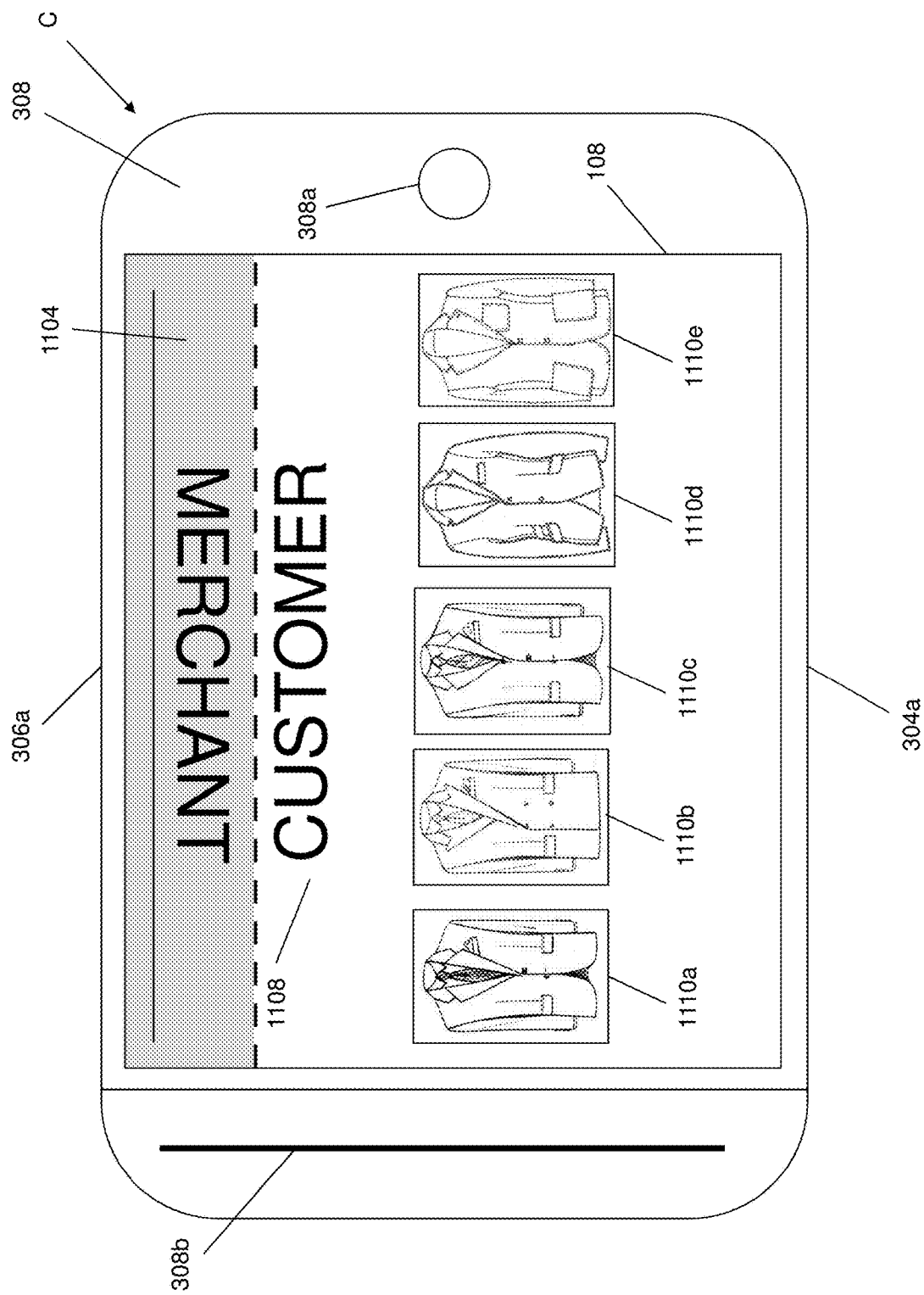
FIG. 11d is a screen shot illustrating an embodiment of a customer screen.

FIG. 11d illustrates the rocker POS tablet 600 in the customer orientation C and transitioned from the merchant screen 1104 to the customer screen 1108. In the illustrated embodiment, the rocker POS tablet 600 is illustrated from the customer point of view, with the merchant screen 1104 and the customer screen 1108 positioned in a stacked orientation with (from the customer user's point of view) the merchant screen 1104 stacked, upside down, on top of the customer screen 1108, and during the transition of the tablet computer enclosure/stand 200/rocker POS tablet 600 from the intermediate orientation B to the customer orientation C, the stacked merchant screen 1104/customer screen 1108 are rendered by the tablet computer 100 such that they appear to move linearly in the direction E relative to the tablet computer display 104. In the embodiment illustrated in FIGS. 11d-h, the merchant screen 906a is at least partially obscured (e.g., greyed out in the illustrated embodiment) in response to changing the orientation of the tablet computer enclosure/stand 200/rocker POS tablet 600 from the merchant orientation A to the customer orientation C. For example, in the intermediate orientation B, the merchant screen 1104 may be partially obscured or greyed out, while in the customer orientation C, the merchant screen 1104 may be completely obscured or greyed out such that the customer may not see any information displayed on the merchant screen 906a.

In the embodiment illustrated in FIG. 11d, the customer screen 1108 includes product images 1110a, 1110b, 1110c, 1110d, and 1110e. In an embodiment, each of the product images 1110a-e may correspond to a product described in the rows of the merchant product information 1106 on the merchant screen 1104. For example, the customer orientation information associated with the customer orientation C in the database may define that the suits selected by the merchant in the product information 1106 should be displayed to in the customer orientation C to a customer as product images associated with those suits in a database. Thus, the merchant user may manipulate the inventory data 1102 on the merchant screen 1100 such that the merchant screen 1104 is provided with the merchant product information 1106, and then change the orientation of the rocker POS tablet 600 to cause the tablet computer 100 to retrieve and display the product images 1110a-e for the products associated with the merchant product information 1106, while ensuring that inventory data or other sensitive data is not displayed to the customer.

Figure 11E:
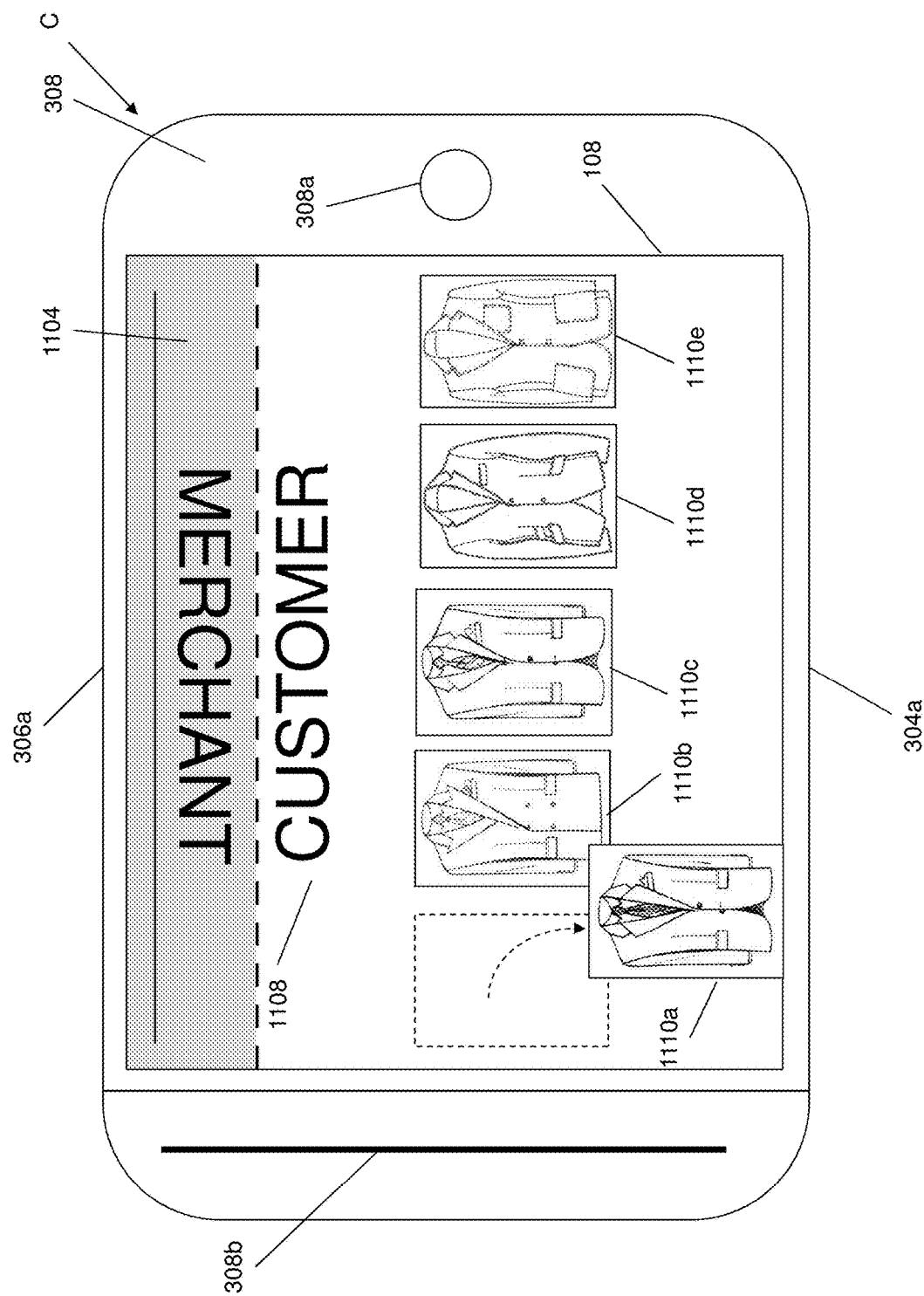
FIG. 11e is a screen shot illustrating an embodiment of a customer screen.
Figure 11F:
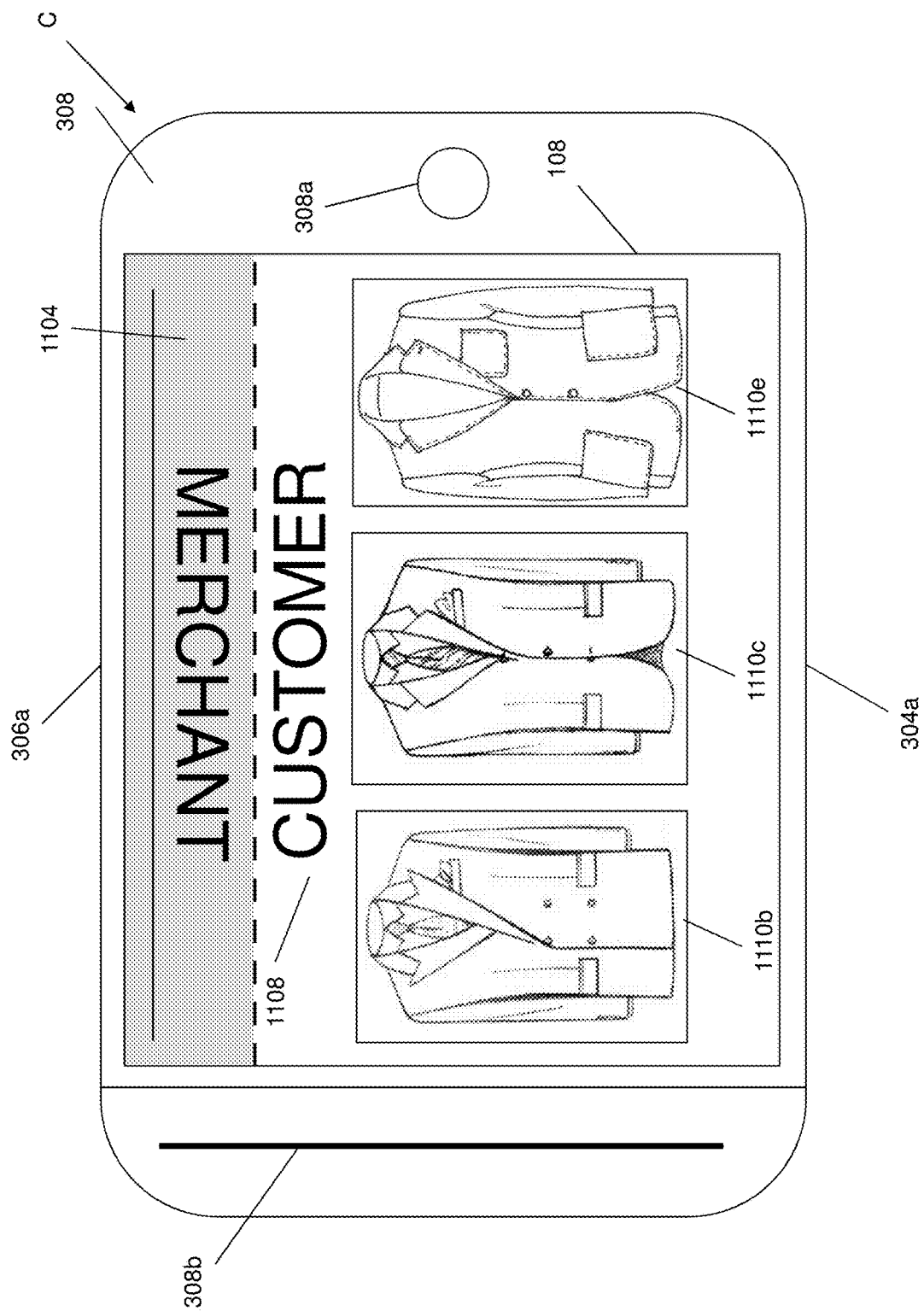
FIG. 11f is a screen shot illustrating an embodiment of a customer screen.
Figure 11G:
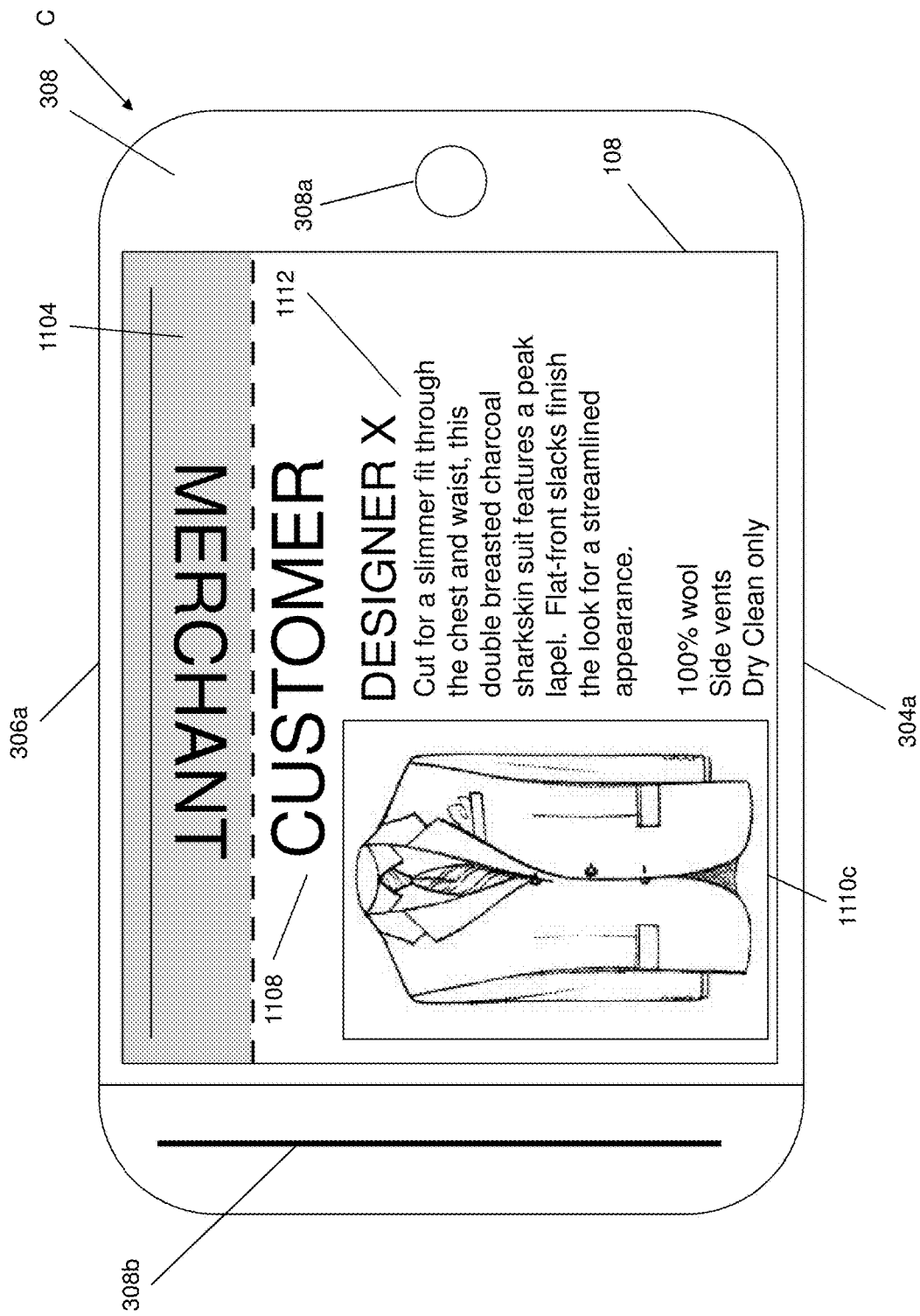
FIG. 11g is a screen shot illustrating an embodiment of a customer screen.

FIG. 11e illustrates how the customer may interact with the customer screen 1108 to select products. In the illustrated embodiment, the customer is selecting the product image 1110a (e.g., but touching the tablet computer display where the product image 1110a is being displayed) and "swiping" the image downward to remove it from the list of products the customer is considering purchasing. FIG. 11f illustrates the customer screen 1108 after the product images 1110a and 1110d have been "swiped" away. As can be seen, as the product images are "swiped" away, the remaining product images for the products that the customer is interested in are enlarged. FIG. 11g illustrates the customer screen 1108 displaying a particular product that the customer is interested in purchasing (e.g., in response to "swiping" away the other product images, in response to selecting the product image 1110c, etc.). As can be seen, the product image 1110c has been enlarged even further, and product information 1112 has been provided on the customer screen 1108 for review by the customer.

FIGS. 11h and 11j illustrate how the tablet computer enclosure/stand 200/rocker POS tablet 600 may then be reoriented from the customer orientation C back to the merchant orientation A to provide the merchant screen 1104 with merchant product information based on the actions taken by the customer on the customer screen 1108. FIG. 11h illustrates the rocker POS tablet 600 in the intermediate orientation B and transitioning from the customer screen 1108 to the merchant screen 1104. In the illustrated embodiment, the merchant screen 1104 and the customer screen 1108 are positioned in a stacked orientation with (from the merchant user's point of view) the customer screen 1108 stacked, upside down, on top of the merchant screen 1104, and during the transition of the tablet computer enclosure/stand 200/rocker POS tablet 600 from the merchant orientation A to the intermediate orientation B, the stacked merchant screen 1104/customer screen 1108 are rendered by the tablet computer 100 such that they appear to move linearly in a direction F relative to the tablet computer display 104.

Figure 11I:
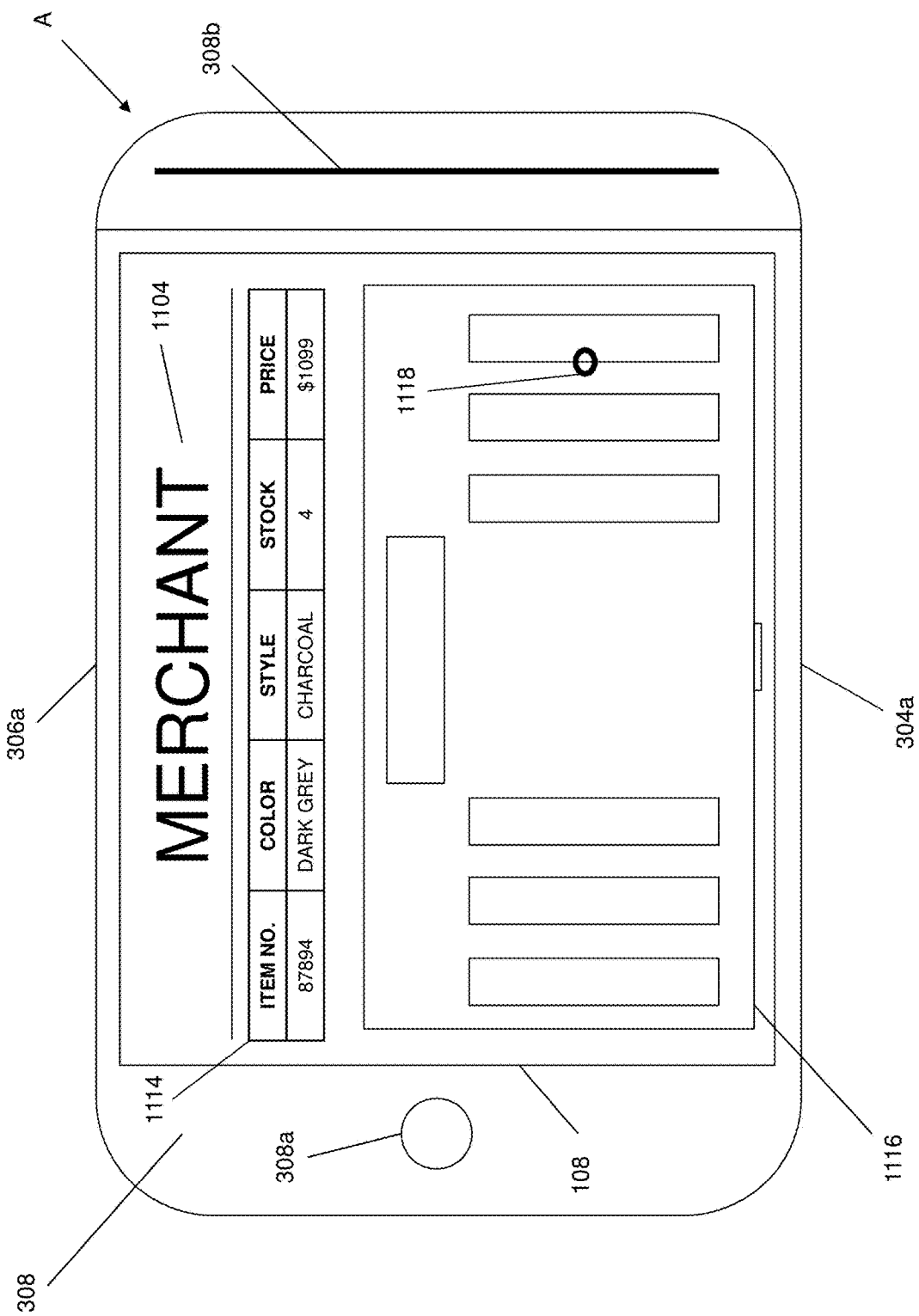
FIG. 11i is a screen shot illustrating an embodiment of a merchant screen.

FIG. 11*i* illustrates the merchant screen 1104 with merchant product information 1114 for the product associated with the product image 1110*c* selected by the customer on the customer screen 1108. In response to the actions by the customer selecting a particular product, the merchant screen 1104 now displays a physical merchant location map 1116 that provides a layout of the physical merchant location along with an indicator 1118 of where within the physical merchant location the product that was selected by the customer is located. In an embodiment, each product in the merchant physical location may be associated with location data in the database, and upon detecting the change of the rocker POS tablet 600 from the customer orientation C to the merchant orientation A, the tablet computer 100 may use the product identifier for the product selected by the customer on the customer screen 1108 to retrieve the location data for that product to display the physical merchant location map 1116 and indicator 1118.

Thus, systems and methods for providing merchant/customer service interactions have been described that utilize a rocker POS tablet that provides merchant screens while in a merchant orientation to allow the merchant to retrieve, collect, and compile product information for products the customer would like to purchase, and then translates to related, but different, customers screens when the rocker POS tablet is reoriented to a customer orientation in order to allow the customer to view images of those products and select products to purchase or view. This combination of reorientation hardware and software provides for fluid and easy interactions between the merchant and the customer using the same tablet device, while ensuring information meant for the merchant is not displayed to the customer, by transitioning between merchant screens and customer screens that display similar information differently based on an orientation change and without the need to provide any other input to the rocker POS tablet. In the illustrated service interaction example, the merchant user may search through product inventories, view product sale incentives or product margins, narrow the list of products to be displayed to the user based on instructions from that user when the rocker POS tablet is in the merchant orientation, with all of that information displayed to the merchant user. Upon transition of the rocker POS tablet to the customer orientation, that information is modified according to the customer orientation information such that only information that would be of interest to the customer is displayed (e.g., the product images and/or descriptions.)

Figure 12:
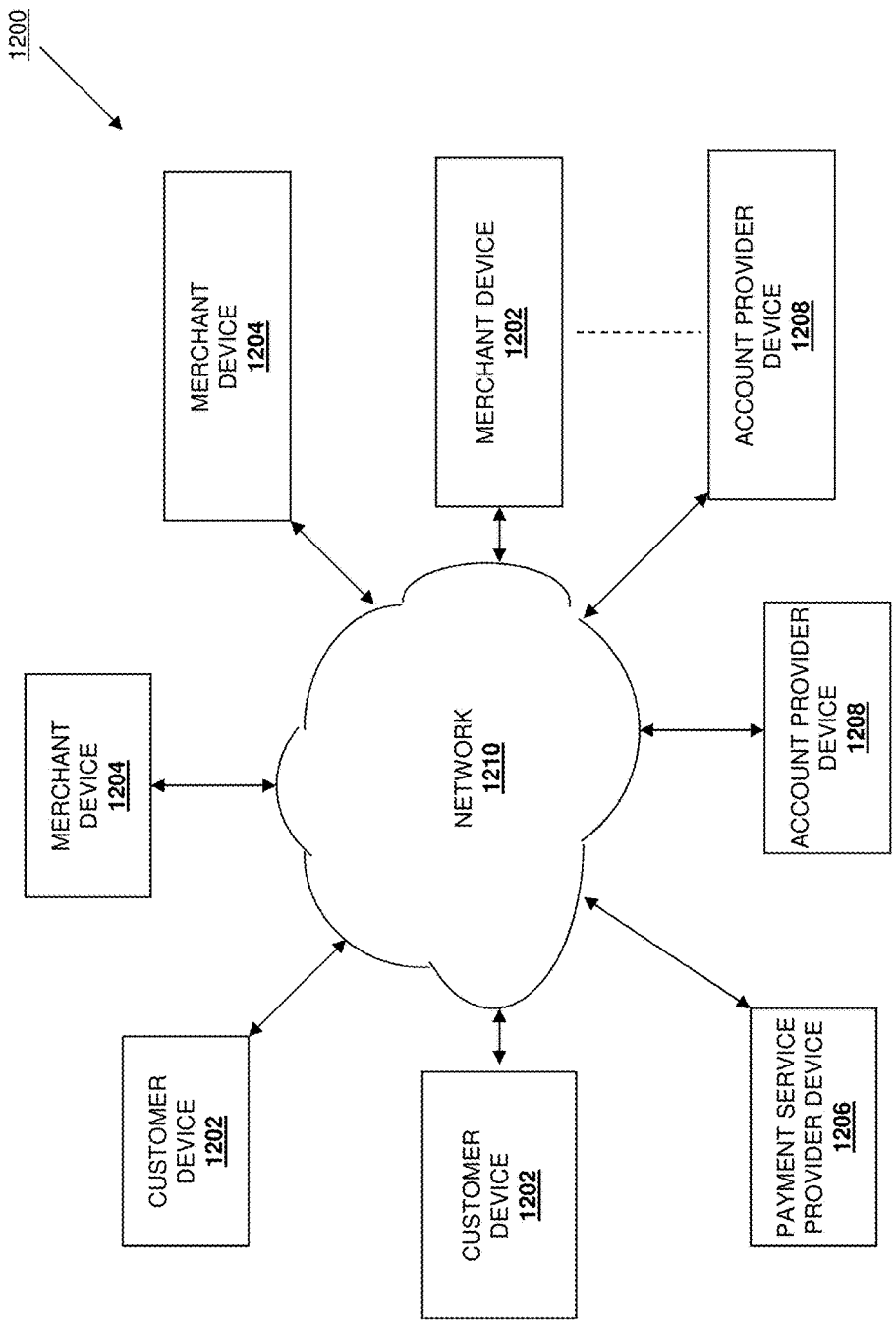
FIG. 12 is a schematic view illustrating an embodiment of a networked system.

Referring now to FIG. 12, an embodiment of a network-based system 1200 for implementing one or more processes described herein is illustrated. As shown, network-based system 1200 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 12 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 1200 illustrated in FIG. 12 includes a plurality of customer devices 1202, a plurality of merchant devices 1204, a payment service provider device 1206, and a plurality of account holder devices 1208 in communication over a network 1210. Any of the customer devices 1202 may be the customer devices, discussed above. The merchant devices 1204 may be the merchant devices discussed above and may be operated by the merchant discussed above. The payment service provider device 1206 may be the payment service provider devices discussed above and may be operated by a payment service provider such as, for example, PayPal Inc. of San Jose, Calif. The account provider devices 1208 may be the account provider devices discussed above and may be operated by the account providers discussed above such as, for example, credit card account providers, bank account providers, savings account providers, and a variety of other account providers known in the art.

The customer devices 1202, merchant devices 1204, payment service provider device 1206, and account provider devices 1208 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 1200, and/or accessible over the network 1210.

The network 1210 may be implemented as a single network or a combination of multiple networks. For example, in various embodiments, the network 1210 may include the Internet and/or one or more intranets, landline networks, wireless networks, and/or other appropriate types of networks.

The customer devices 1202 may be implemented using any appropriate combination of hardware and/or software configured for wired and/or wireless communication over network 1210. For example, in one embodiment, the customer devices 1202 may be implemented as a personal computer of a user in communication with the Internet. In other embodiments, the customer devices 1202 may be a smart phone, personal digital assistant (PDA), laptop computer, and/or other types of computing devices.

The customer devices 1202 may include one or more browser applications which may be used, for example, to provide a convenient interface to permit the customer to browse information available over the network 1210. For example, in one embodiment, the browser application may be implemented as a web browser configured to view information available over the Internet.

The customer devices 1202 may also include one or more toolbar applications which may be used, for example, to provide user-side processing for performing desired tasks in response to operations selected by the customer. In one embodiment, the toolbar application may display a user interface in connection with the browser application.

The customer devices 1202 may further include other applications as may be desired in particular embodiments to provide desired features to the customer devices 1202. In particular, the other applications may include a payment application for payments assisted by a payment service provider through the payment service provider device 1206. The other applications may also include security applications for implementing user-side security features, programmatic user applications for interfacing with appropriate application programming interfaces (APIs) over the network 1210, or other types of applications. Email and/or text applications may also be included, which allow the customer to send and receive emails and/or text messages through the network 1210. The customer devices 1202 include one or more user and/or device identifiers which may be implemented, for example, as operating system registry entries, cookies associated with the browser application, identifiers associated with hardware of the customer devices 1202, or other appropriate identifiers, such as a phone number. In one embodiment, the user identifier may be used by the payment service provider device 1206 and/or account provider devices 1208 to associate the user with a particular account as further described herein.

The merchant devices 1204 may be maintained, for example, by a conventional or on-line merchant, conventional or digital goods seller, individual seller, and/or application developer offering various products and/or services in exchange for payment to be received conventionally or over the network 12. In this regard, the merchant devices 1204 may include a database identifying available products and/or services (e.g., collectively referred to as items) which may be made available for viewing and purchase by the customer.

The merchant devices 1204 also include a checkout application which may be configured to facilitate the purchase by the payer of items. The checkout application may be configured to accept payment information from the user through the customer devices 1202, the account provider through the account provider device 1208, and/or from the payment service provider through the payment service provider device 1206 over the network 1210.

Figure 13:
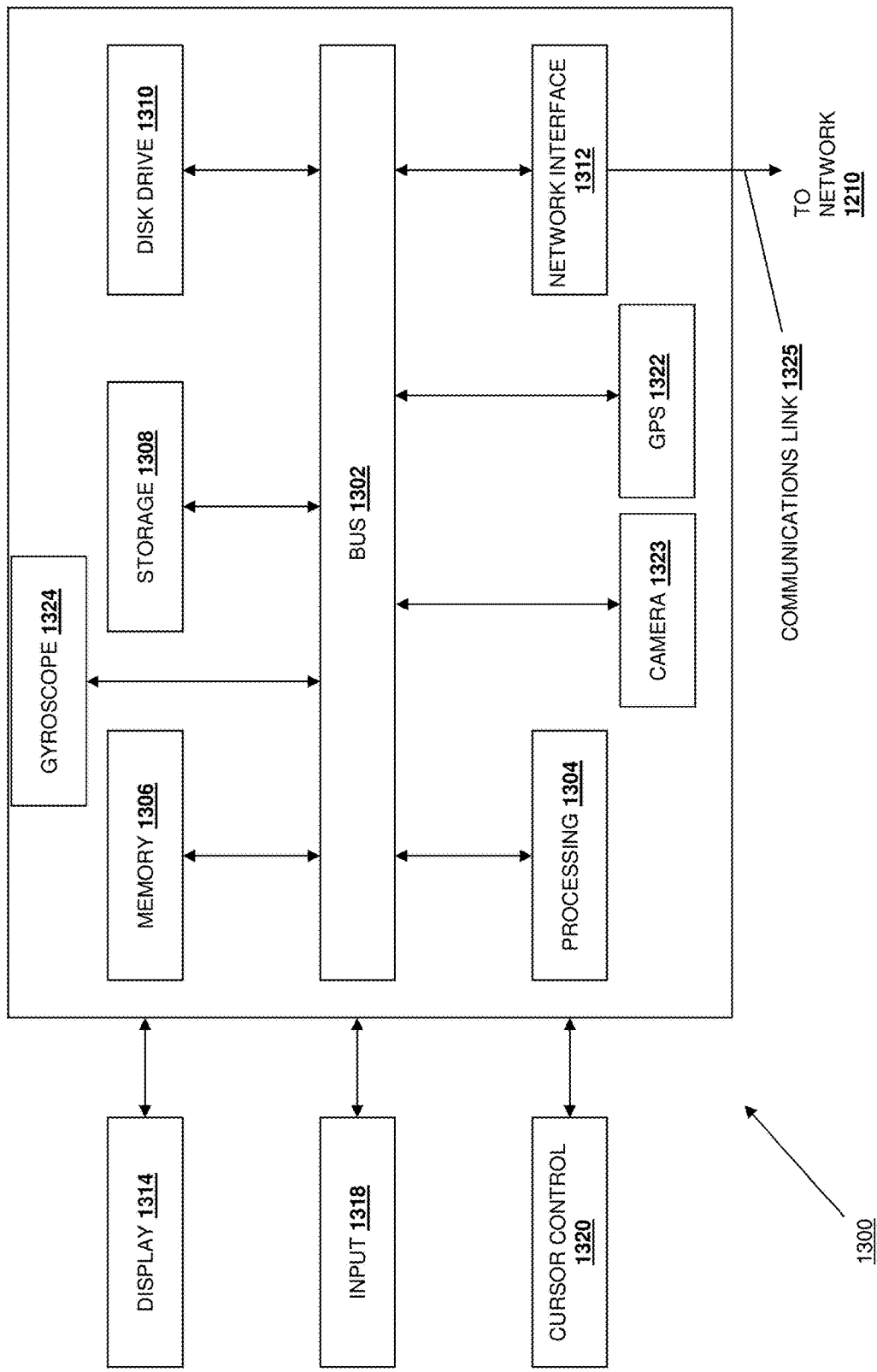
FIG. 13 is a schematic view illustrating an embodiment of a computer system.

Referring now to FIG. 13, an embodiment of a computer system 1300 suitable for implementing, for example, the customer devices 1202, merchant devices 1204, payment service provider device 1206, and account provider devices 1208, is illustrated. It should be appreciated that other devices utilized by customers, merchants, payment service providers, and account providers in the merchant/client interaction system discussed above may be implemented as the computer system 1300 in a manner as follows.

In accordance with various embodiments of the present disclosure, computer system 1300, such as a computer and/or a network server, includes a bus 1302 or other communication mechanism for communicating information, which interconnects subsystems and components, such as a processing component 1304 (e.g., processor, micro-controller, digital signal processor (DSP), etc.), a system memory component 1306 (e.g., RAM), a static storage component 1308 (e.g., ROM), a disk drive component 1310 (e.g., magnetic or optical), a network interface component 1312 (e.g., modem or Ethernet card), a display component 1314 (e.g., CRT or LCD), an input component 1318 (e.g., keyboard, keypad, or virtual keyboard), a cursor control component 1320 (e.g., mouse, pointer, or trackball), a location determination component 822 (e.g., a Global Positioning System (GPS) device as illustrated, a cell tower triangulation device, and/or a variety of other location determination devices known in the art), a camera component 1323, and/or an orientation determination component 1324 (e.g., a gyroscope). In one implementation, the disk drive component 1310 may comprise a database having one or more disk drive components.

In accordance with embodiments of the present disclosure, the computer system 1300 performs specific operations by the processor 1304 executing one or more sequences of instructions contained in the memory component 1306, such as described herein with respect to the customer devices 1202, merchant devices 1204, payment service provider device 1206, and account provider devices 1208. Such instructions may be read into the system memory component 1306 from another computer readable medium, such as the static storage component 1308 or the disk drive component 1310. In other embodiments, hard-wired circuitry may be used in place of or in combination with software instructions to implement the present disclosure.

Logic may be encoded in a computer readable medium, which may refer to any medium that participates in providing instructions to the processor 1304 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1310, volatile media includes dynamic memory, such as the system memory component 1306, and transmission media includes coaxial cables, copper wire, and fiber optics, including wires that comprise the bus 1302. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 1300. In various other embodiments of the present disclosure, a plurality of the computer systems 1300 coupled by a communication link 1325 to the network 1210 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1300 may transmit and receive messages, data, information and instructions, including one or more programs (i.e., application code) through the communication link 1325 and the network interface component 1312. The network interface component 1312 may include an antenna, either separate or integrated, to enable transmission and reception via the communication link 1324. Received program code may be executed by processor 1304 as received and/or stored in disk drive component 1310 or some other non-volatile storage component for execution.

Figure 14:
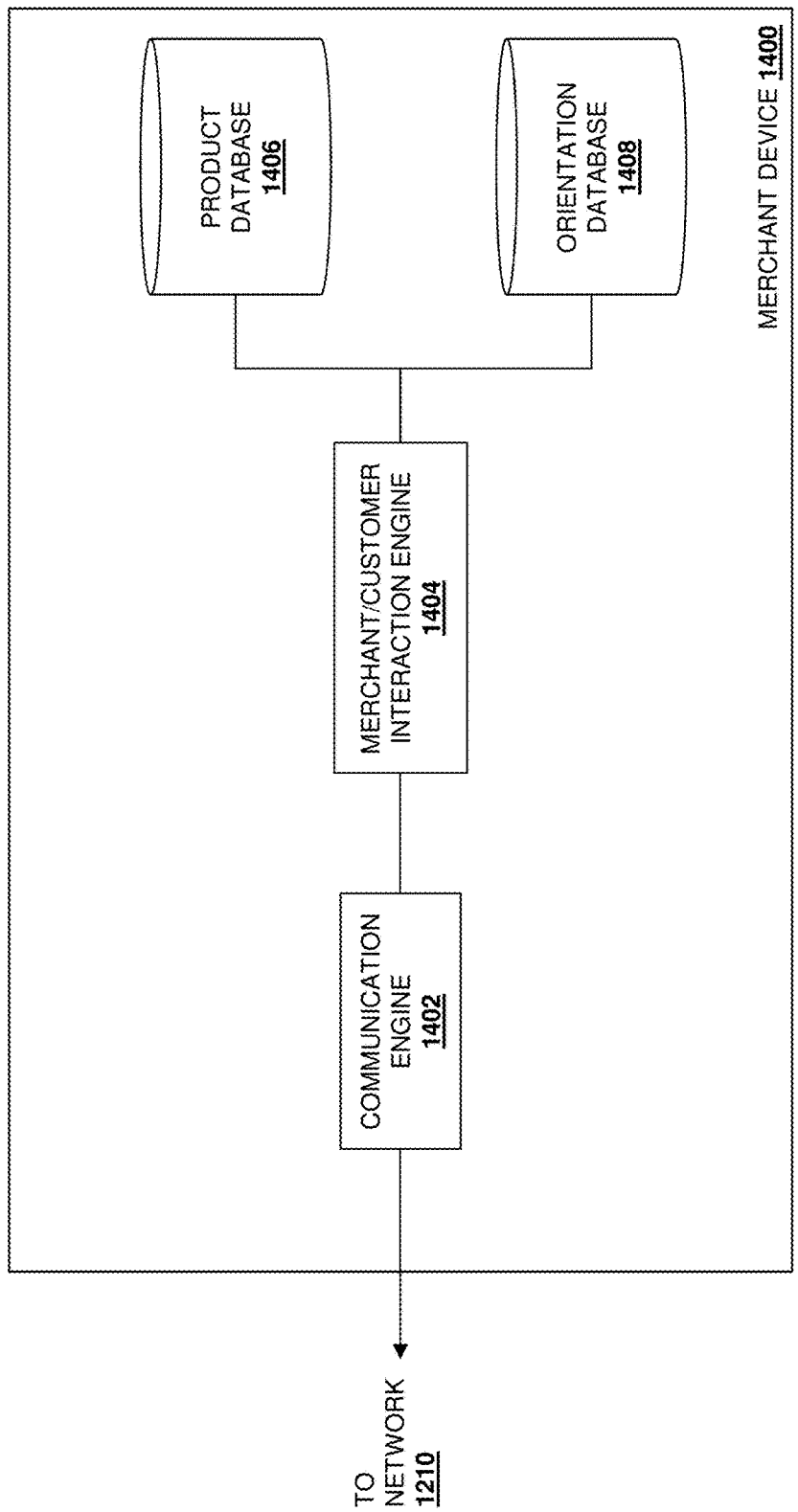
FIG. 14 is a schematic view illustrating an embodiment of a merchant device.

Referring now to FIG. 14, an embodiment of a merchant device 1400 is illustrated. In an embodiment, the device 1400 may be the tablet computers or rocker POS tablets discussed above. The device 1400 includes a communication engine 1402 that is coupled to the network 1210 and to a merchant/customer interaction engine 1404 that is coupled to a product database 1406 and an orientation database 1408. The communication engine 1402 may be software or instructions stored on a computer-readable medium that allows the device 1400 to send and receive information over the network 1210. The merchant/customer interaction engine 1404 may be software or instructions stored on a computer-readable medium that is operable to determine tablet computer orientations, retrieve merchant product information according to a received instruction, display merchant screens, detect changes in orientation of the tablet computer, transition a merchant screen to a customer screen, and provide any of the other functionality that is discussed above. While the databases 1406 and 1408 have been illustrated as separate and both located in the merchant device 1400, one of skill in the art will recognize that they may be combined and/or connected to the merchant/customer interaction engine 1404 through the network 1210 without departing from the scope of the present disclosure.

Figure 15A:
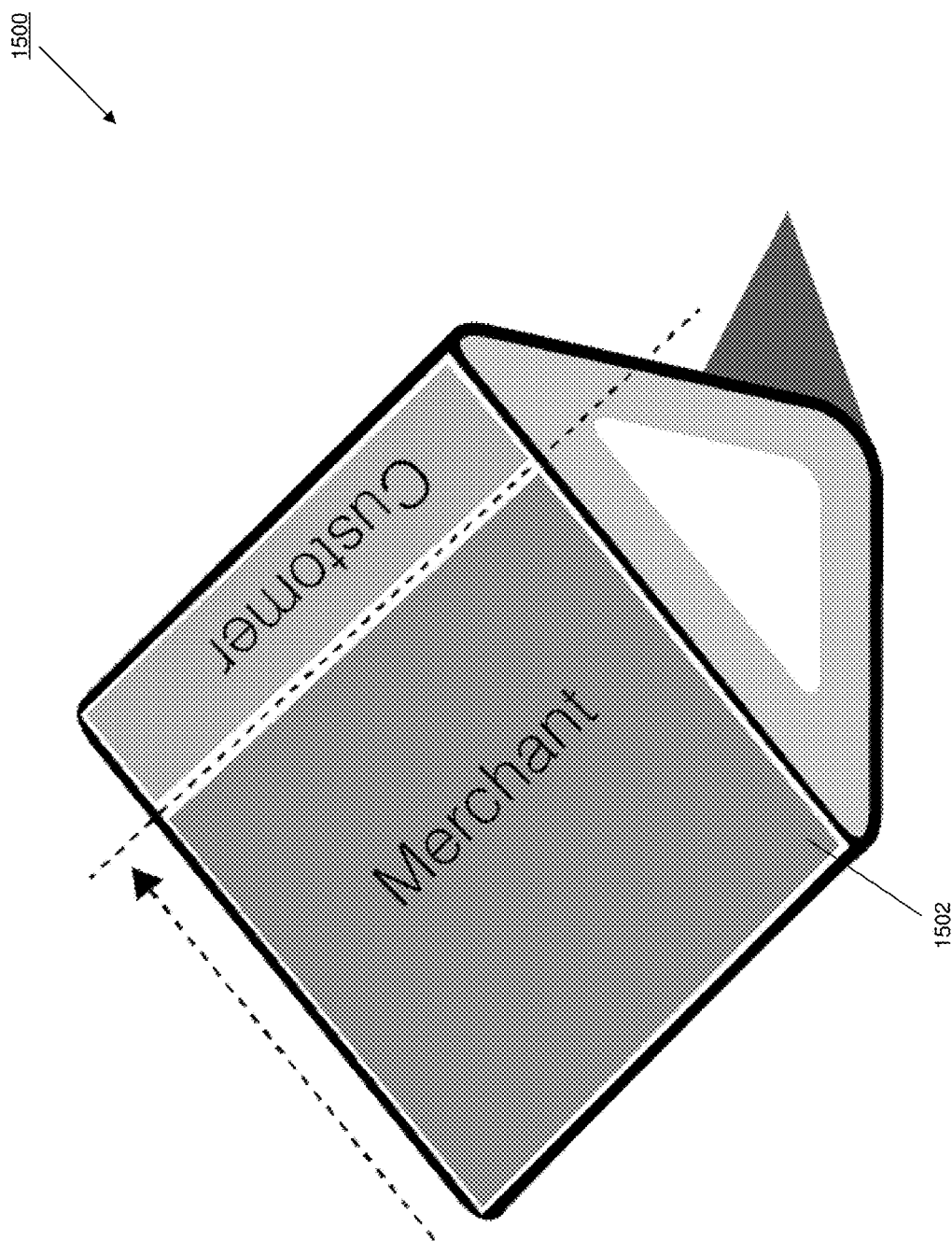
FIG. 15a is a schematic view illustrating an embodiment of a rocker POS tablet in a merchant orientation.
Figure 15C:
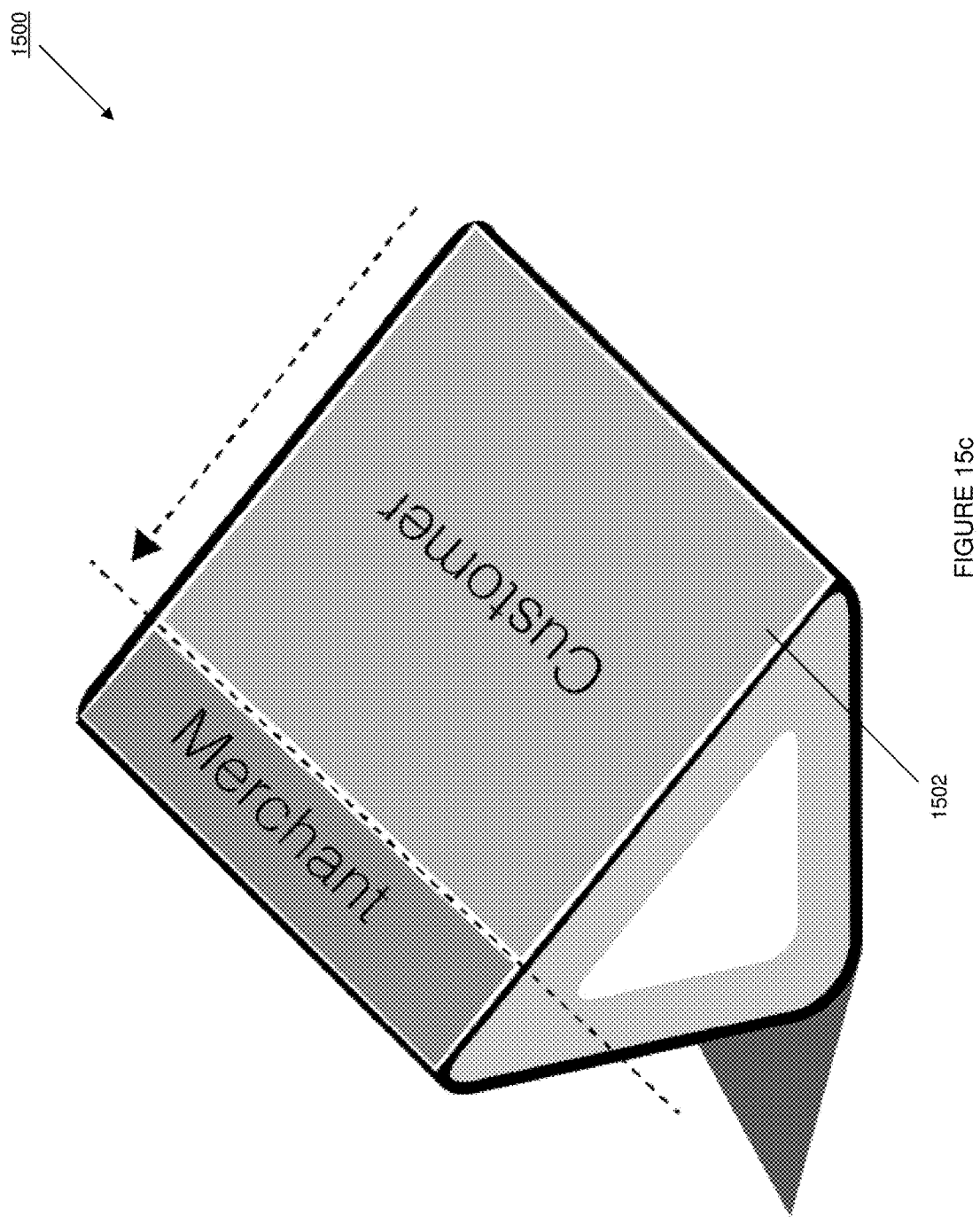
FIG. 15c is a schematic view illustrating an embodiment of a rocker POS tablet in a customer orientation.

Referring now to FIGS. 15a, 15b, and 15c, a schematic embodiment of the hardware/software interaction in a rocker POS tablet 1500 is illustrated. FIG. 15a illustrates the rocker POS tablet 1500 in a merchant orientation such that a majority of the display device 1502 (e.g., on a tablet computer) displays a merchant screen, while a top portion of the display device 1502 displays a portion of a customer screen. FIG. 15b illustrates the rocker POS tablet 1500 in a halfway rotated orientation such that the display device 1502 (e.g., on a tablet computer) displays half of the merchant screen and half of the customer screen. Finally, FIG. 15c illustrates the rocker POS tablet 1500 in a customer orientation such that the display device 1502 (e.g., on a tablet computer) displays the customer screen, while a top portion of the display device 1502 displays a portion of the merchant screen Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on merchants and customers; however, a customer or consumer can pay, or otherwise interact with any type of recipient, including charities and individuals. The payment does not have to involve a purchase, but may be a loan, a charitable contribution, a gift, etc. Thus, merchant as used herein can also include charities, individuals, and any other entity or person receiving a payment from a customer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A tablet computer orienting system, comprising:
    a tablet computer chassis base, comprising:
        a first wall configured to engage a support surface when the tablet computer chassis base is in a first orientation;
        a second wall extending from the first wall and configured to engage the support surface when the tablet computer chassis base is in a second orientation that is rotated relative to the first orientation;
        a tablet computer housing member extending between the first wall and the second wall and defining a tablet computer housing that is configured to house a tablet computer;
        a tablet computer housing entrance defined by the tablet computer housing member adjacent the tablet computer housing, wherein the tablet computer housing entrance is configured to allow a tablet computer to enter the tablet computer housing; and
        a chassis data connector that is located adjacent the tablet computer housing, wherein the chassis connector is configured to connect to a tablet computer when the tablet computer being housed in the tablet computer housing;
    at least one data input subsystem on the tablet computer chassis base that is communicatively coupled to the chassis data connector and that is configured to communicate with a tablet computer that is connected to the chassis data connector; and
    a tablet securing member that is configured to physically constrain a tablet computer to the tablet computer chassis base, wherein the physically constraining the tablet computer to the tablet computer chassis base causes:
        the chassis data connector to directly engage a tablet data connector that is part of the tablet computer such that the tablet computer establishes a data connection with the at least one data input subsystem; and
        prevents access to the tablet computer housing entrance in order to secure the tablet computer in the tablet computer housing.

2. The tablet computer orienting system of claim 1, wherein the at least one data input subsystem comprises a card reader subsystem that includes a card reader device.

3. The tablet computer orienting system of claim 2, wherein the card reader subsystem is integrated into the tablet computer chassis base, and wherein the tablet computer chassis base defines a card reader channel that is configured to allow a card positioned in the card reader channel to be read by the card reader device.

4. The tablet computer orienting system of claim 1, wherein the tablet securing member includes a tablet housing end cap that is configured to engage an edge of each of the first wall, the second wall, and the tablet computer housing member.

5. The tablet computer orienting system of claim 1, wherein the tablet securing member includes a tablet computer chassis bezel that is configured to engage the tablet computer housing member that defines the tablet computer housing.

6. The tablet computer orienting system of claim 1, further comprising:
a display window defined by the tablet computer housing and configured to align with a display device on the tablet computer when the tablet computer is housed in the tablet computer housing.

7. The tablet computer orienting system of claim 1, wherein each of the first orientation and the second orientation provide the tablet computer in a landscape mode when the tablet computer is housed in the tablet computer housing, and wherein the system further comprises:
a plurality of edges that are included on the tablet computer chassis base and that are configured to engage the support surface to provide the tablet computer in a portrait mode when the tablet computer is housed in the tablet computer housing.

8. A tablet computer system, comprising:
a tablet computer; and
a tablet computer chassis, comprising:
a first wall configured to engage a support surface when the tablet computer chassis is in a first orientation;
a second wall extending from the first wall and configured to engage the support surface when the tablet computer chassis is in a second orientation that is rotated relative to the first orientation;
a tablet computer housing member extending between the first wall and the second wall and defining a tablet computer housing that houses the tablet computer;
a tablet computer housing entrance defined by the tablet computer housing member adjacent the tablet computer housing, wherein the tablet computer housing entrance allows the tablet computer to enter the tablet computer housing; and
a chassis data connector that is located adjacent the tablet computer housing and that is connected to the tablet computer;
at least one data input subsystem on the tablet computer chassis that is communicatively coupled to the tables computer through the chassis data connector;
a tablet securing member that physically constrains the tablet computer to the tablet computer chassis, wherein the physically constraining the tablet computer to the tablet computer chassis causes:
the chassis data connector to directly engage a tablet data connector that is integrated with the tablet computer such that the tablet computer establishes a data connection with the at least one data input subsystem; and
prevents access to the tablet computer housing entrance in order to secure the tablet computer in the tablet computer housing.

9. The tablet computer system of claim 8, wherein the at least one data input subsystem comprises a card reader subsystem that includes a card reader device.

10. The tablet computer system of claim 9, wherein the card reader subsystem is integrated into the tablet computer chassis, and wherein the tablet computer chassis defines a card reader channel that is configured to allow a card positioned in the card reader channel to be read by the card reader device.

11. The tablet computer system of claim 8, wherein the tablet securing member includes a tablet housing end cap that engages an edge of each of the first wall, the second wall, and the tablet computer housing member.

12. The tablet computer system of claim 8, wherein the tablet securing member includes a tablet computer chassis bezel that engages the tablet computer housing member that defines the tablet computer housing.

13. The tablet computer system of claim 8, further comprising:
a display window defined by the tablet computer housing and that aligns with a display device on the tablet computer.

14. The tablet computer system of claim 8, wherein each of the first orientation and the second orientation provide the tablet computer in a landscape mode, and wherein the system further comprises:
a plurality of edges that are included on the tablet computer chassis and that are configured to engage the support surface to provide the tablet computer in a portrait mode.

15. A method for orienting a tablet computer, comprising:
positioning the tablet computer in a tablet computer chassis base by moving the tablet computer through a tablet computer housing entrance defined by a tablet computer housing member and into a tablet computer housing defined by a tablet computer housing member;
physically constraining the tablet computer to the tablet computer chassis base using a tablet securing member that engages the tablet computer to cause a tablet data connector that is part of the tablet computer to directly engage to a chassis data connector that is located in the tablet computer housing;
communicatively coupling the tablet computer with at least one data input subsystem that is included in the tablet computer chassis base in response to directly engaging the tablet data connector with the chassis connector data connector;
preventing access to the tablet computer housing entrance using the tablet securing member in order to secure the tablet computer in the tablet computer housing;
engaging a support surface with a first wall that extends from the tablet computer housing member when the tablet computer chassis base is in a first orientation; and
engaging the support surface with a second wall, that extends from the tablet computer housing member and the first wall, when the tablet computer chassis base is in a second orientation that is rotated relative to the first orientation.

16. The method of claim 15, wherein the at least one data input subsystem comprises a card reader subsystem that includes a card reader device.

17. The method of claim 16, wherein the card reader subsystem is integrated into the tablet computer chassis base, and wherein the method further comprises:
reading a card positioned in a card reader channel defined by the tablet computer chassis base using the card reader device.

18. The method of claim 15, further comprising:
engaging an edge of each of the first wall, the second wall, and the tablet computer housing member using a tablet housing end cap included on the tablet securing member.

19. The method of claim 15, further comprising:
engaging the tablet housing member that defines the tablet computer housing using a tablet computer chassis bezel included on the tablet securing member.

20. The method of claim 15, further comprising:
aligning a display window defined by the tablet computer housing with a display device on the tablet computer when the tablet computer is housed in the tablet computer housing.

* * * * *